United States Patent
Hyma et al.

(10) Patent No.: US 10,919,098 B2
(45) Date of Patent: Feb. 16, 2021

(54) CUTTER AND KIT

(71) Applicant: MILWAUKEE ELECTRIC TOOL CORPORATION, Brookfield, WI (US)

(72) Inventors: Steven W. Hyma, Milwaukee, WI (US); Matthew W. Naiva, Wauwatosa, WI (US); Derek Rose, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 15/758,930

(22) PCT Filed: Sep. 15, 2016

(86) PCT No.: PCT/US2016/051982
§ 371 (c)(1),
(2) Date: Mar. 9, 2018

(87) PCT Pub. No.: WO2017/048986
PCT Pub. Date: Mar. 23, 2017

(65) Prior Publication Data
US 2018/0250759 A1 Sep. 6, 2018

Related U.S. Application Data

(60) Provisional application No. 62/218,945, filed on Sep. 15, 2015.

(51) Int. Cl.
*B23D 21/08* (2006.01)
*B26D 3/16* (2006.01)
(Continued)

(52) U.S. Cl.
CPC ............ *B23D 21/08* (2013.01); *B25G 1/10* (2013.01); *B26D 3/169* (2013.01); *B25G 1/102* (2013.01); *B25H 3/006* (2013.01)

(58) Field of Classification Search
CPC ......... B23D 21/08; B26D 3/169; B26D 3/085
(Continued)

(56) References Cited

U.S. PATENT DOCUMENTS 1,393,156 A * 10/1921 Nonneman ............ B23D 21/10
30/98
2,697,875 A * 12/1954 McIver .................. B23D 21/08
30/101
(Continued)

FOREIGN PATENT DOCUMENTS

| CN | 102133658 | 7/2011 |
|----|-----------|--------|
| CN | 204183041 | 3/2015 |
| WO | WO2002002264 | 1/2002 |

OTHER PUBLICATIONS https://www.merriam-webster.com/dictionary/indicate.*
International Search Report and Written Opinion for Application No. PCT/US2016/051982 dated Jan. 9, 2017 (15 pages).

*Primary Examiner* — Laura M Lee
(74) *Attorney, Agent, or Firm* — Reinhart Boerner Van Deuren s.c.

(57) ABSTRACT

A cutter and a kit. The cutter, such as a close quarters cutter, is operable to cut a work piece extending along an axis and includes a cutting wheel, a roller, and a housing assembly supporting the cutting wheel and the roller for movement about the axis in a cutting direction to cut the work piece. The housing assembly has a generally cylindrical outer surface engageable by a user to pivot the cutter about the axis. A grip portion is provided on the outer surface and includes a plurality of grip members. Each grip member includes, relative to the cutting direction, a trailing surface and a leading surface extending from the outer surface. The leading surface may be angled toward the cutting direction.

14 Claims, 58 Drawing Sheets

(51) Int. Cl.
  *B25G 1/10* (2006.01)
  *B25H 3/00* (2006.01)

(58) Field of Classification Search
  USPC .............. 30/102; D8/60, 312; D21/308, 443
  See application file for complete search history.

(56) References Cited

U.S. PATENT DOCUMENTS

| | | | |
|---|---|---|---|
| 2,796,663 A | 6/1957 | Karnes | |
| 2,956,339 A | 10/1960 | Jonasson | |
| 3,347,118 A | 10/1967 | Gore et al. | |
| 3,757,823 A | 9/1973 | Knutson | |
| 3,783,901 A | 1/1974 | Schneider et al. | |
| 4,201,116 A | 5/1980 | Martin | |
| 4,485,846 A | 12/1984 | Neff | |
| 4,493,150 A | 1/1985 | Garcia et al. | |
| 4,596,271 A | 6/1986 | Brundage | |
| 4,831,732 A * | 5/1989 | Garton | B23D 21/08 30/101 |
| 5,285,576 A | 2/1994 | Taylor | |
| 5,366,202 A | 11/1994 | Lunzman | |
| 5,520,217 A | 5/1996 | Grawunde | |
| 5,605,289 A | 2/1997 | Maley et al. | |
| 5,632,258 A | 5/1997 | Tsuzuki et al. | |
| 5,865,156 A | 2/1999 | Feucht et al. | |
| 5,903,980 A * | 5/1999 | Collier | B23D 21/08 30/101 |
| 5,907,906 A * | 6/1999 | Sweeney | B23D 21/08 30/101 |
| 6,024,060 A | 2/2000 | Buehrle, II et al. | |
| 6,026,791 A | 2/2000 | Arnold | |
| 6,032,367 A | 3/2000 | Bonnette et al. | |
| 6,050,248 A | 4/2000 | Arulraja et al. | |
| 6,173,684 B1 | 1/2001 | Buehrle, II et al. | |
| 6,178,956 B1 | 1/2001 | Steinmann et al. | |
| 6,182,646 B1 | 2/2001 | Silberstein et al. | |
| 6,345,444 B1 * | 2/2002 | Gillet | B23D 21/08 30/101 |
| D459,963 S * | 7/2002 | Usbeck | D8/41 |
| D464,244 S | 10/2002 | Lira-Nunez | |
| 6,601,821 B2 | 8/2003 | Tyler | |
| 7,007,391 B2 * | 3/2006 | Stoick | B26D 3/169 30/101 |
| D556,528 S * | 12/2007 | Huang | D8/60 |
| 7,406,769 B1 * | 8/2008 | Toussaint | B23D 21/04 30/101 |
| 7,743,510 B2 | 6/2010 | Lazarevic | |
| D640,520 S | 6/2011 | Rampling | |
| 8,573,099 B2 | 11/2013 | Huang | |
| 8,601,697 B2 * | 12/2013 | Whittaker | B26D 3/169 30/101 |
| 8,800,151 B2 | 8/2014 | Lee | |
| D756,185 S * | 5/2016 | Lehoux | D8/51 |
| D808,756 S | 1/2018 | Hyma et al. | |
| 10,052,701 B2 * | 8/2018 | Zhou | B23D 21/08 |
| 10,059,018 B2 * | 8/2018 | Zhou | B26B 25/005 |
| 2006/0085987 A1 | 4/2006 | Gordon | |
| 2006/0090385 A1 * | 5/2006 | Jurkovic | G09F 13/16 40/582 |
| 2007/0180701 A1 * | 8/2007 | Hutt | B23D 21/08 30/95 |
| 2010/0088898 A1 | 4/2010 | Thorson et al. | |
| 2011/0179649 A1 * | 7/2011 | Park | B23D 21/04 30/95 |
| 2012/0023752 A1 * | 2/2012 | Rampling | B26D 3/169 30/102 |
| 2012/0247286 A1 * | 10/2012 | Huang | B23D 21/08 82/60 |
| 2017/0173710 A1 * | 6/2017 | Zhou | B23D 21/08 |
| 2018/0194029 A1 * | 7/2018 | Zhou | B26B 25/005 |
| 2018/0290323 A1 * | 10/2018 | Xie | B26D 3/169 |
| 2018/0297227 A1 * | 10/2018 | Jenkins | B23D 21/08 |

\* cited by examiner

14A →

14C →

14C →

US 10,919,098 B2

CUTTER AND KIT

RELATED APPLICATION

The present application is a national stage filing under 35 U.S.C. 371 of International Application No. PCT/US2016/051982, filed Sep. 15, 2016, which claims priority to U.S. Provisional Patent Application No. 62/218,945, filed Sep. 15, 2015, the entire contents of both which is are hereby incorporated by reference.

FIELD

The present invention generally relates to cutters and, more specifically, to a close quarters cutter and a kit of cutters, accessories and/or parts.

SUMMARY

Cutters and, more specifically, close quarters cutters, are employed for cutting thin walled cylindrical work pieces. Typically, the cutters include a housing defining an opening for receiving a work piece. The housing pivotally supports a pair of spaced rollers for supporting a work piece to be cut and a cutting wheel for cutting the work piece by rotating the housing relative to the work piece. The cutting wheel is biased by, for example, a spring member that automatically progressively advances the cutting wheel towards the rollers and into engagement with the work piece as the housing is rotated, creating a score line about the work piece that is incrementally deepened until the work piece is eventually severed into two lengths.

During cutting of the work piece, material is displaced as the score line is created. The displaced material creates an annular ridge adjacent the score line that has a greater diameter than the outer surface of the work piece. This displaced material can urge the rollers away from the outer surface and impede rotation of the cutter around the work piece.

Often the work piece that is cut is a pipe or conduit containing a fluid, such as water. The housing of the cutter is typically made of two halves that, when connected, define a cavity in which the rollers, the cutting wheel, and the spring member are at least partially contained. Once the pipe is cut, the water in the pipe may enter the cavity of the cutter. This water may remain in the cavity and cause corrosion or degradation of the rollers, the cutting wheel, the spring member, etc.

In one independent aspect, a cutter, such as a close quarters cutter, is operable to cut a work piece extending along an axis. The cutter may generally include a cutting wheel selectively engageable with and operable to cut the work piece; and a housing assembly supporting the cutting wheel for movement about the axis in a cutting direction to cut the work piece, the housing assembly having a generally cylindrical outer surface engageable by a user to pivot the cutter about the axis, a grip portion being on the outer surface and including a plurality of grip members, each grip member including, relative to the cutting direction, a trailing surface and a leading surface extending from the outer surface, the leading surface being angled toward the cutting direction.

In another independent aspect, a cutter may generally include a cutting wheel selectively engageable with and operable to cut the work piece; and a housing assembly supporting the cutting wheel for movement about the axis, the housing assembly including a generally cylindrical outer wall and side walls defining an opening receiving the work piece, the outer wall and the side walls cooperating to define a cavity in which the cutting wheel is at least partially supported, the housing assembly defining a plurality of circumferentially-spaced openings communicating between the cavity and an exterior of the cutter.

In yet another independent aspect, a cutter may generally include a housing assembly; a cutting wheel supported by the housing assembly for movement about the axis, the cutting wheel being selectively engageable with and operable to cut the work piece; a roller selectively engageable with the work piece, the roller having a generally cylindrical roller surface and an annular groove having a concave surface extending into the roller surface.

In still yet another independent aspect, a cutter kit may generally include a first cutter including a first cutting wheel selectively engageable with and operable to cut a first work piece, and a first housing assembly supporting the first cutting wheel for movement about an axis, the first housing assembly having a first outer surface and defining a first opening operable to receive the first work piece; a second cutter including a second cutting wheel selectively engageable with and operable to cut a second work piece, and a second housing assembly supporting the second cutting wheel for movement about an axis, the second housing assembly having a second outer surface and defining a second opening operable to receive the second work piece; and a case assembly including a first receptacle having a first wall defining a first recess to receive the first cutter and a first post positionable in the first opening, the first wall and the first post cooperating to releasably retain the first cutter, and a second receptacle having a second wall defining a second recess to receive the second cutter and a second post positionable in the second opening, the second wall and the second post cooperating to releasably retain the second cutter.

Other independent features and independent aspects of the invention will become apparent by consideration of the following detailed description, claims and accompanying drawings.

BRIEF DESCRIPTION OF THE DRAWINGS

The application file contains at least one drawing executed in color.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
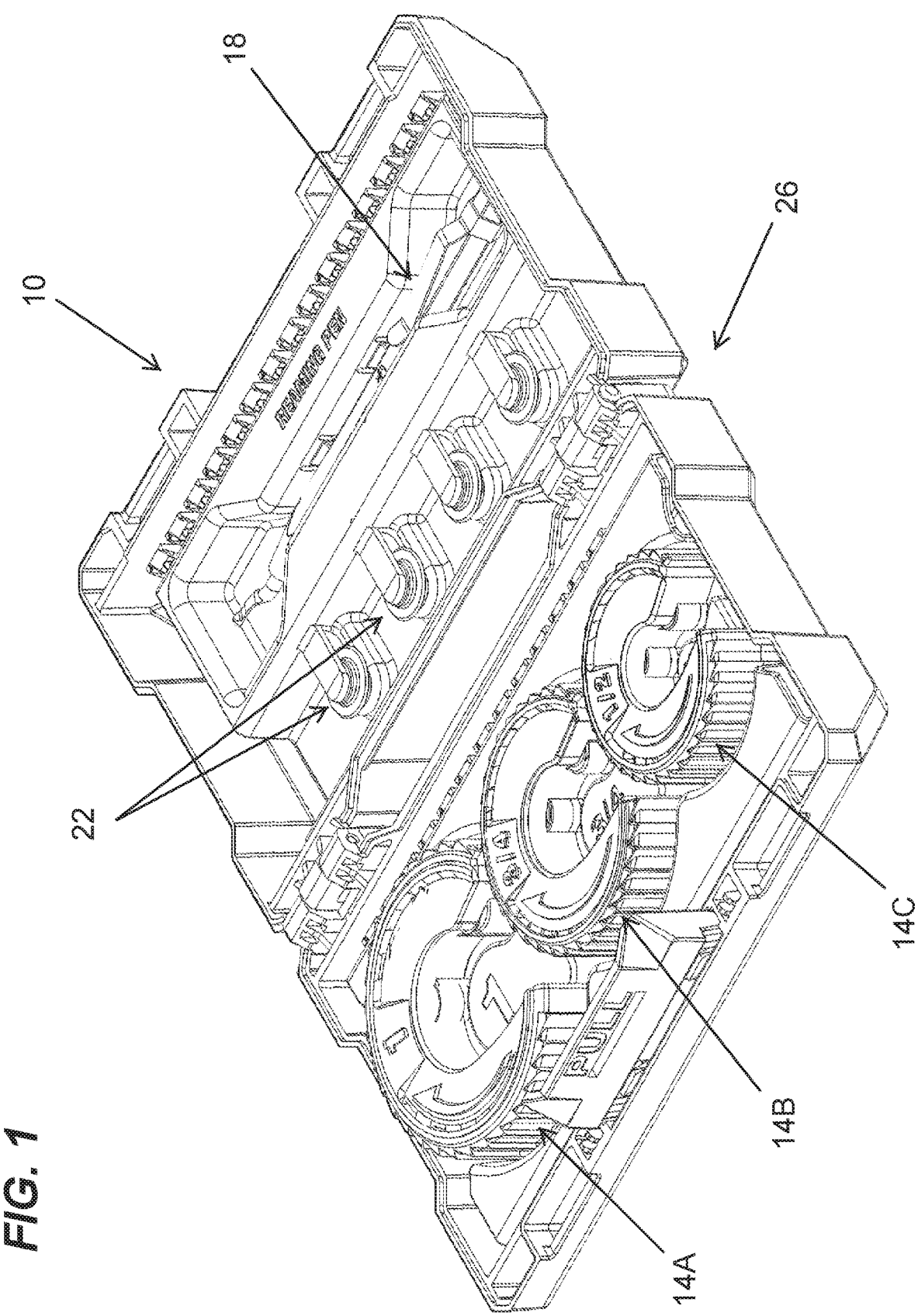
FIG. 1 is a front perspective view of kit of cutters, accessories and or parts.
Figure 2:
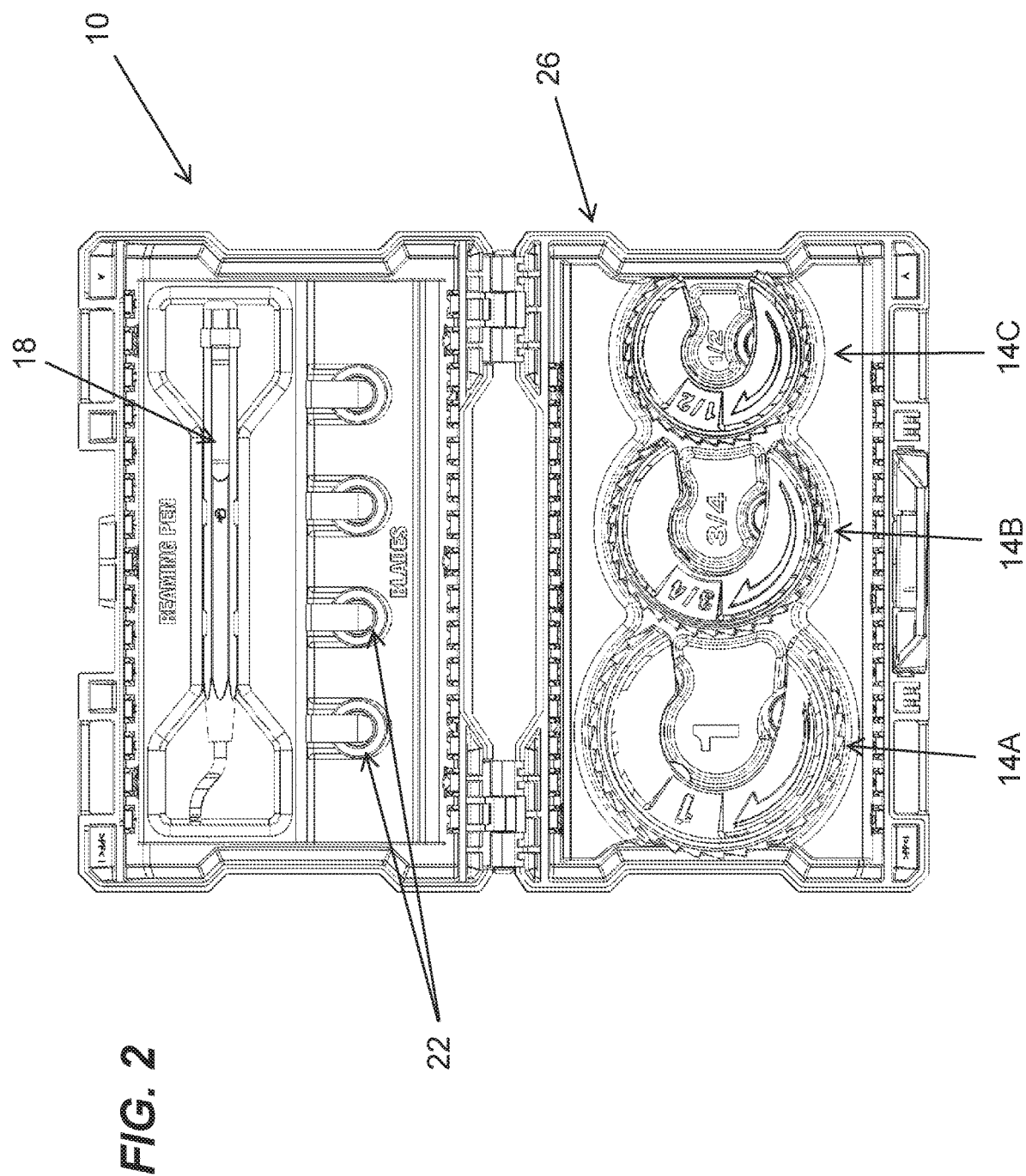
FIG. 2 is a top view of the kit of FIG. 1.

FIGS. 1-2 illustrate a kit 10 including one or more cutter(s) 14A, 14B, 14C . . . 14n, cutting accessories (e.g., a reamer pen 18) and/or parts (e.g., one or more replacement blade(s) 22). The kit 10 includes a case assembly 26 operable to support the cutter(s) 14A . . . 14n, accessories and/or parts. In the illustrated construction, the kit 10 includes cutters 14A-14C for cutting tubing, pipes, other work pieces, etc. of various sizes (e.g., 1", ¾", ½", as shown in FIGS. 1-2). In other constructions (not shown), the kit 10 may include fewer or more cutters, cutters with different characteristics (e.g., size, material to be cut, etc.), different (in number or type) accessories and/or parts.

FIGS. 3-18 illustrate one construction of the cutter 14A, such as a close quarters cutter for a 1" work piece. FIGS. 19-32 and 33-46 illustrate alternative constructions of the cutter 14B, 14C (e.g., for a ¾" work piece and for a ½" work piece, respectively), and common elements have the same reference number "B" and "C", respectively. FIGS. 49A-49D and 50A-50B illustrate additional alternative constructions of a cutter 14D, 14E, and common elements have the same reference number "D" and "E", respectively.

As shown in FIGS. 3-18, each cutter 14 includes a cutting wheel 30, one or more rollers 34, and a housing assembly 38 supporting the cutting wheel 30 and the roller(s) 34 for movement about (see FIG. 47B) the axis A of a work piece W in a cutting direction D to cut the work piece W.

Figure 3:
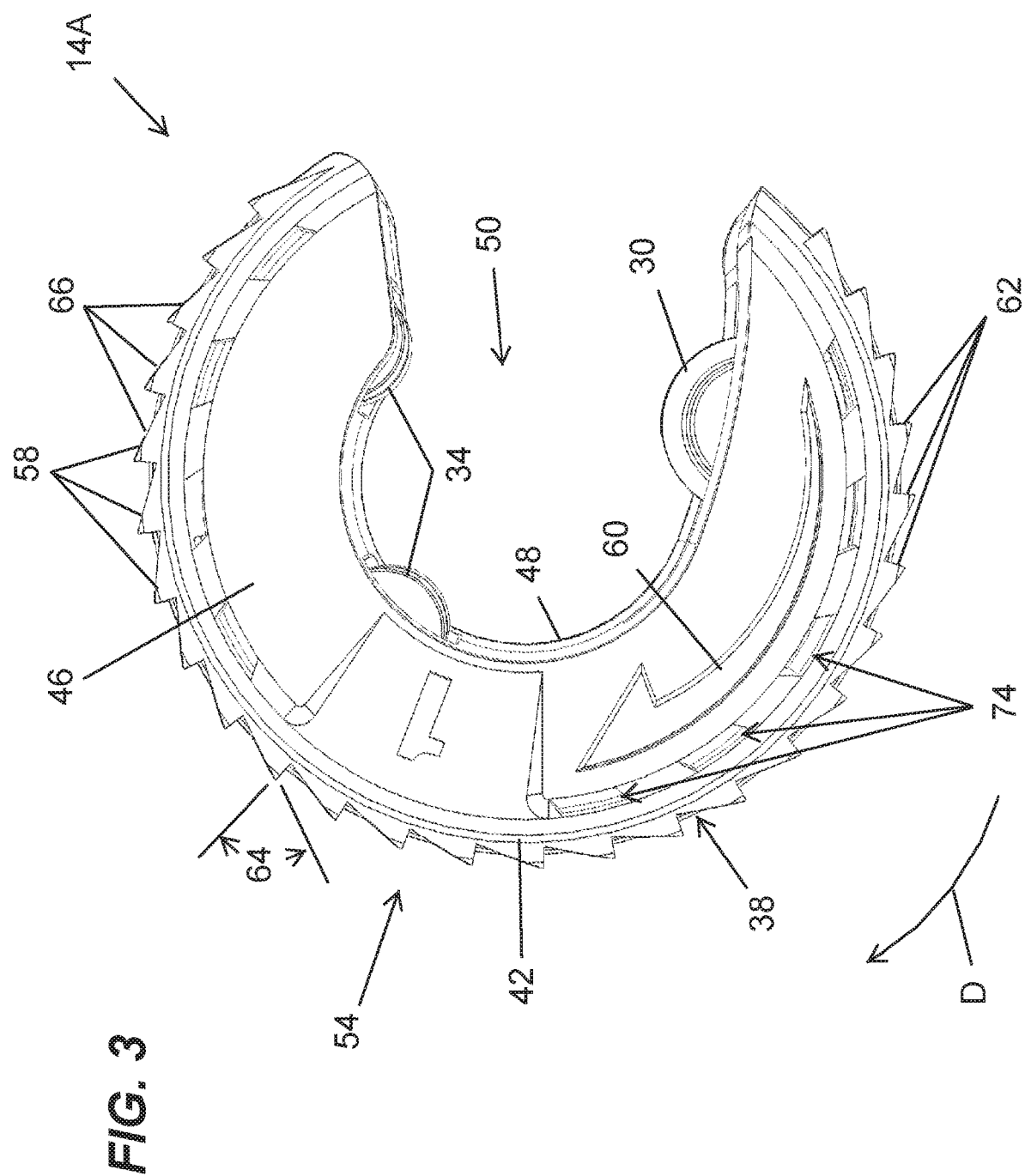
FIG. 3 is a view of one side of a cutter, such as a close quarters cutter.
Figure 4:
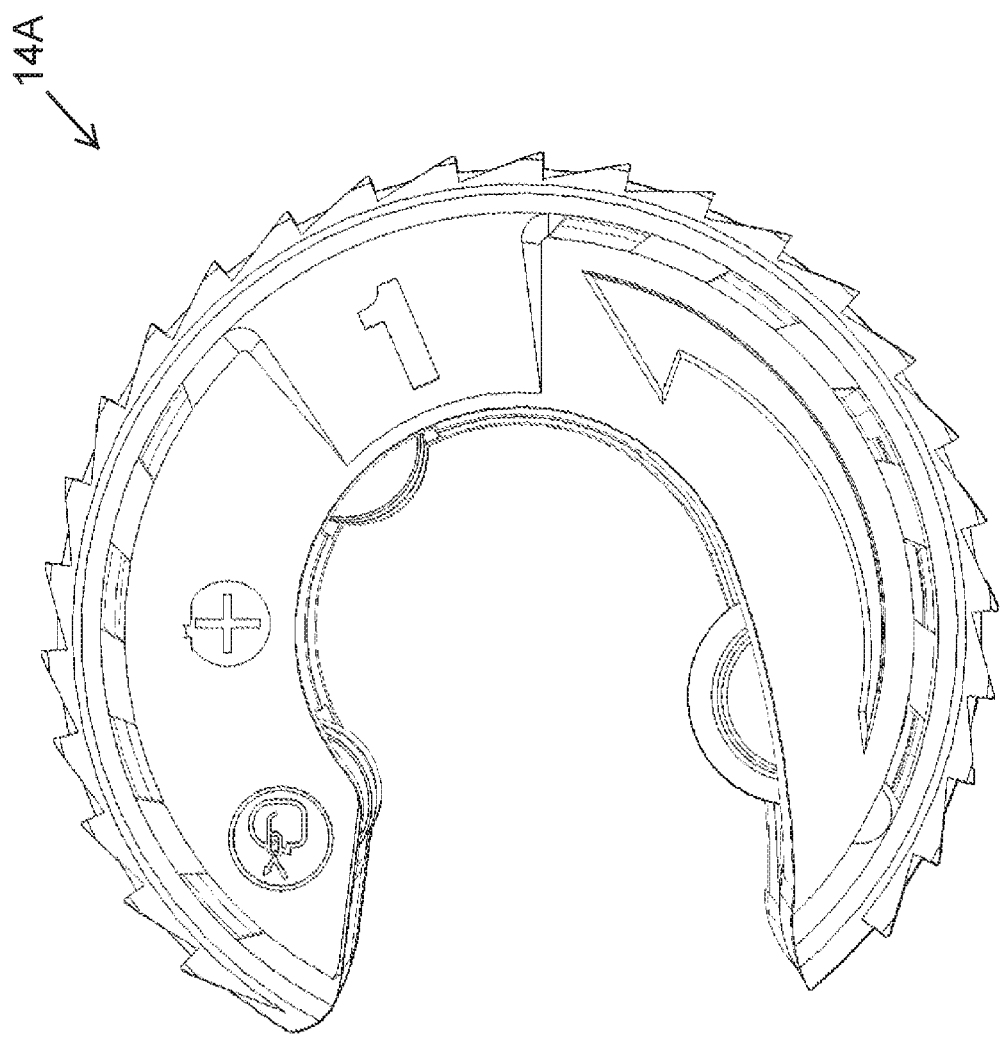
FIG. 4 is a view of the other side the cutter of FIG. 3.
Figure 5:
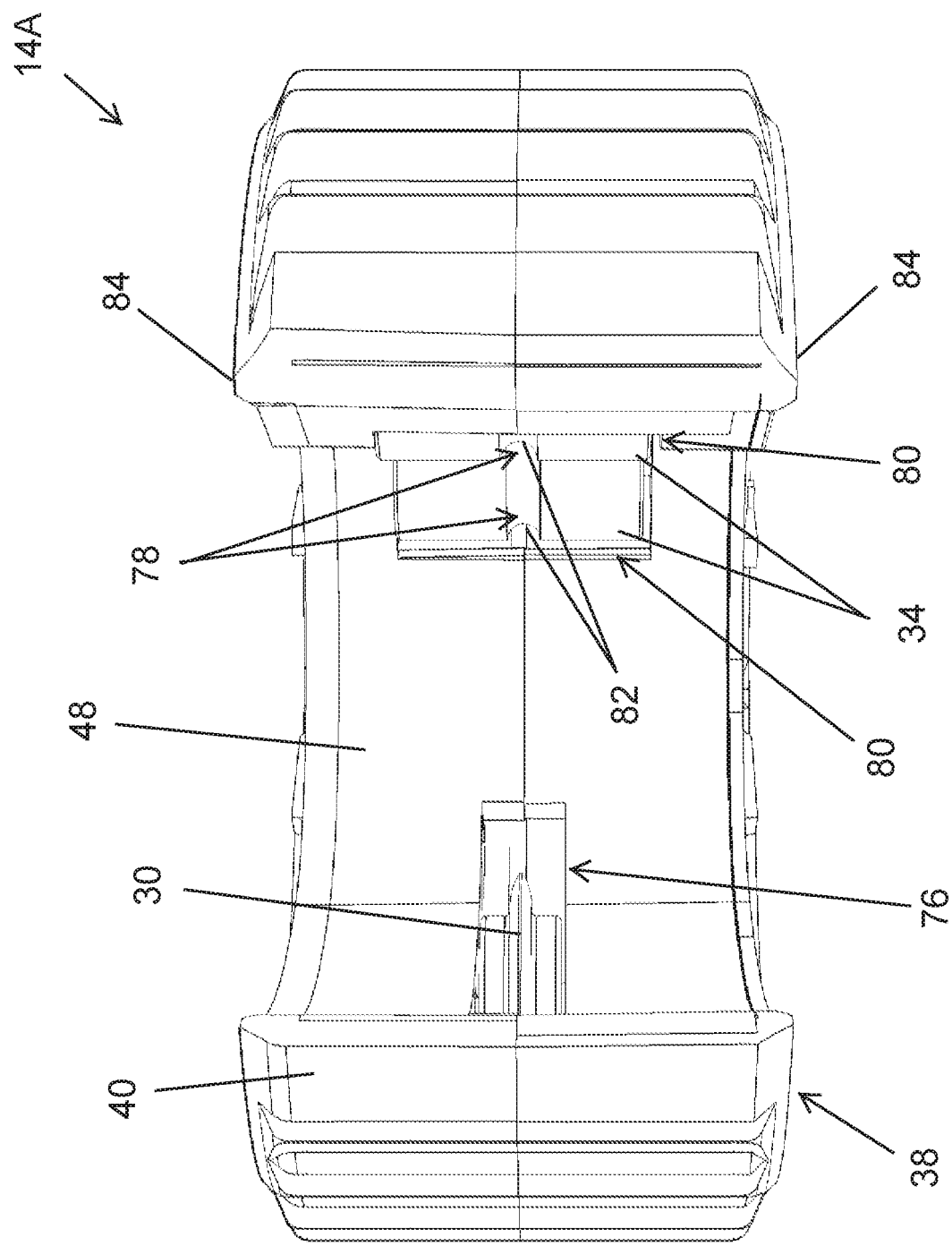
FIG. 5 is a front view of the cutter of FIG. 3.
Figure 6:
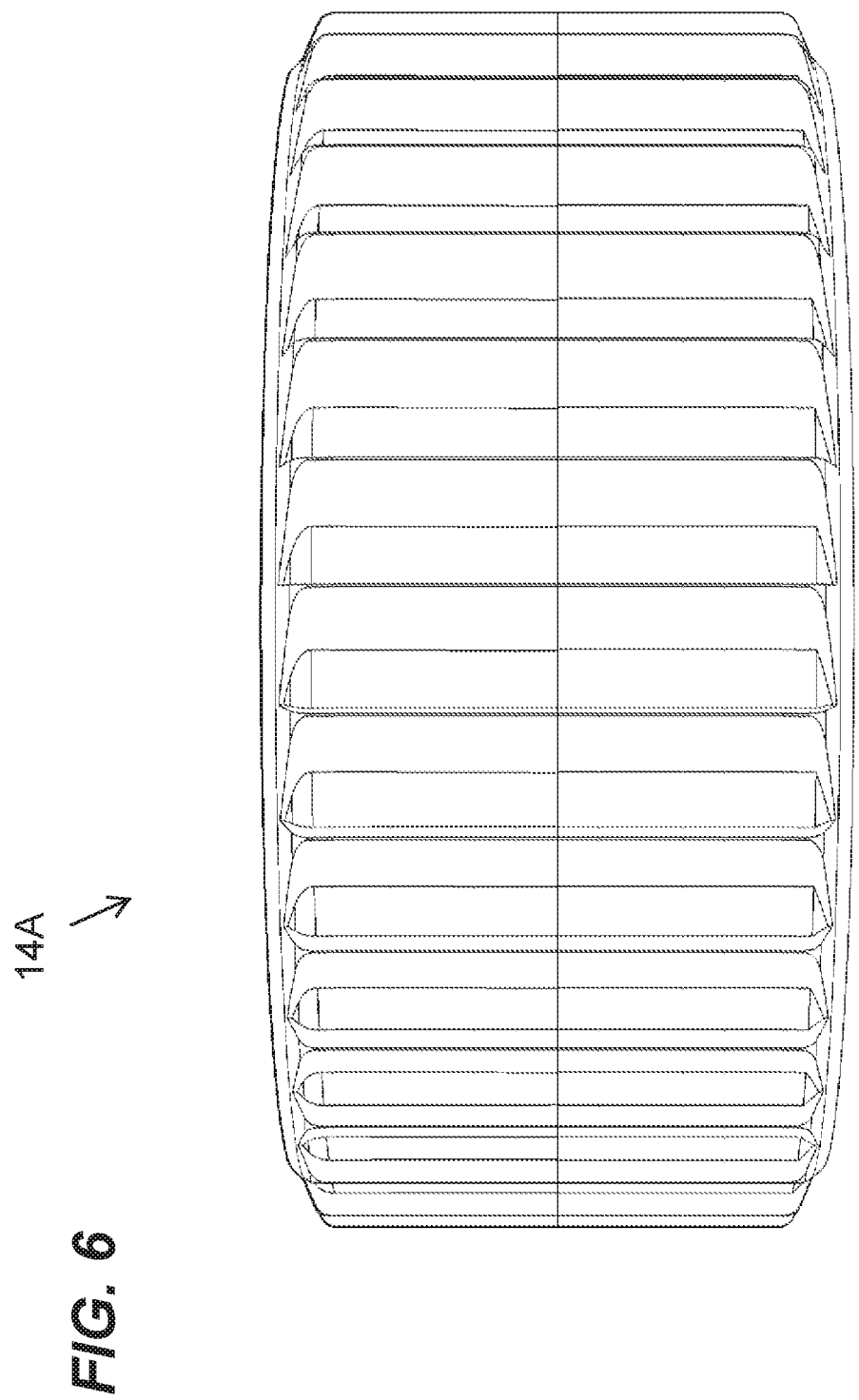
FIG. 6 is a rear view of the cutter of FIG. 3.
Figure 7:
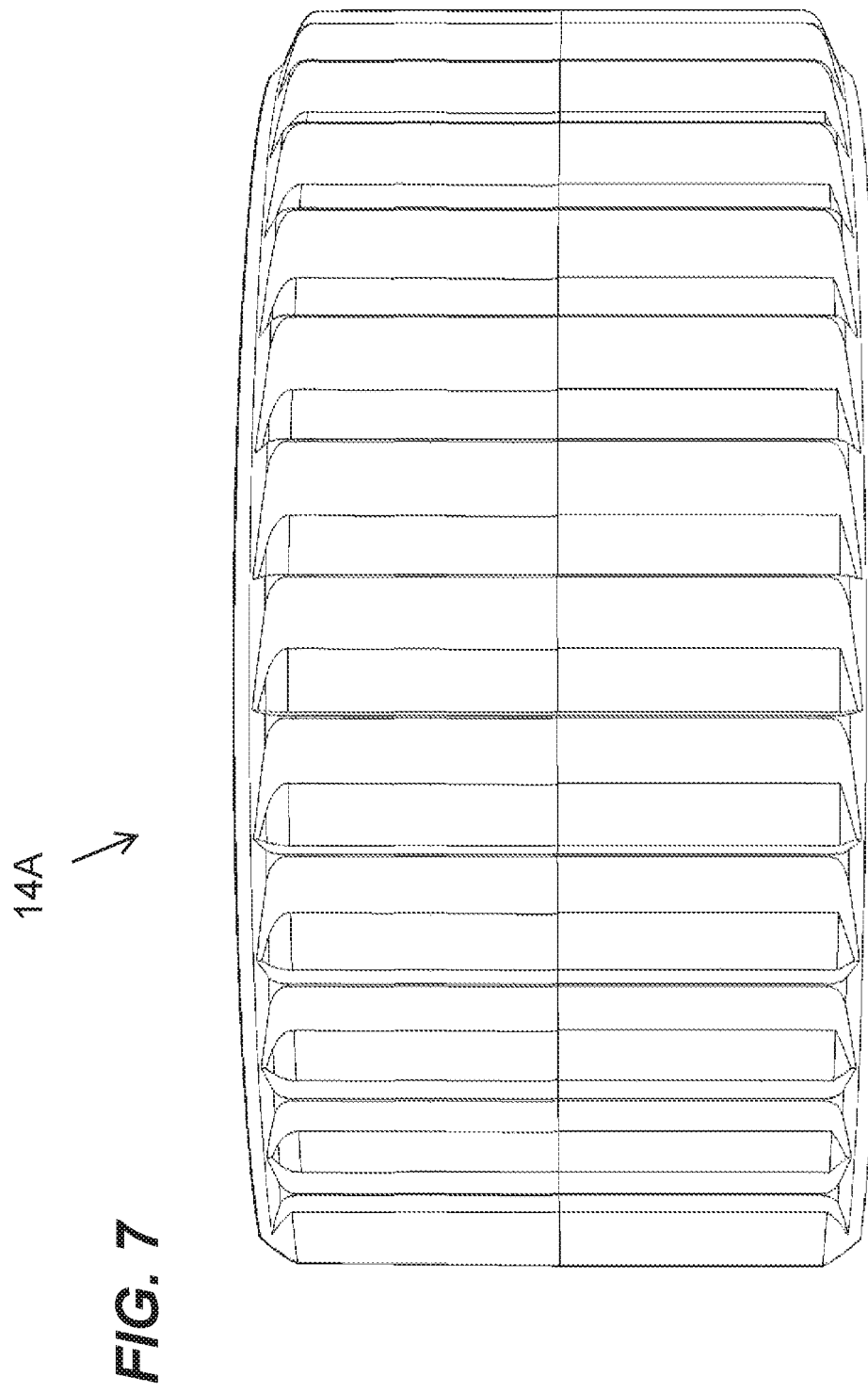
FIG. 7 is a bottom view of the cutter of FIG. 3.
Figure 8:
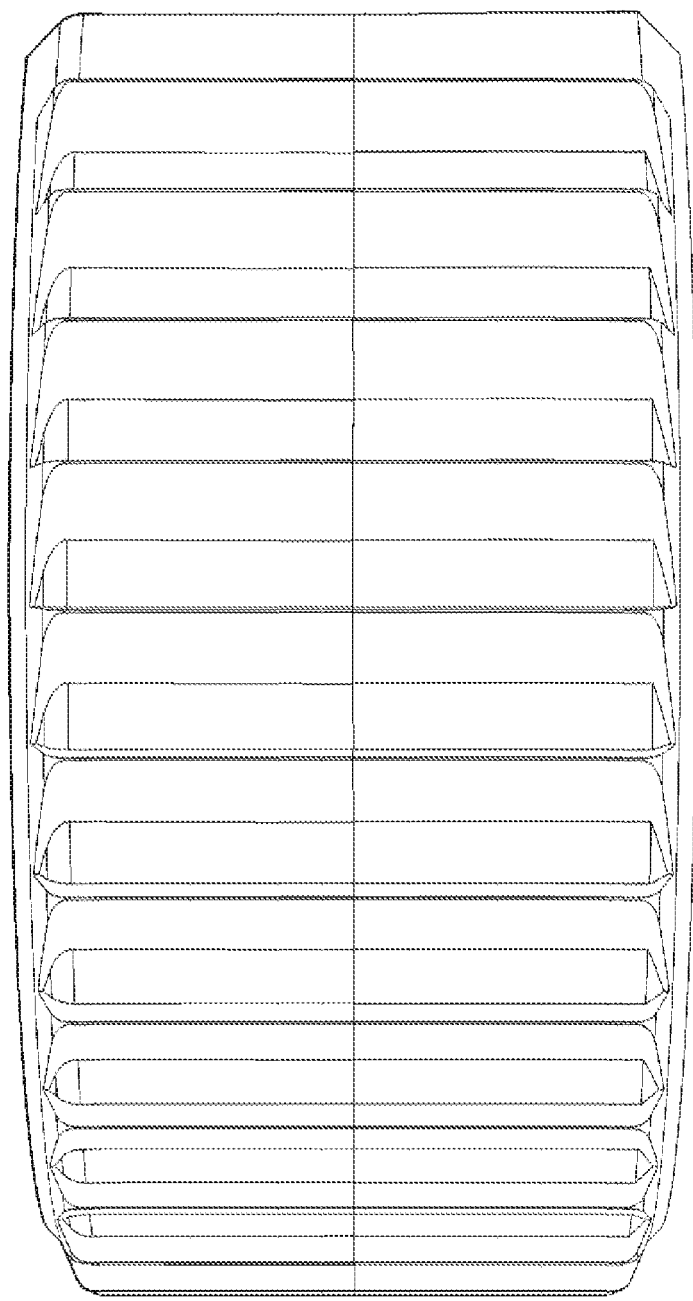
FIG. 8 is a top view of the cutter of FIG. 3.
Figure 9:
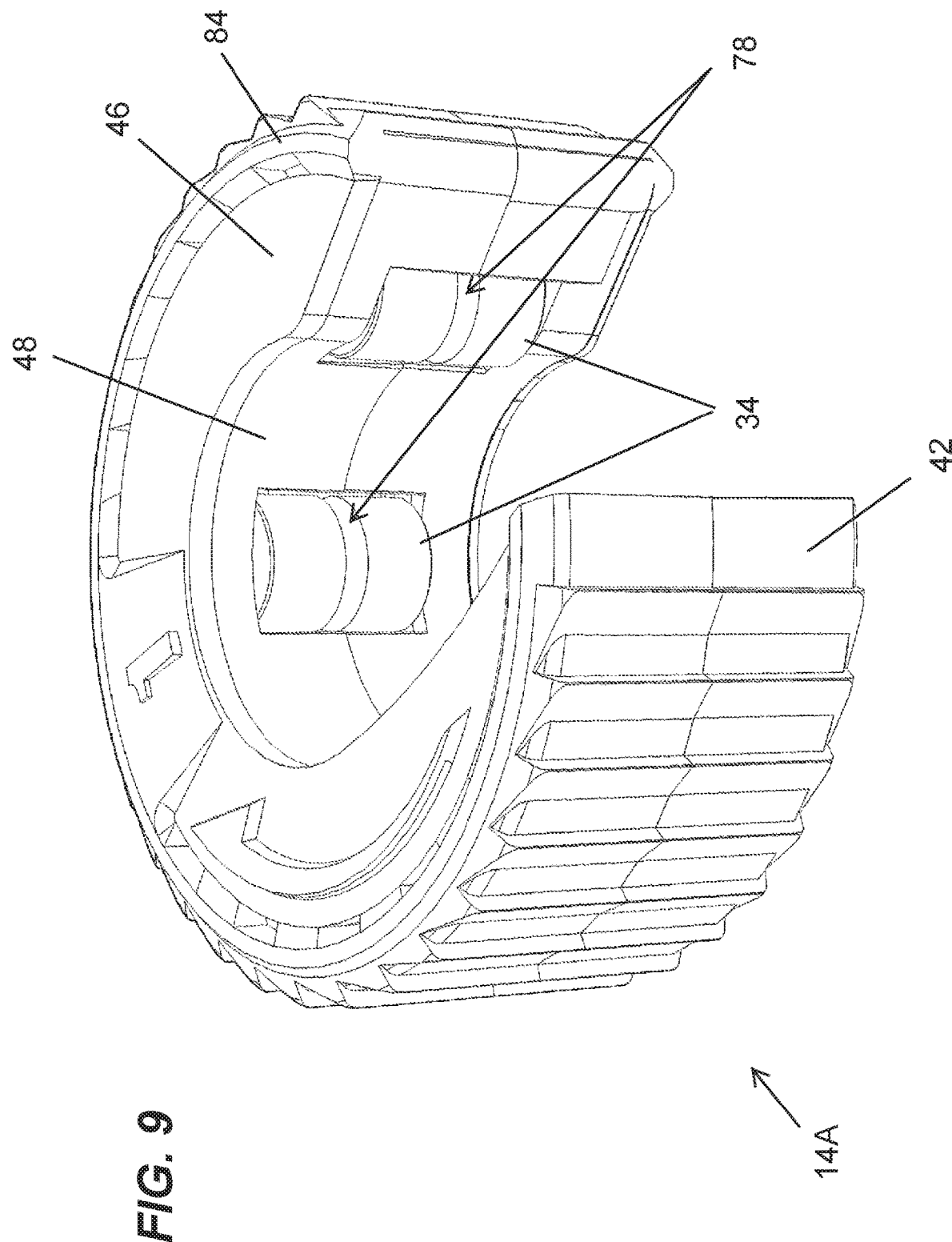
FIG. 9 is a front bottom perspective view of the cutter of FIG. 3.
Figure 10:
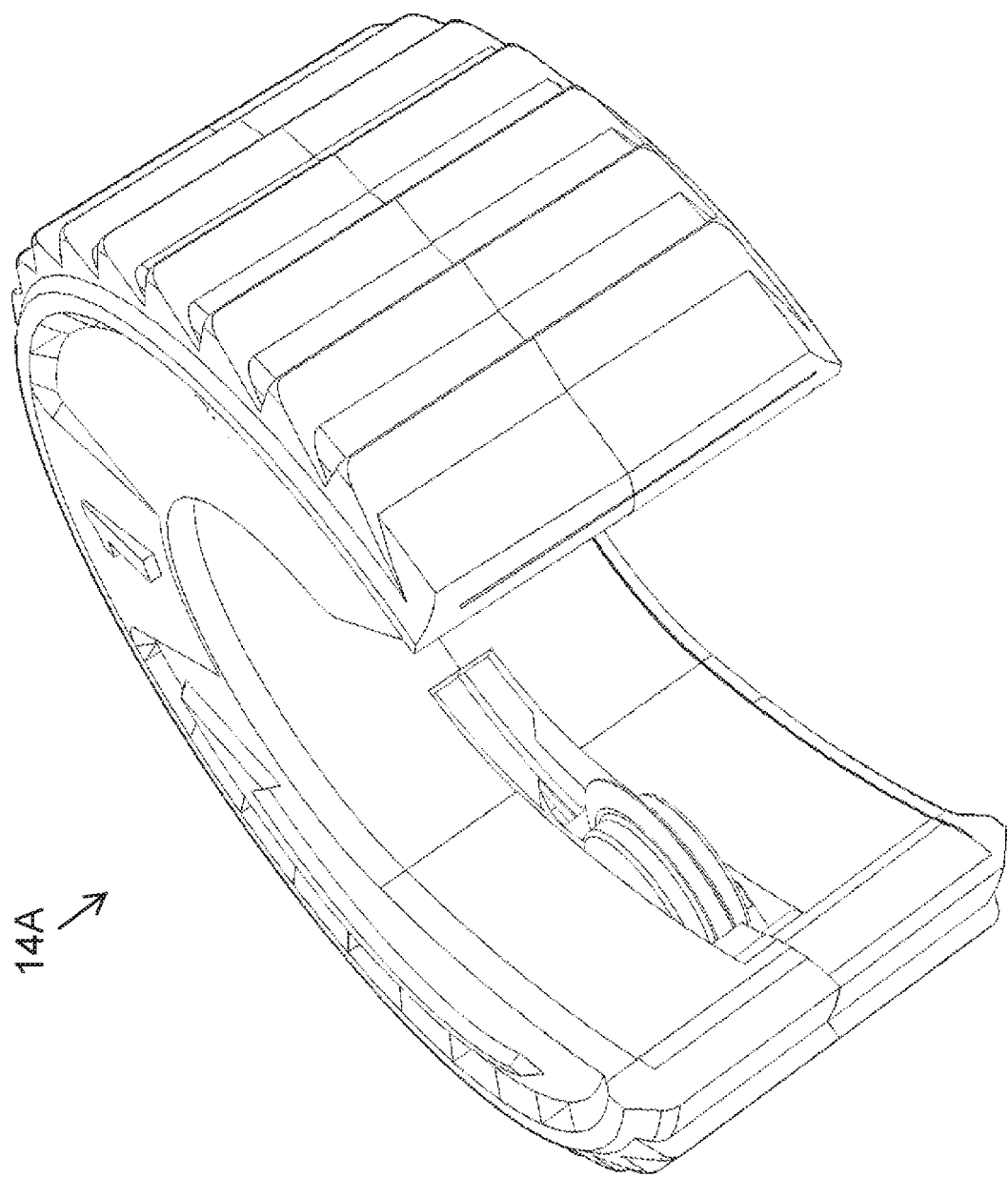
FIG. 10 is a front top perspective view of the cutter of FIG. 3.
Figure 11:
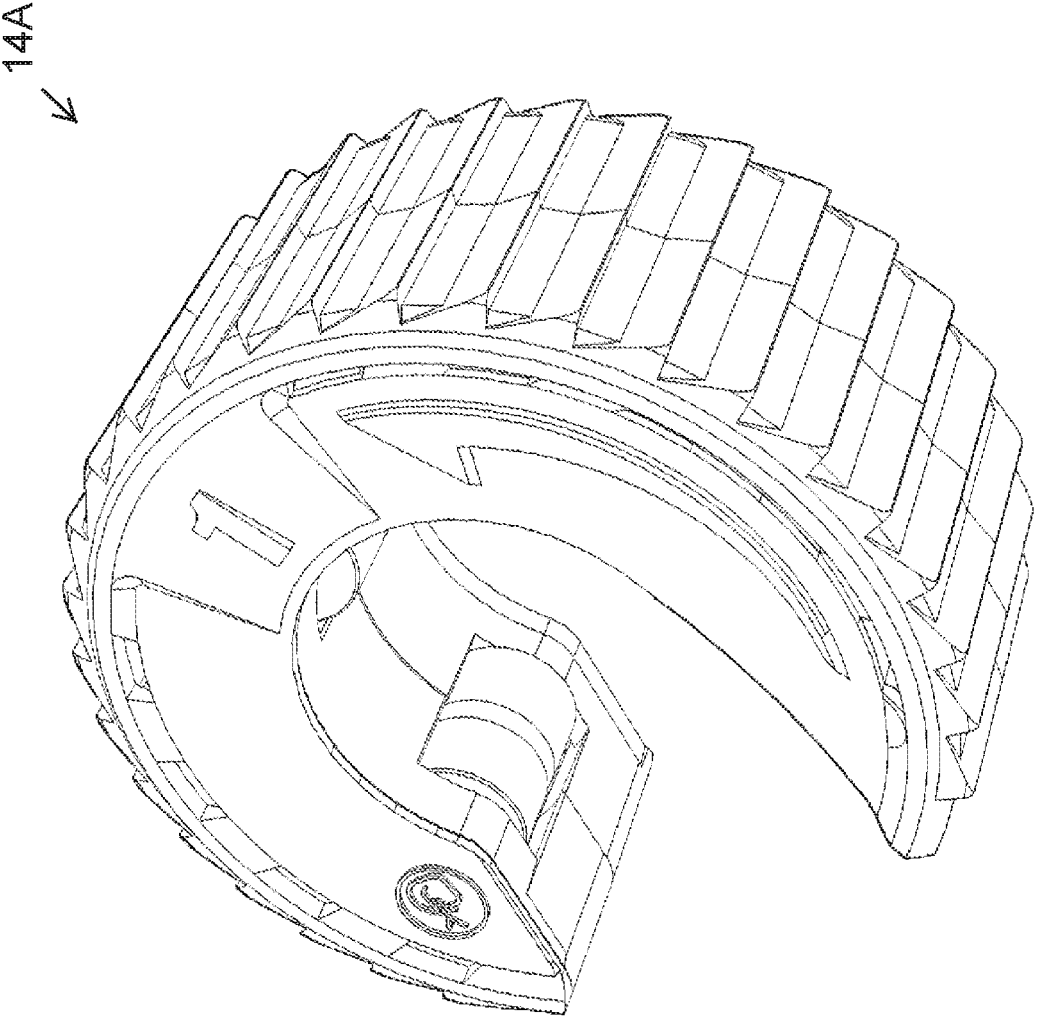
FIG. 11 is a rear top perspective view of the cutter of FIG. 3.
Figure 12:
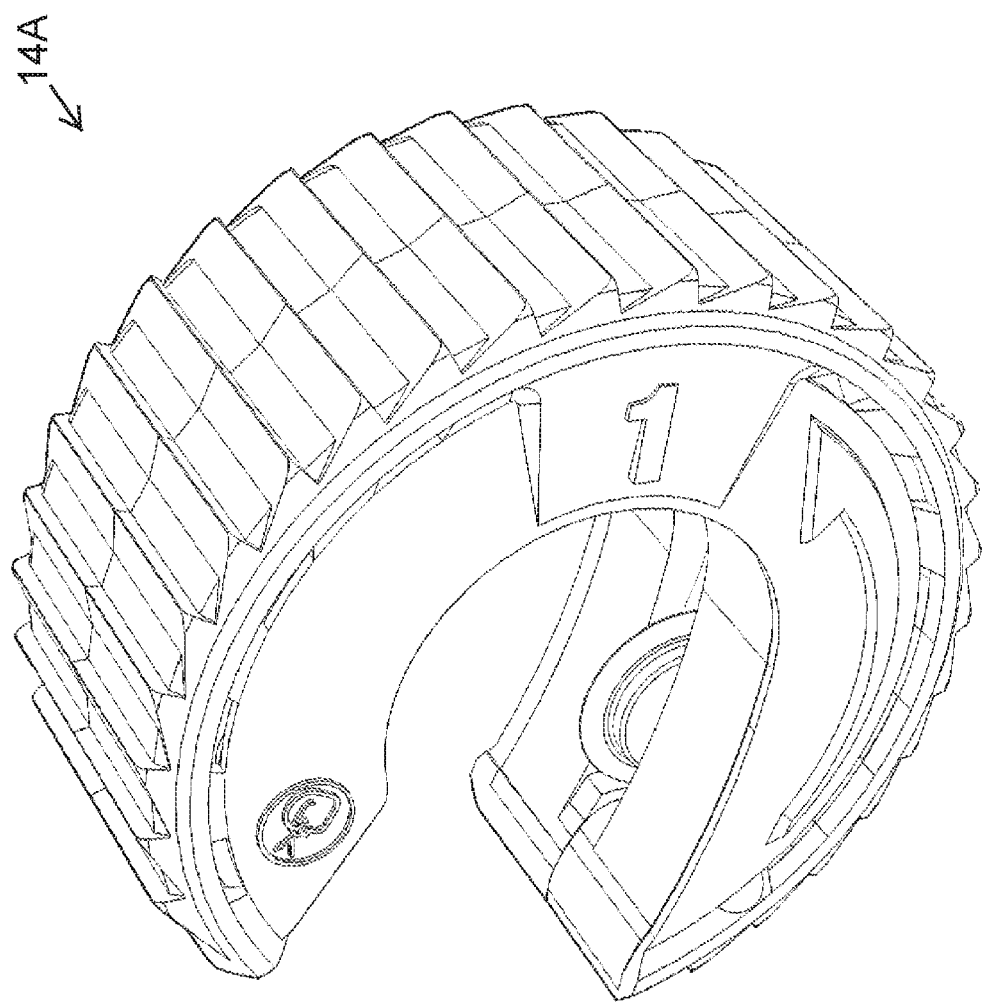
FIG. 12 is a rear bottom perspective view of the cutter FIG. 3.
Figure 13:
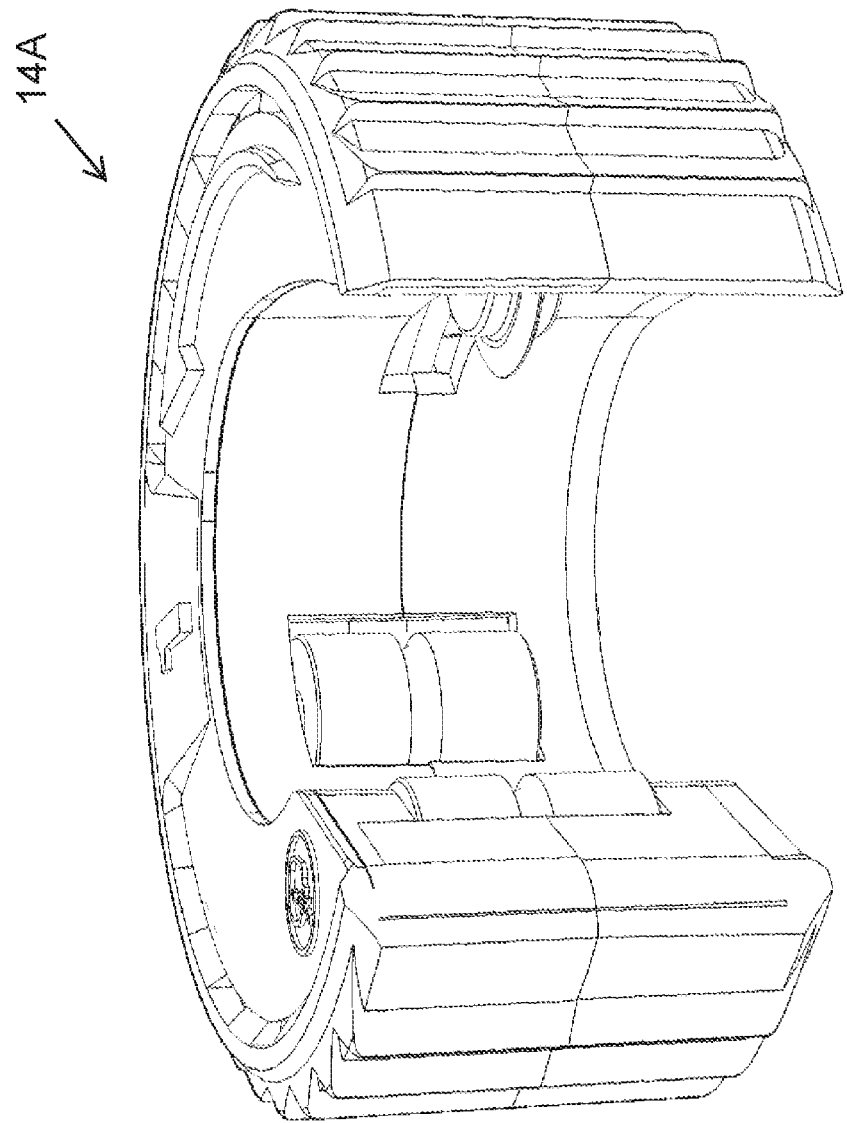
FIG. 13 is a front perspective view of the cutter of FIG. 3.
Figure 14:
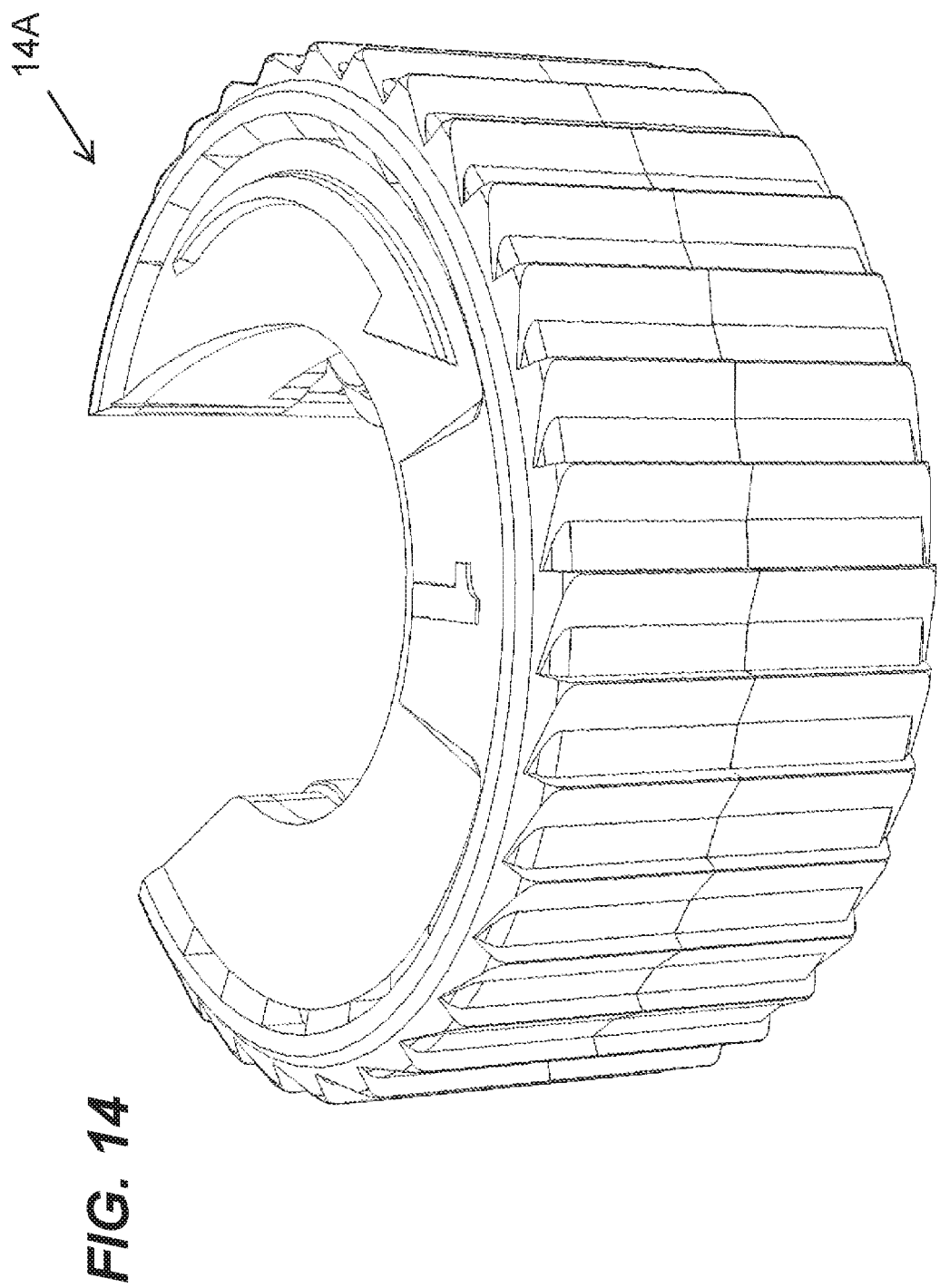
FIG. 14 is a rear perspective view of the cutter of FIG. 3.
Figure 15:
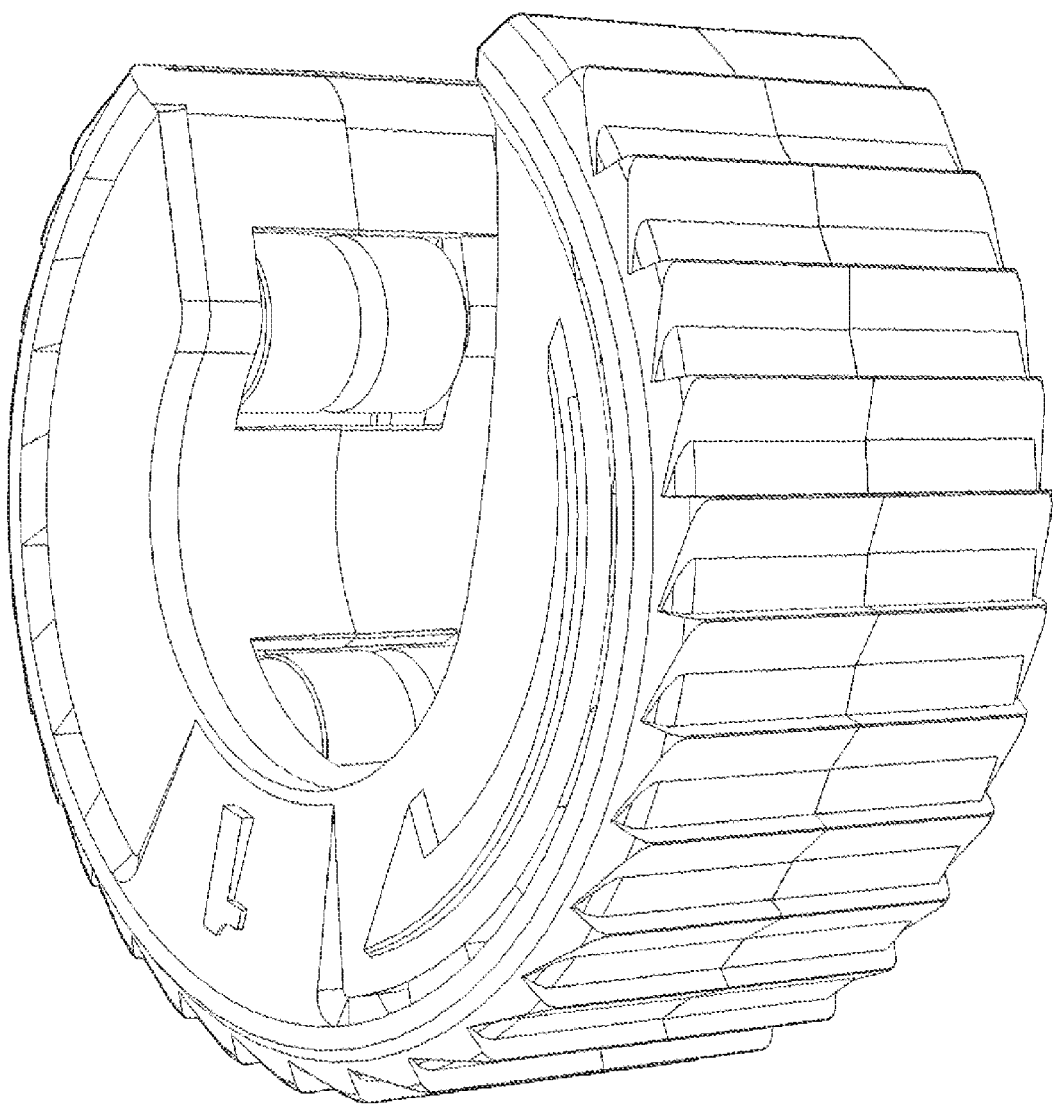
FIG. 15 is a top perspective view of the cutter of FIG. 3.
Figure 16:
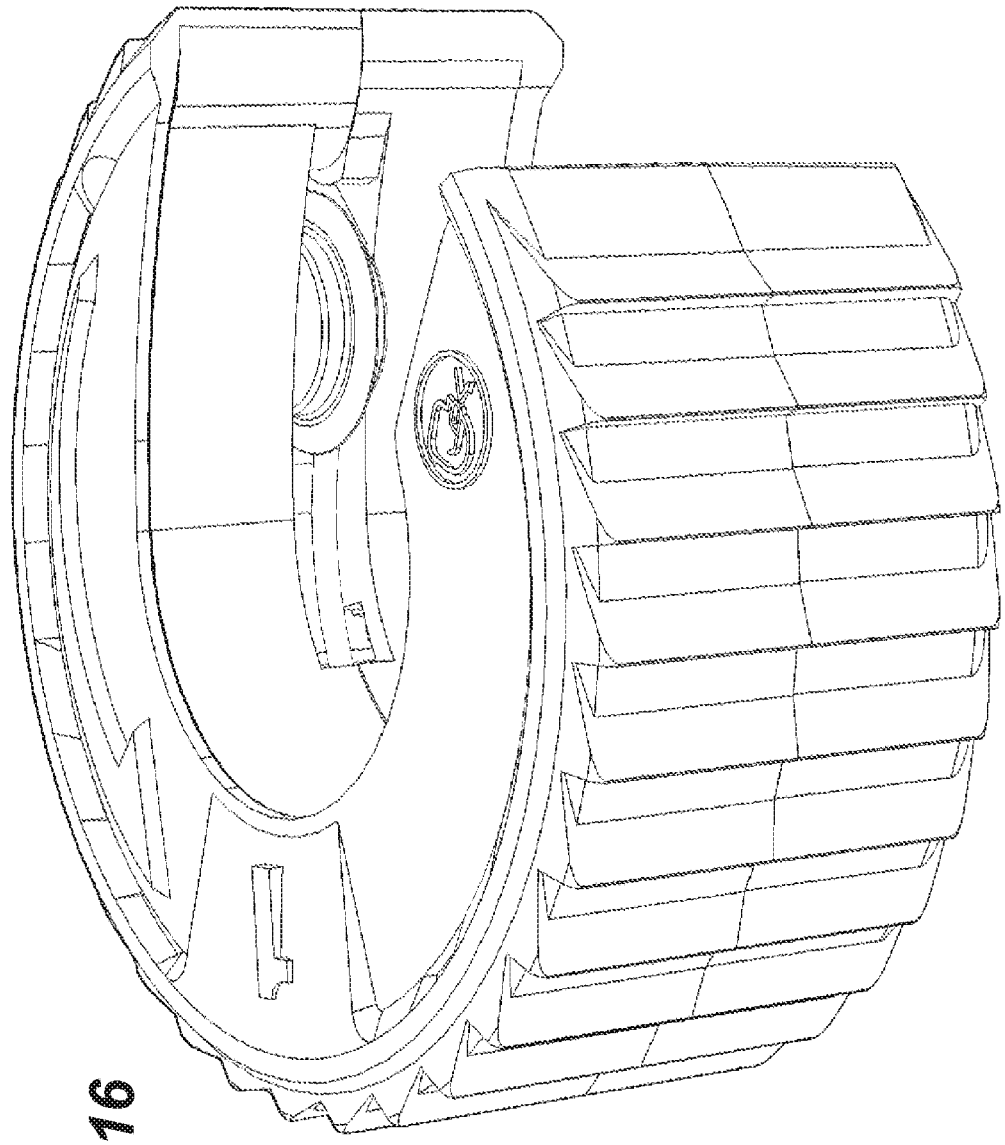
FIG. 16 is a bottom perspective view of the cutter of FIG. 3.
Figure 17:
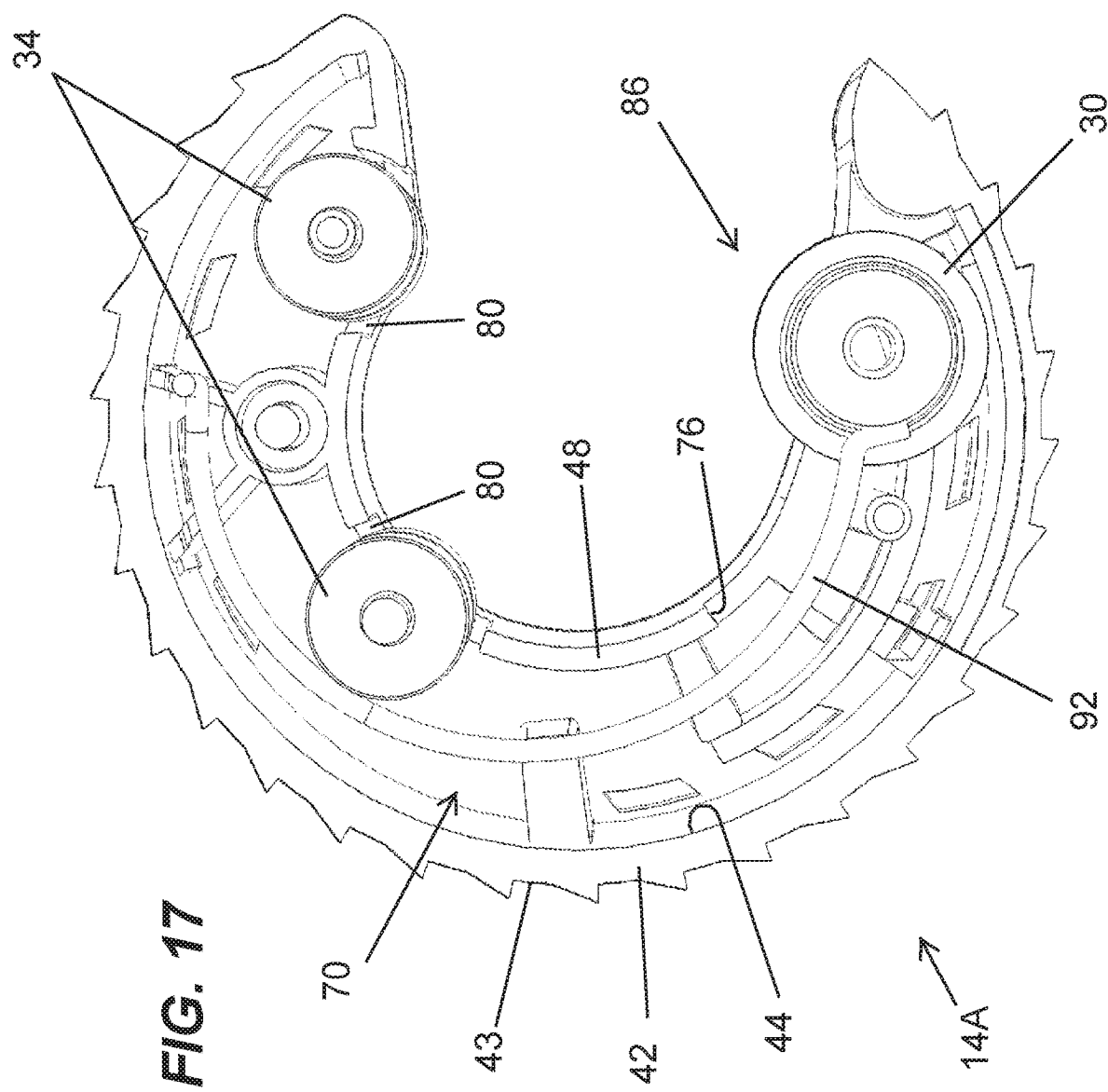
FIG. 17 is a side view of the cutter of FIG. 3 with a housing portion removed to illustrate a cutting mechanism.
Figure 18:
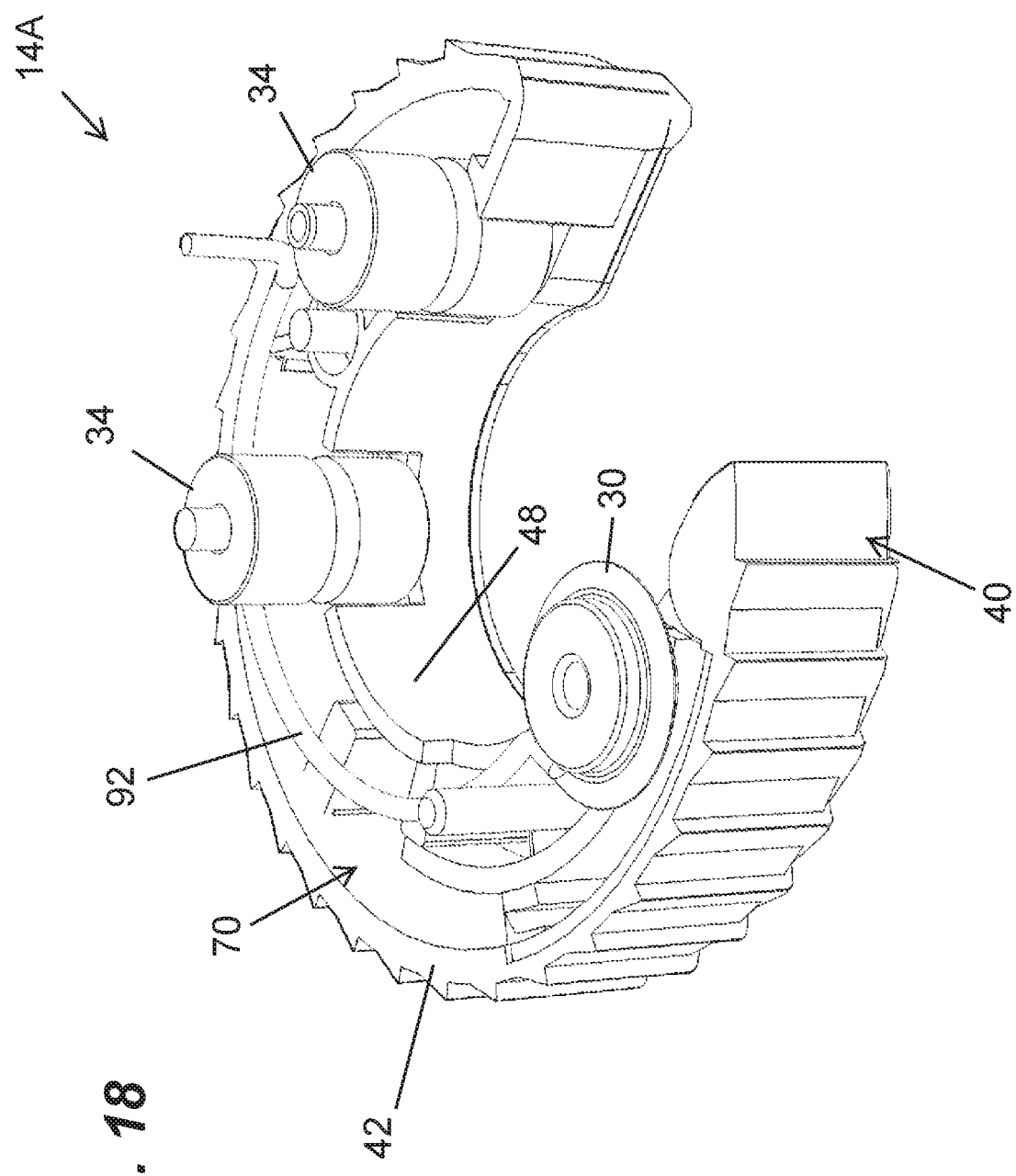
FIG. 18 is a top perspective view of the cutter as shown in FIG. 17.
Figure 19:
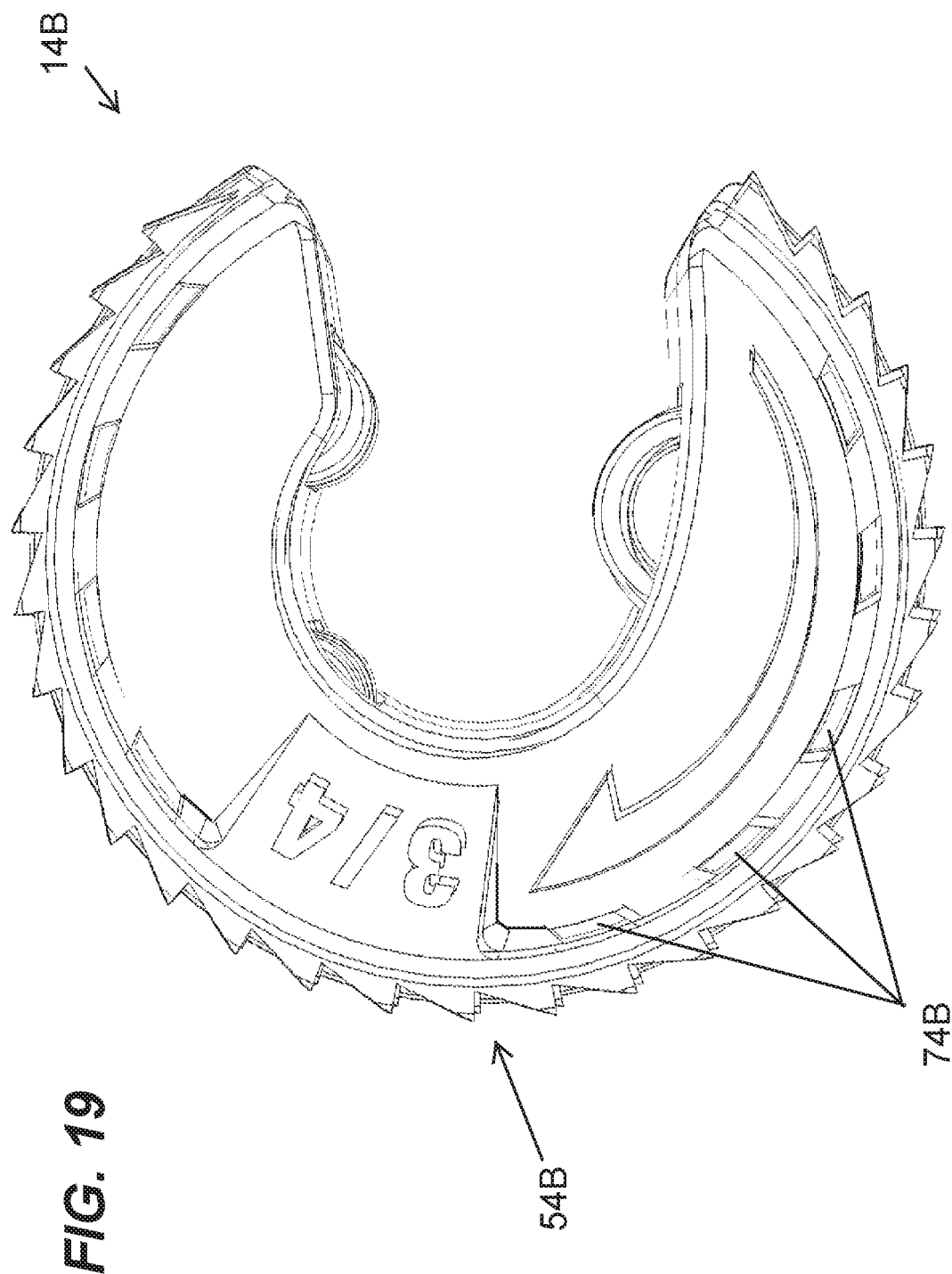
FIG. 19 is a view of one side of an alternative construction of a cutter, such as a close quarters cutter.
Figure 20:
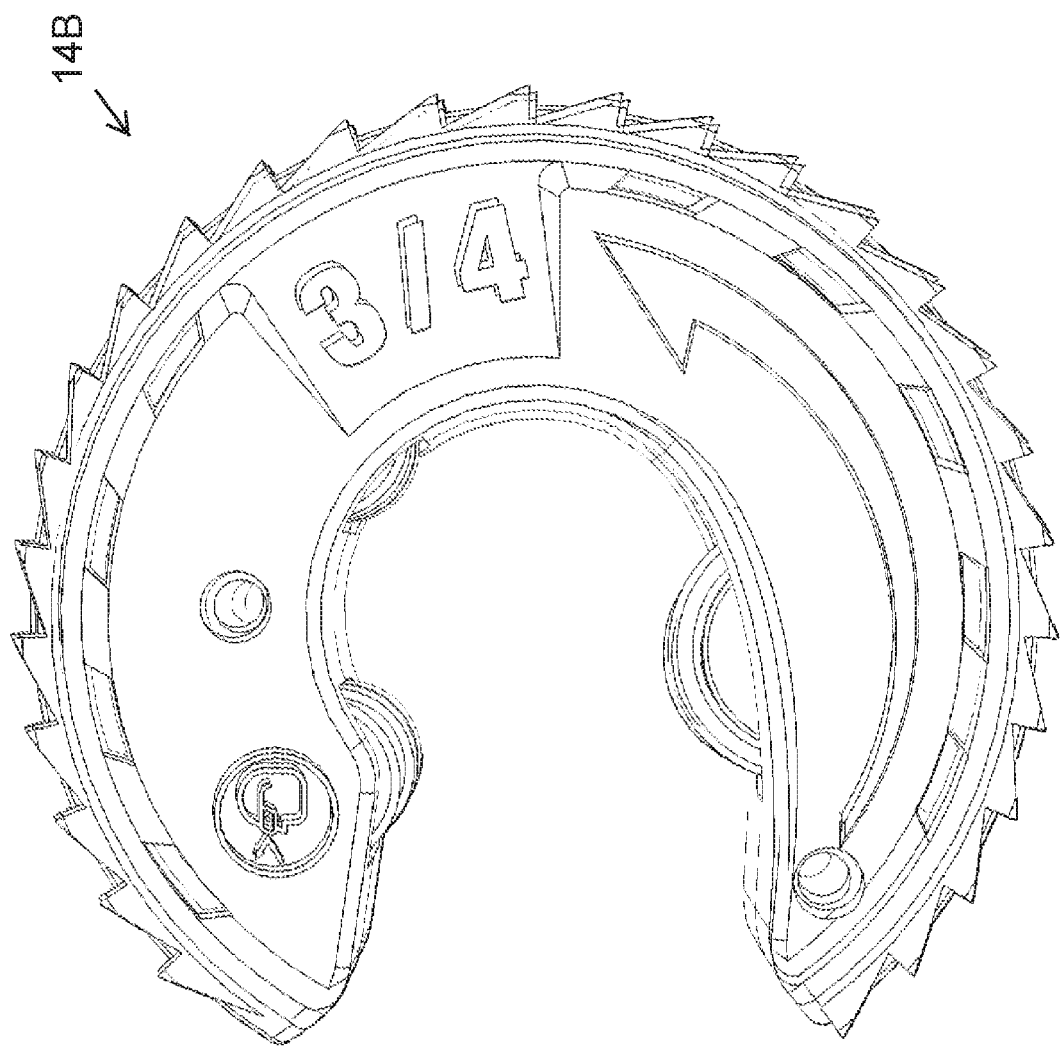
FIG. 20 is a view of the other side the cutter of FIG. 19.
Figure 21:
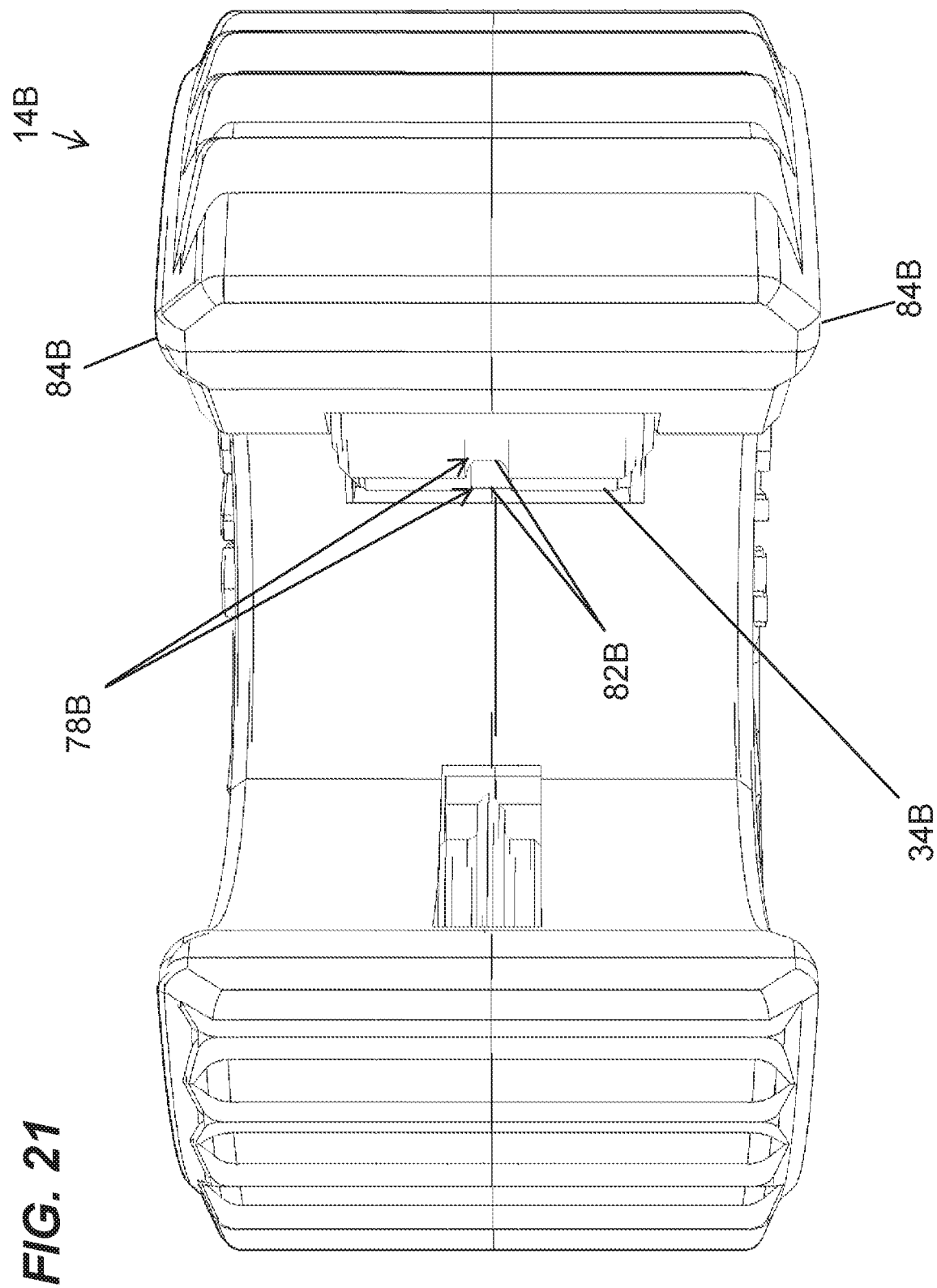
FIG. 21 is a front view of the cutter of FIG. 19.
Figure 22:
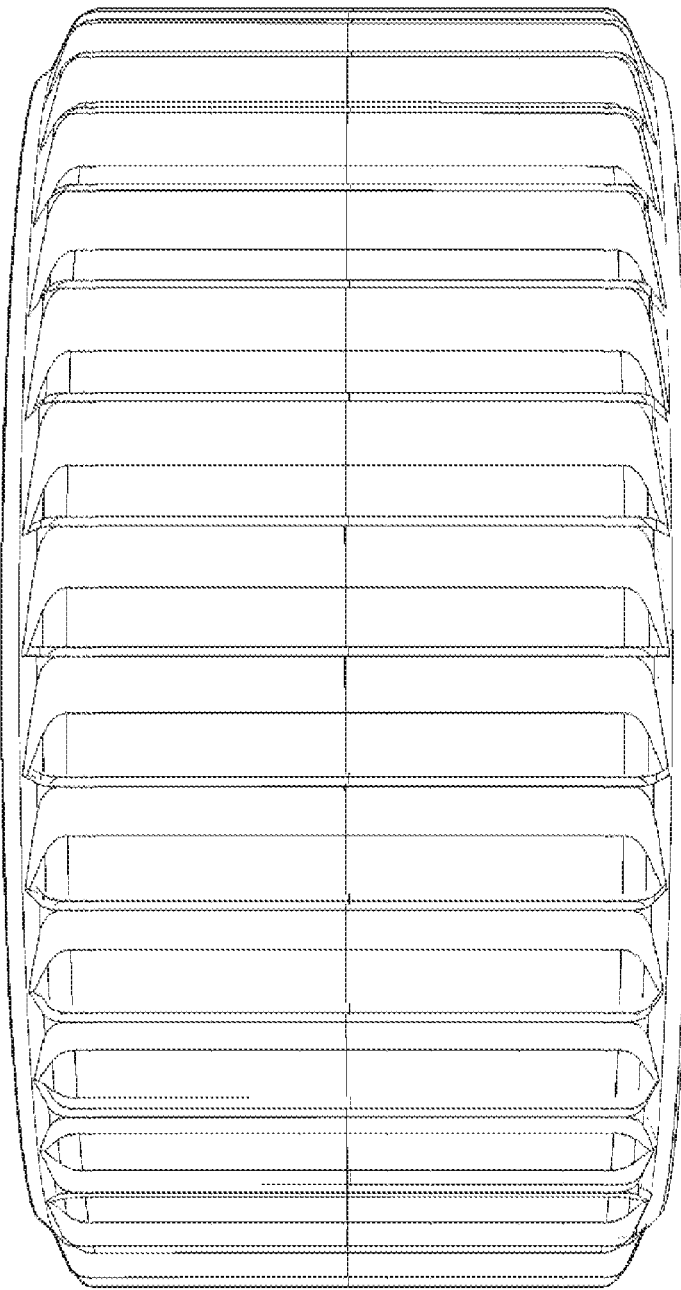
FIG. 22 is a rear view of the cutter of FIG. 19.
Figure 23:
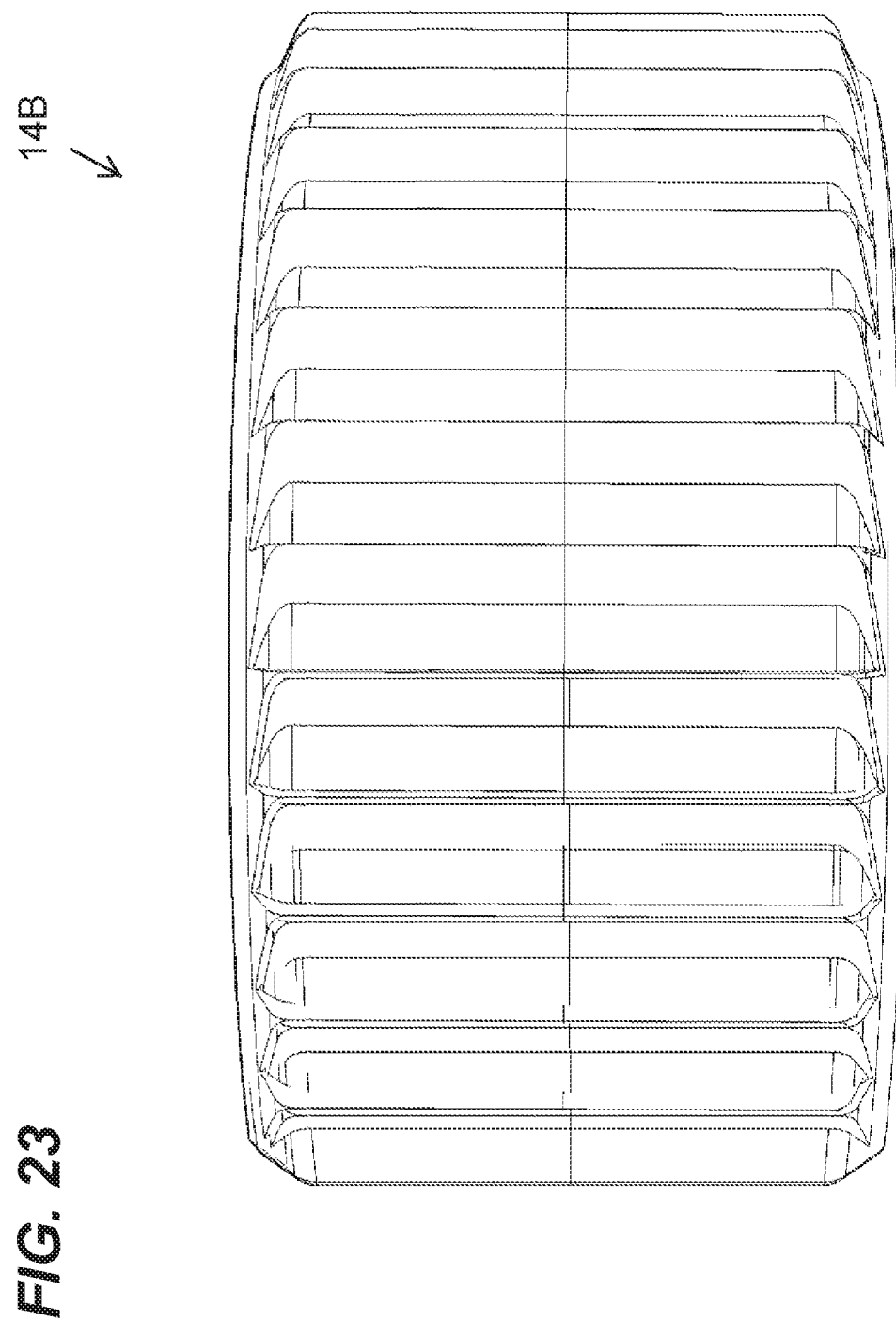
FIG. 23 is a bottom view of the cutter of FIG. 19.
Figure 24:
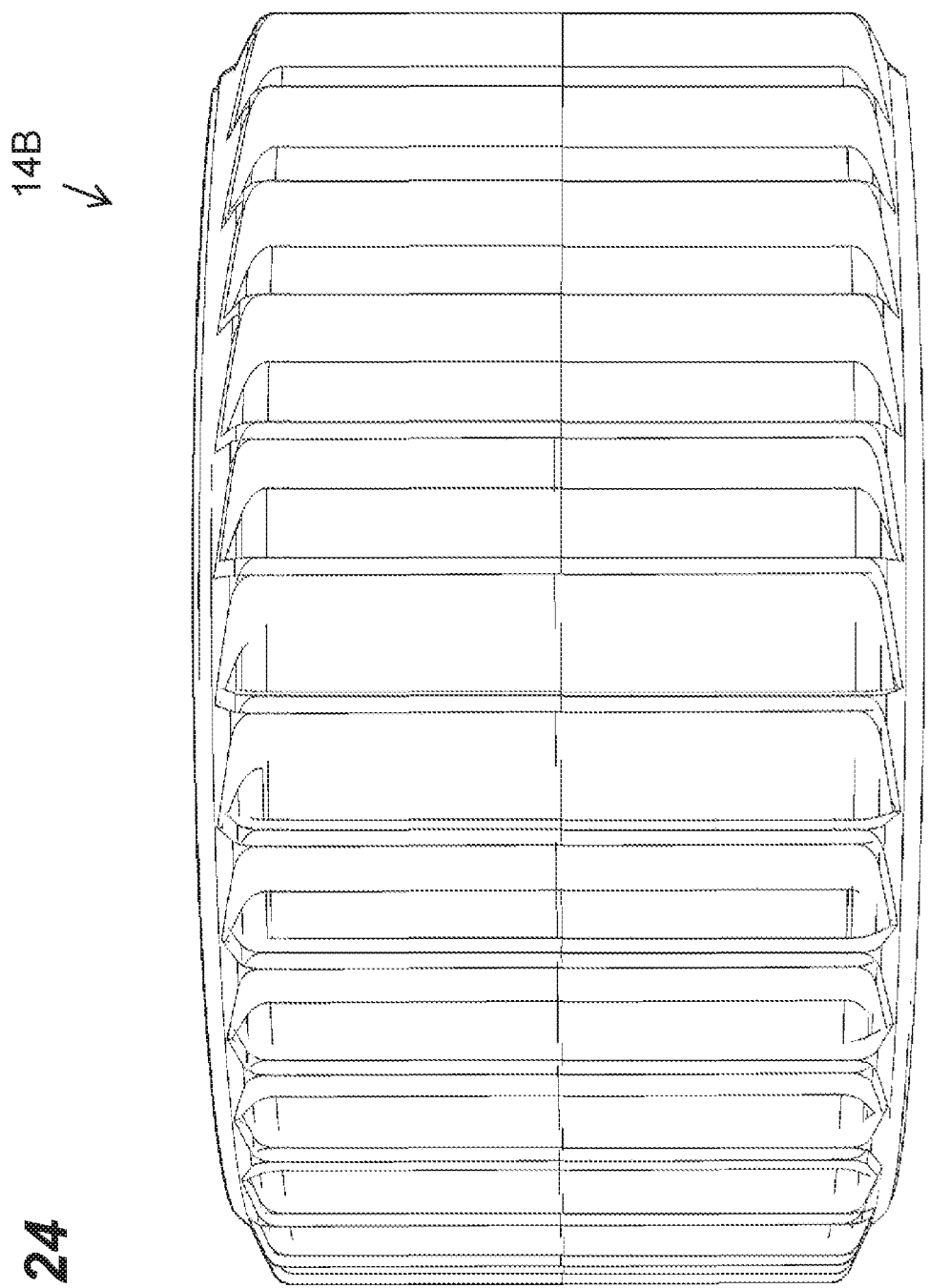
FIG. 24 is a top view of the cutter of FIG. 19.
Figure 25:
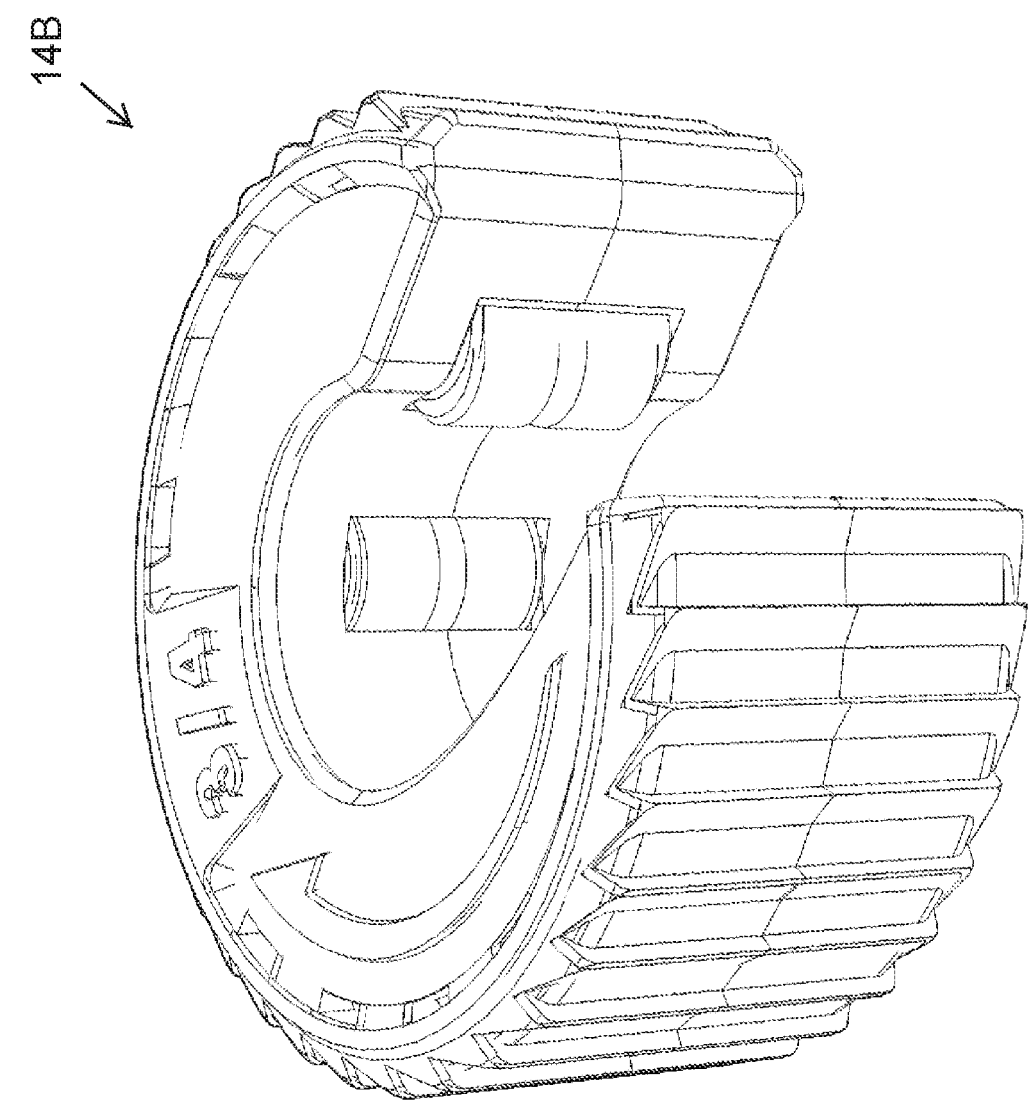
FIG. 25 is a front bottom perspective view of the cutter of FIG. 19.
Figure 26:
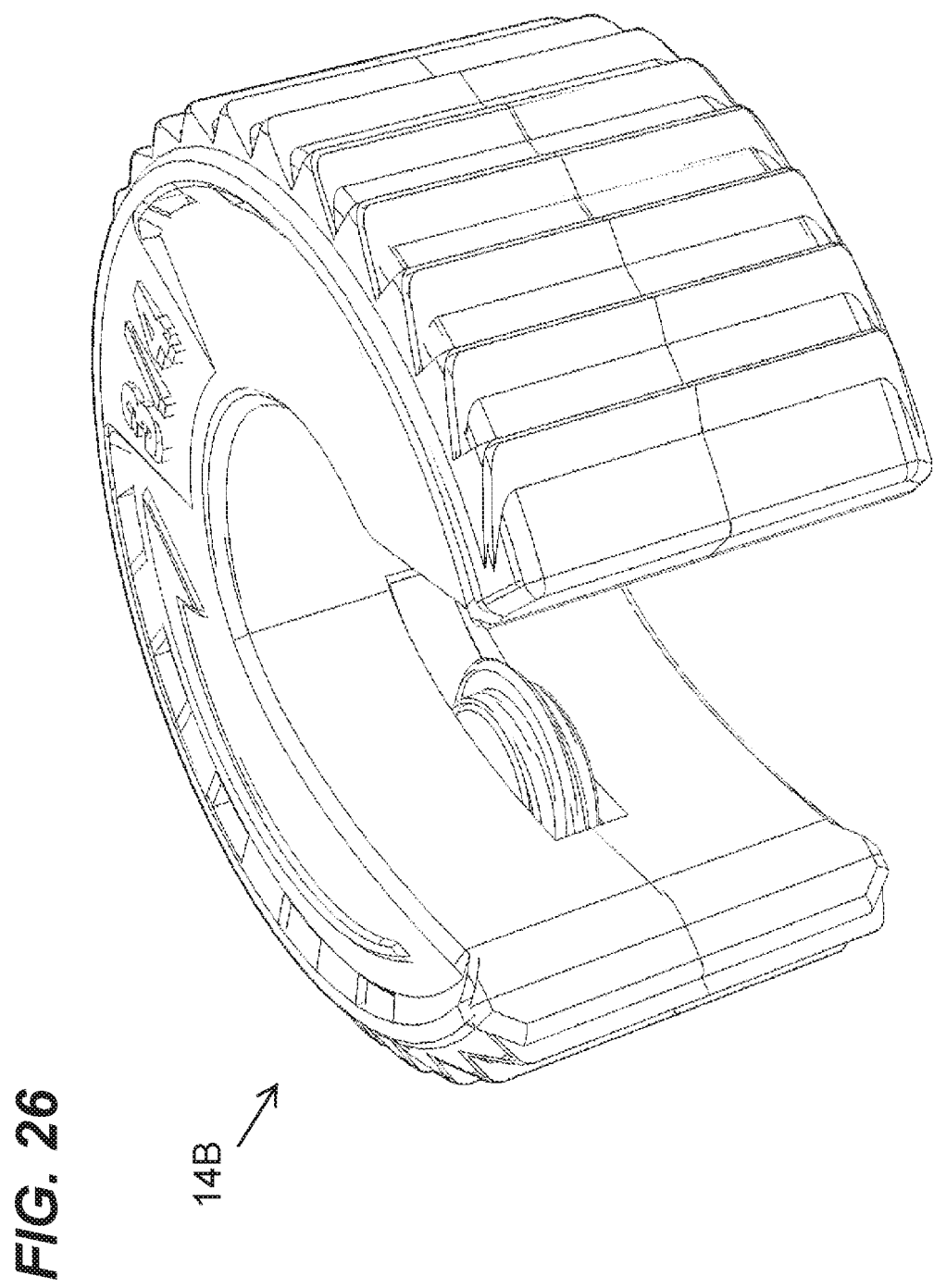
FIG. 26 is a front top perspective view of the cutter of FIG. 19.
Figure 27:
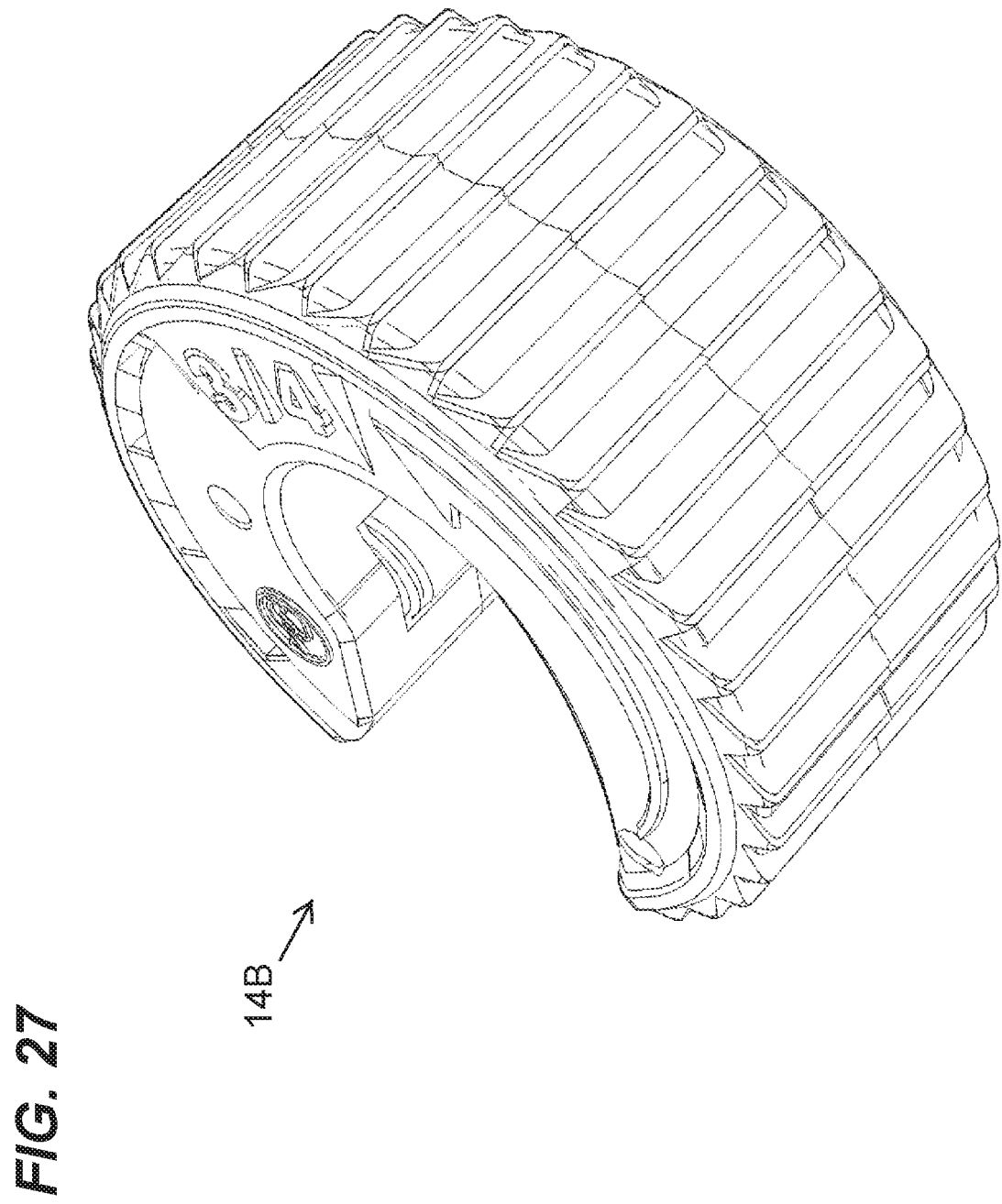
FIG. 27 is a rear top perspective view of the cutter of FIG. 19.
Figure 28:
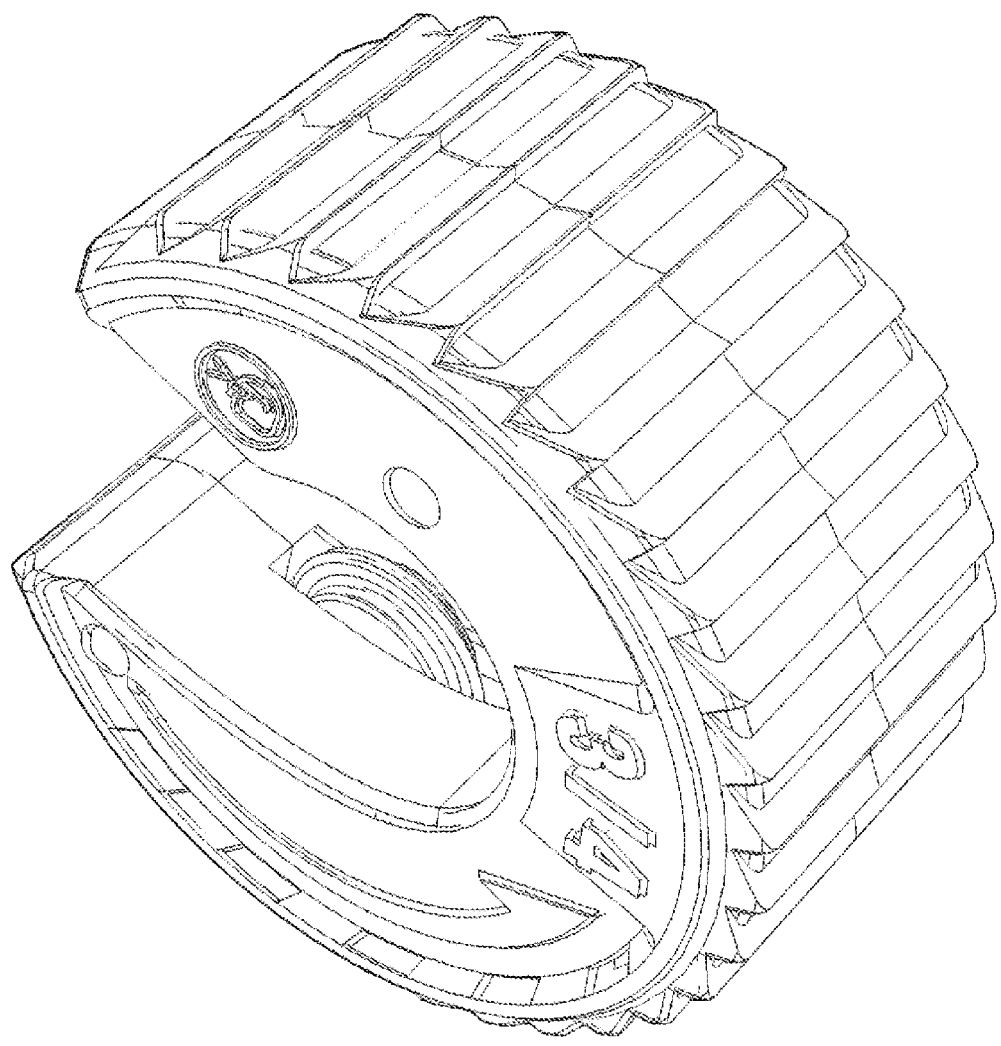
FIG. 28 is a rear bottom perspective view of the cutter FIG. 19.
Figure 29:
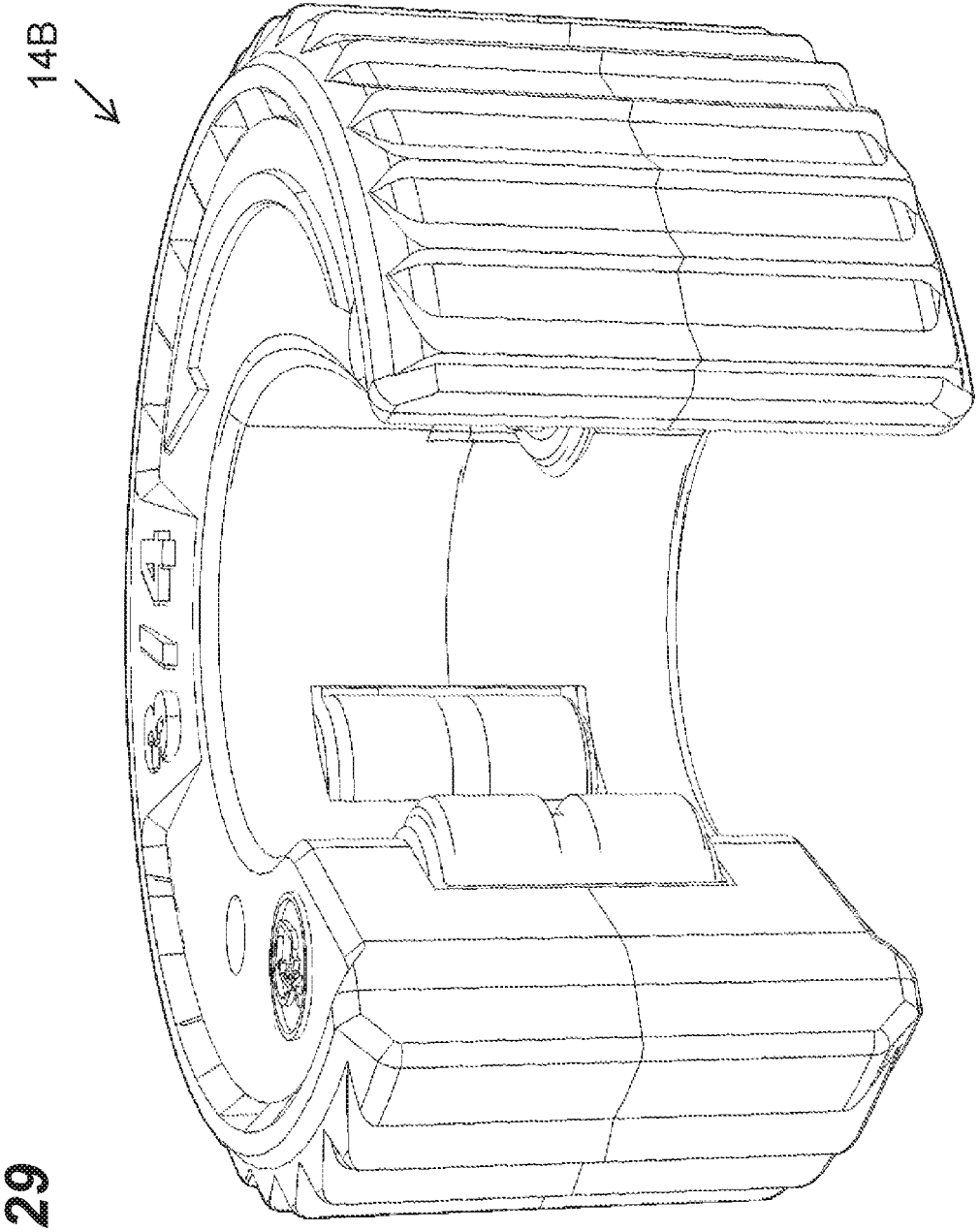
FIG. 29 is a front perspective view of the cutter of FIG. 19.
Figure 30:
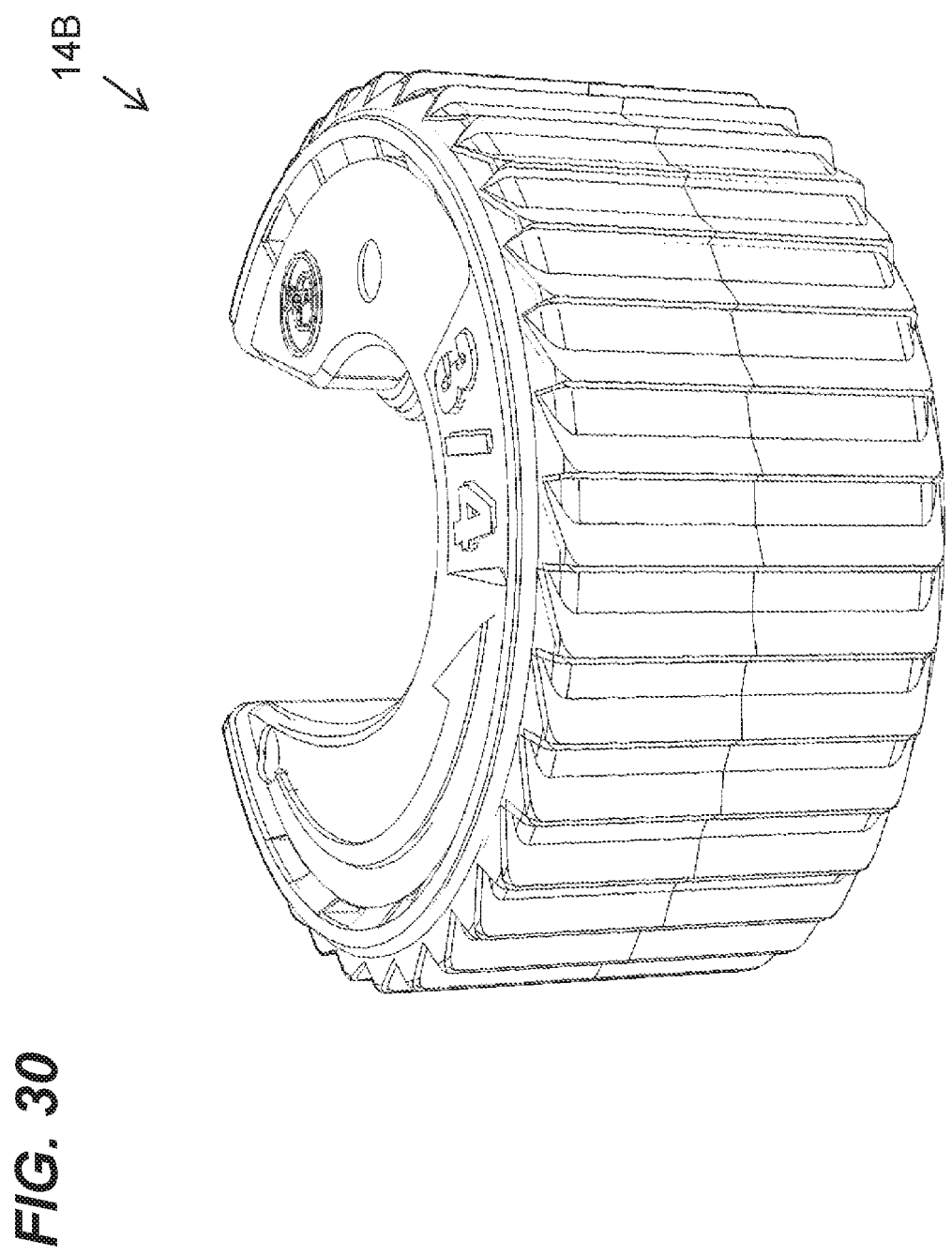
FIG. 30 is a rear perspective view of the cutter of FIG. 19.
Figure 31:
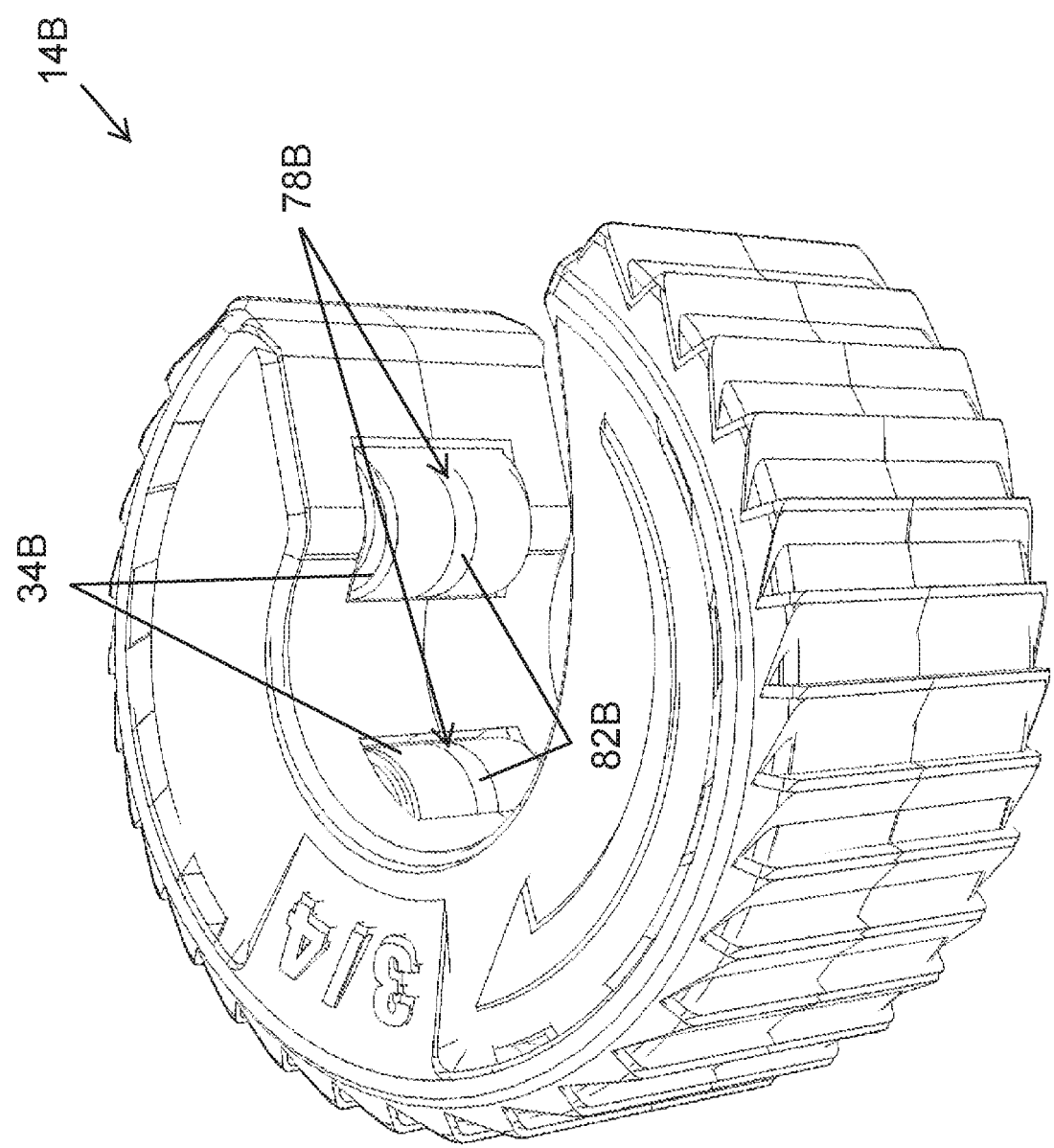
FIG. 31 is a top perspective view of the cutter of FIG. 19.
Figure 32:
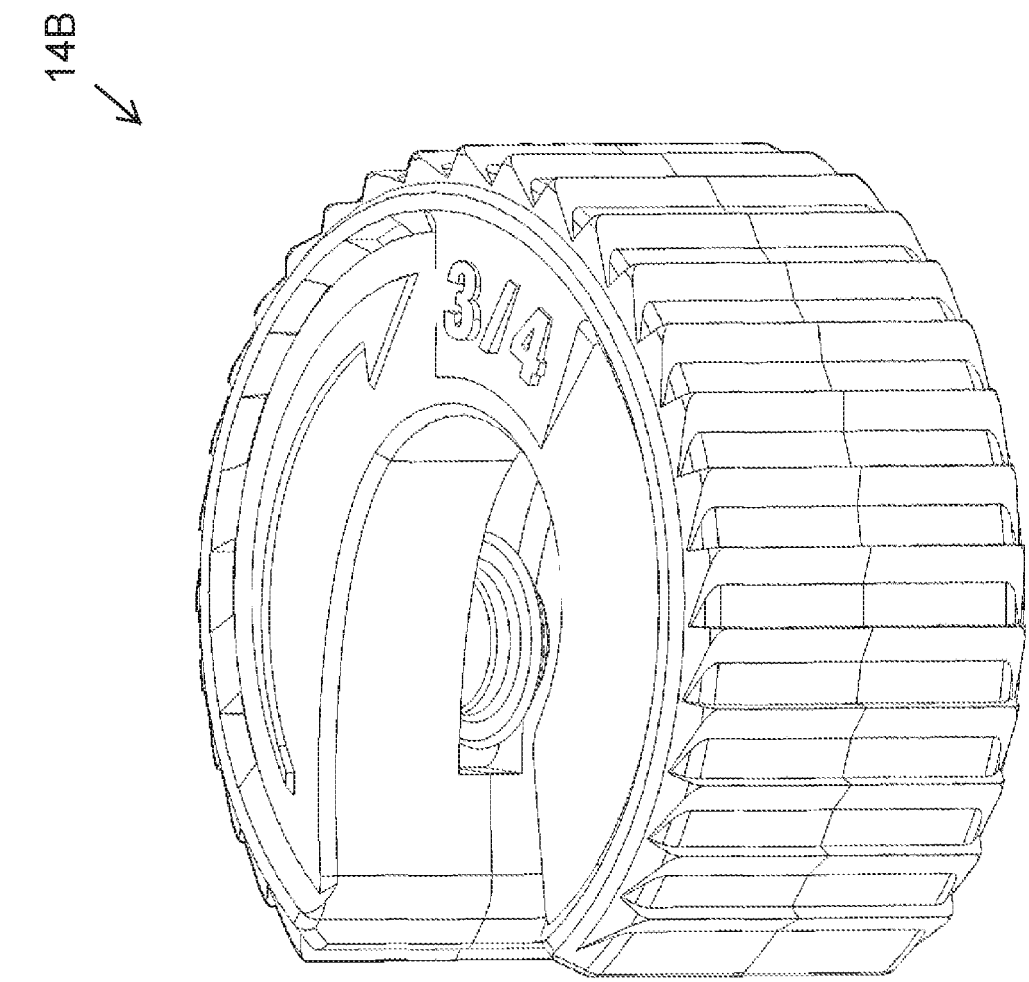
FIG. 32 is a bottom perspective view of the cutter of FIG. 19.
Figure 33:
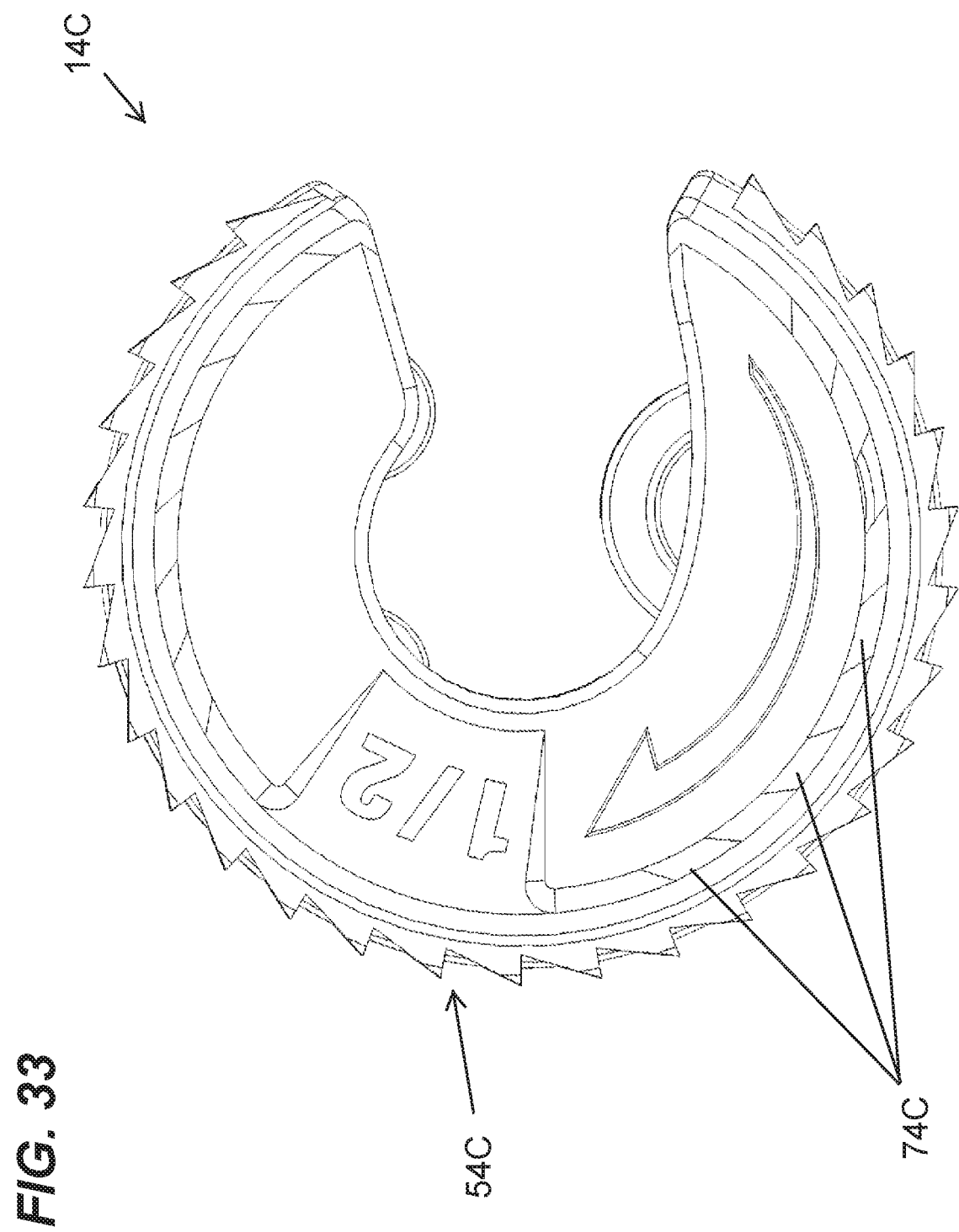
FIG. 33 is a view of one side of another alternative construction of a cutter, such as a close quarters cutter.
Figure 34:
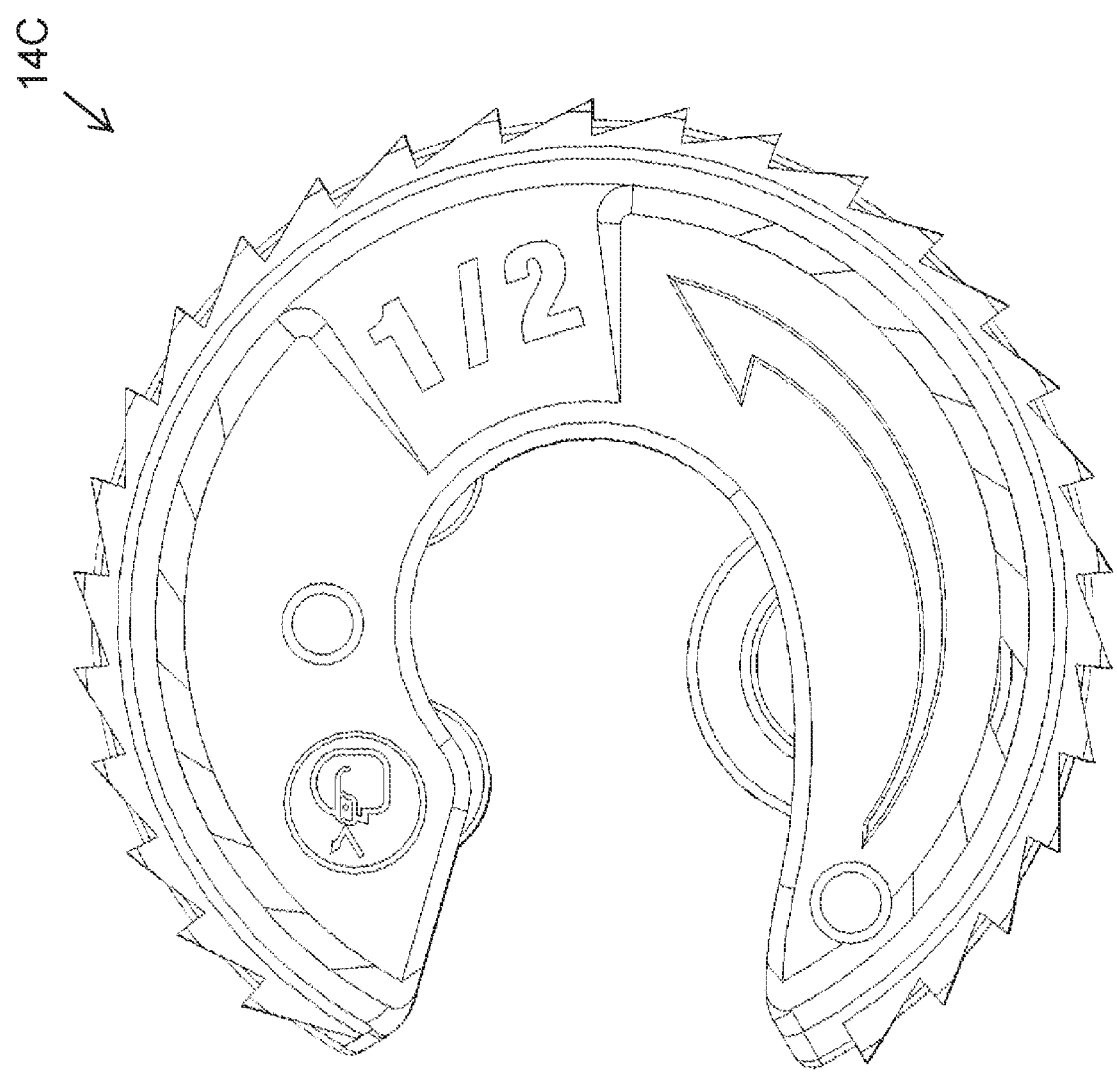
FIG. 34 is a view of the other side the cutter of FIG. 33.
Figure 35:
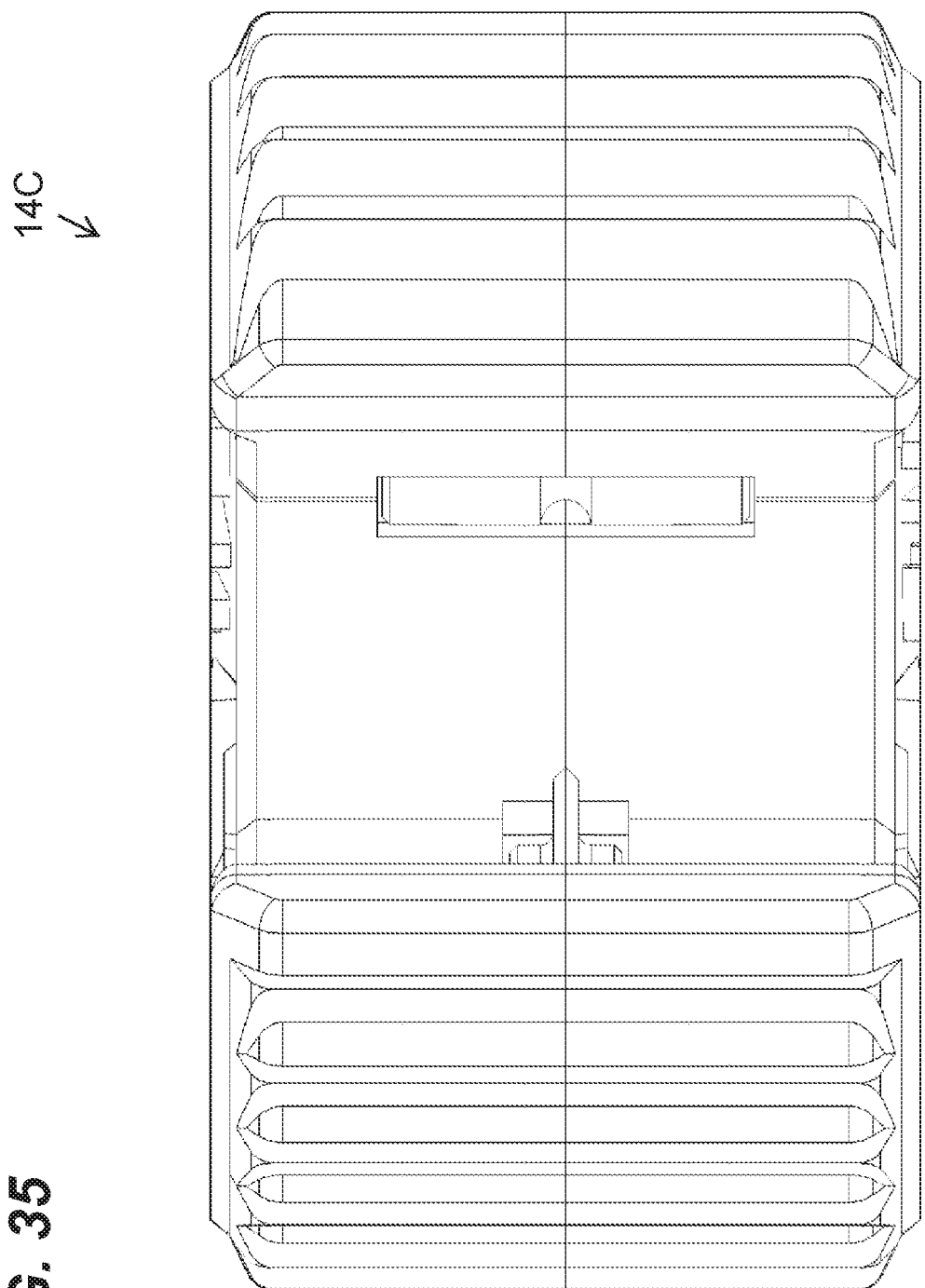
FIG. 35 is a front view of the cutter of FIG. 33.
Figure 36:
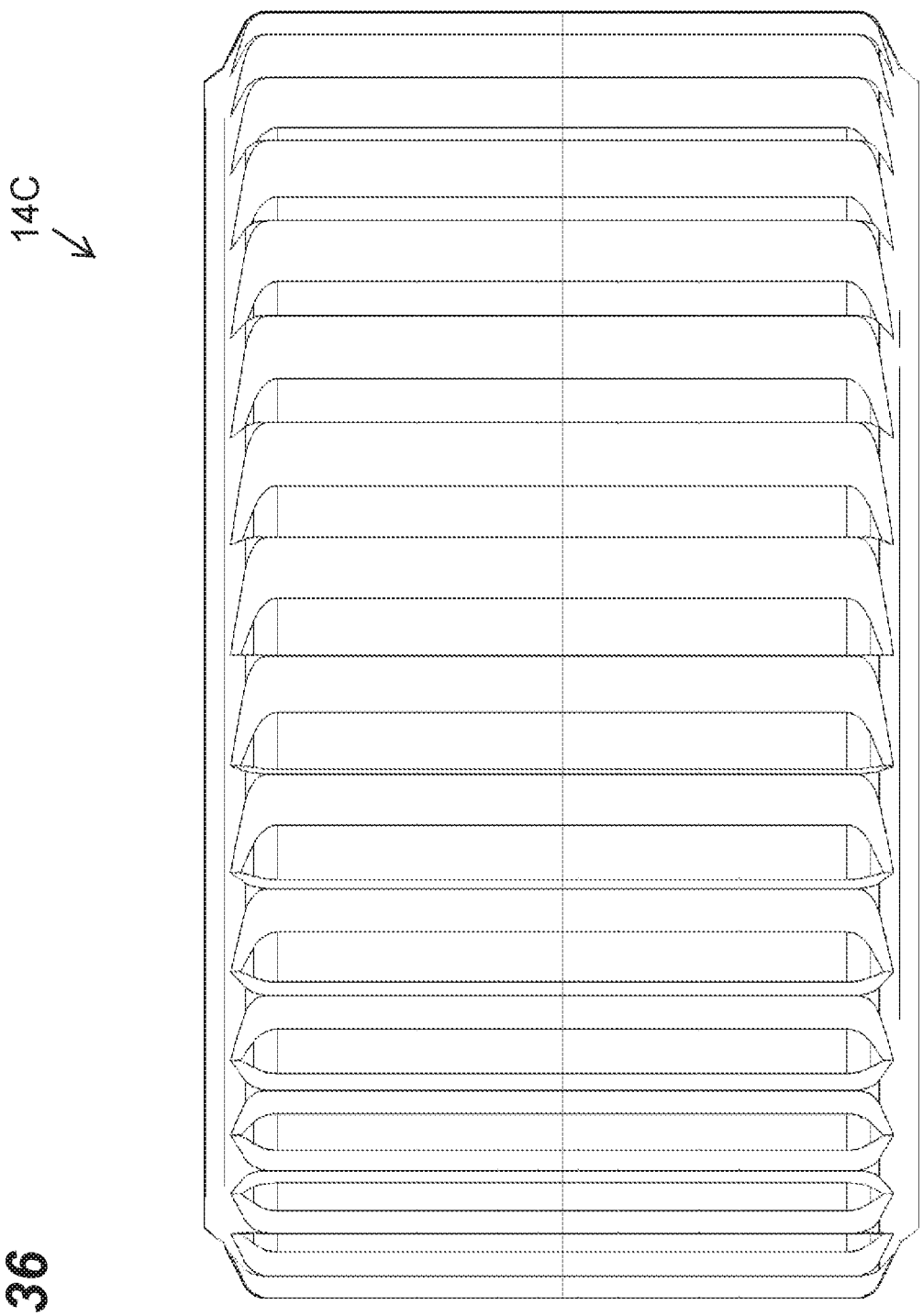
FIG. 36 is a rear view of the cutter of FIG. 33.
Figure 37:
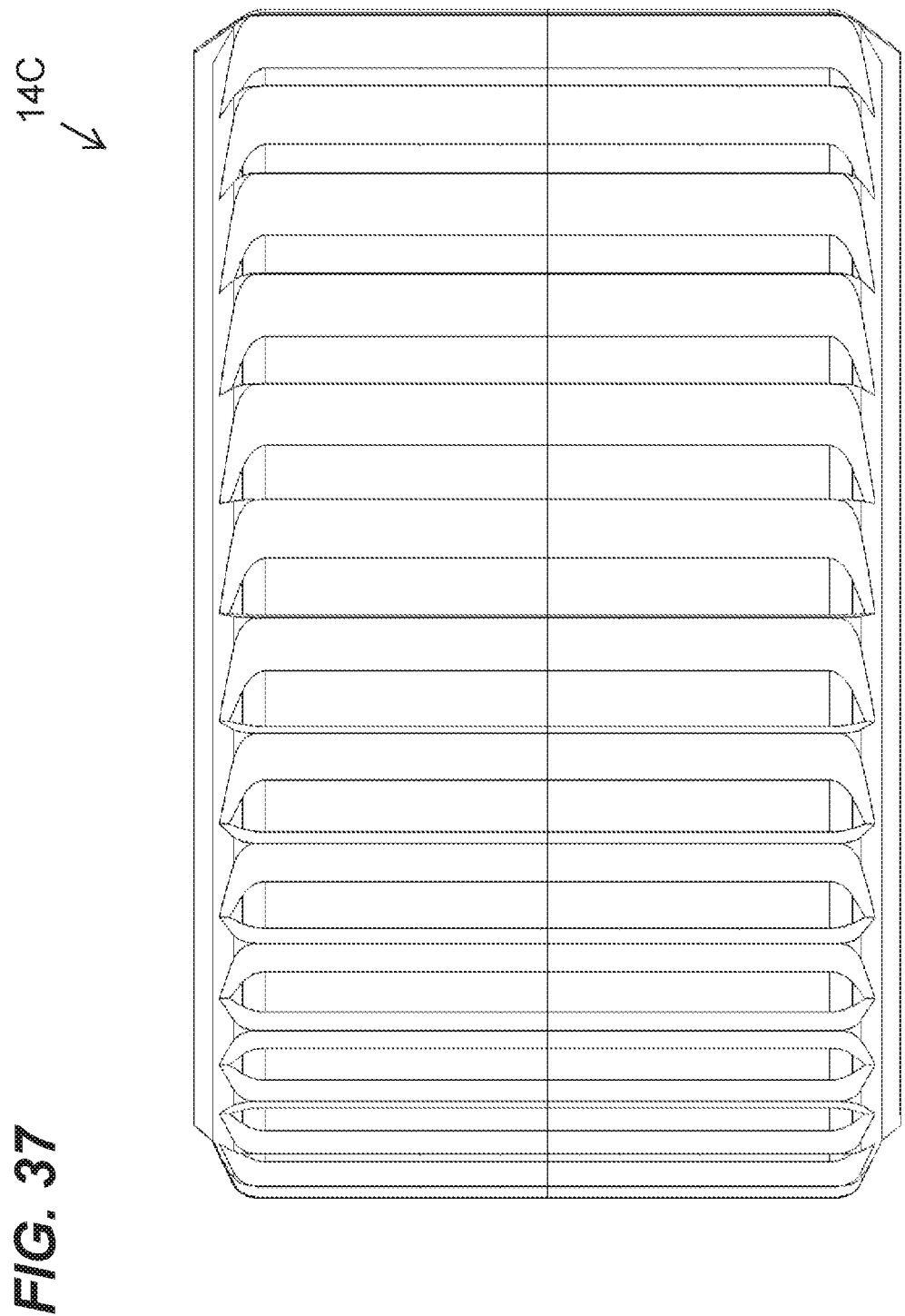
FIG. 37 is a bottom view of the cutter of FIG. 33.
Figure 38:
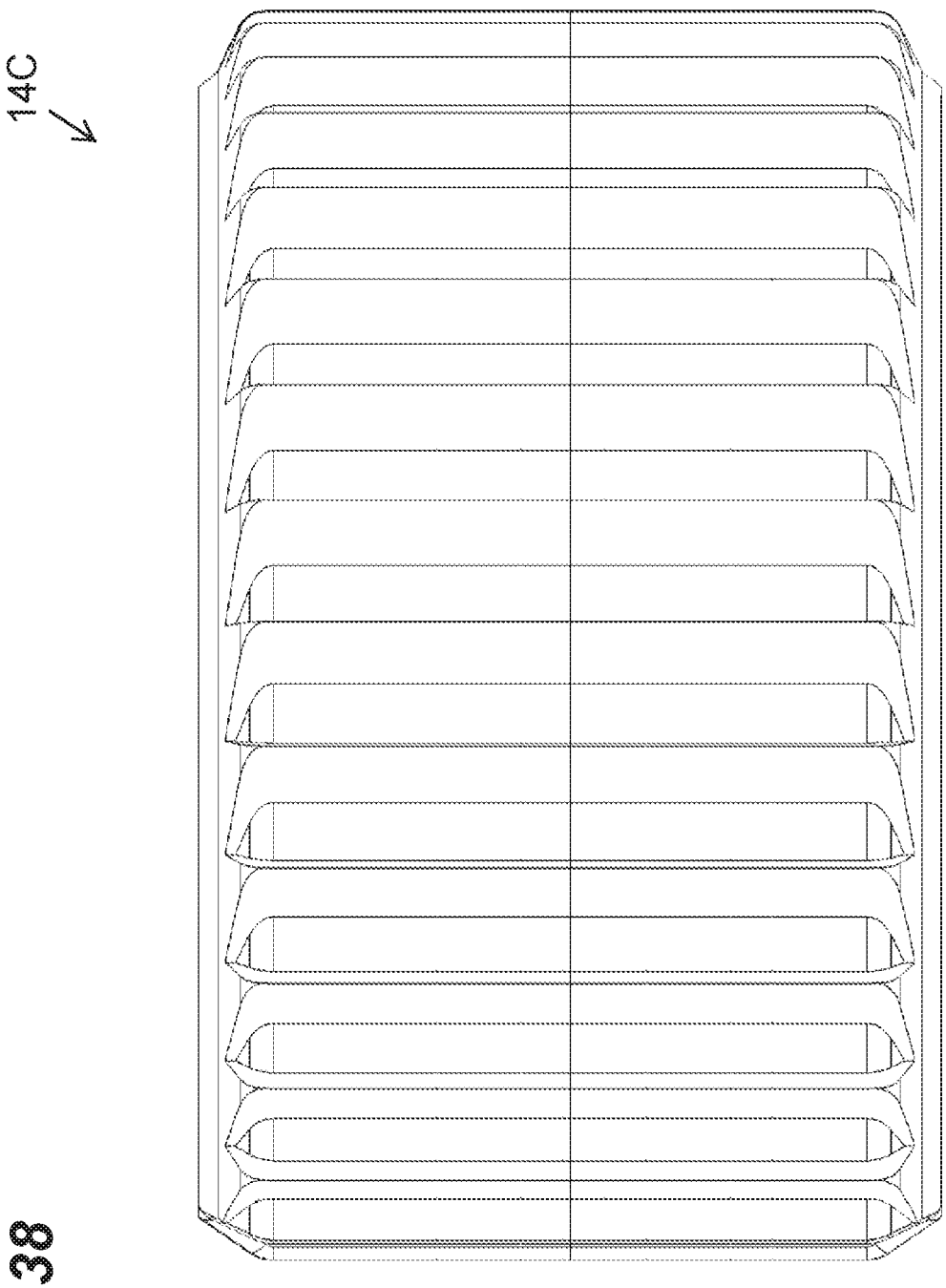
FIG. 38 is a top view of the cutter of FIG. 33.
Figure 39:
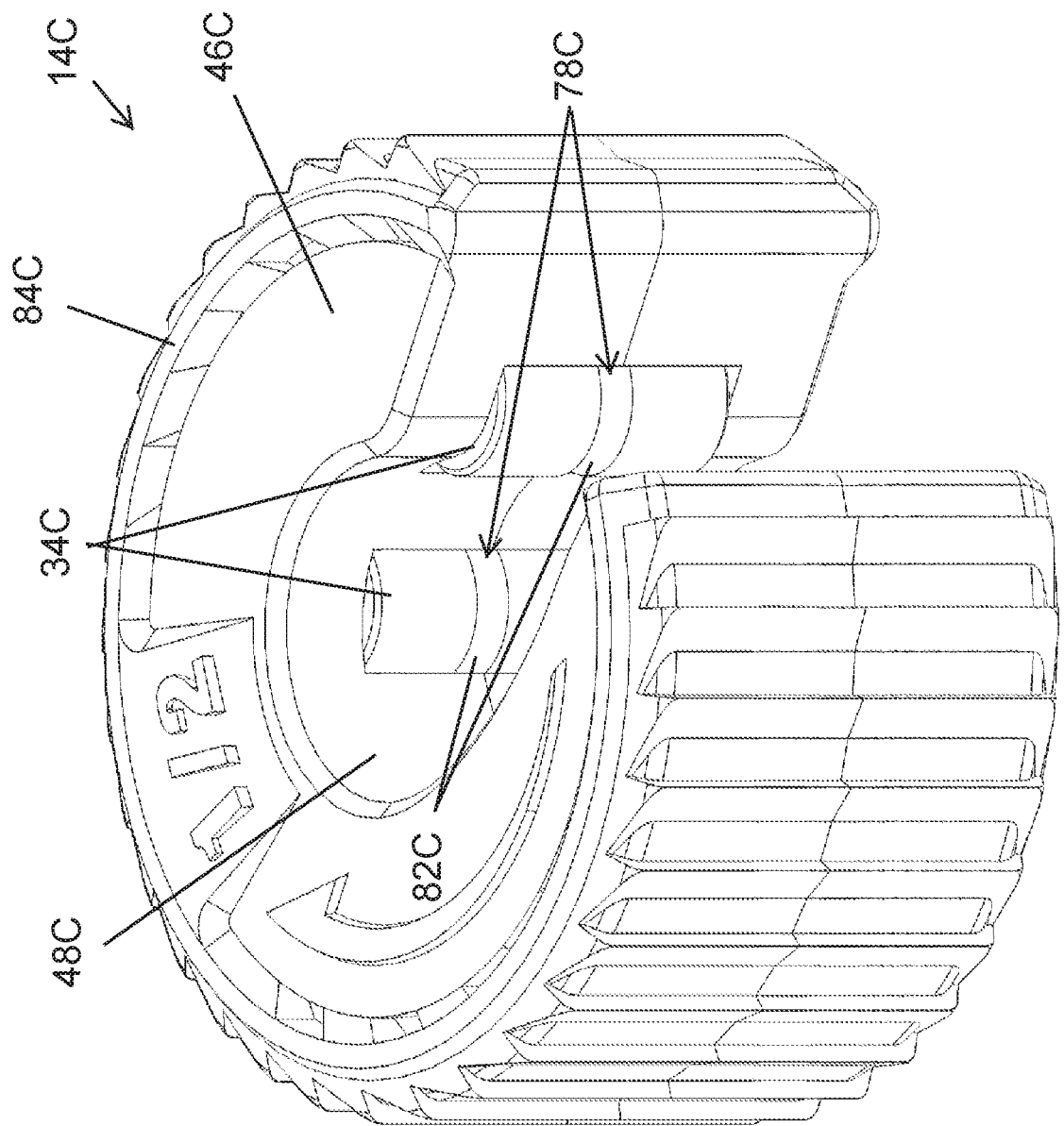
FIG. 39 is a front bottom perspective view of the cutter of FIG. 33.
Figure 40:
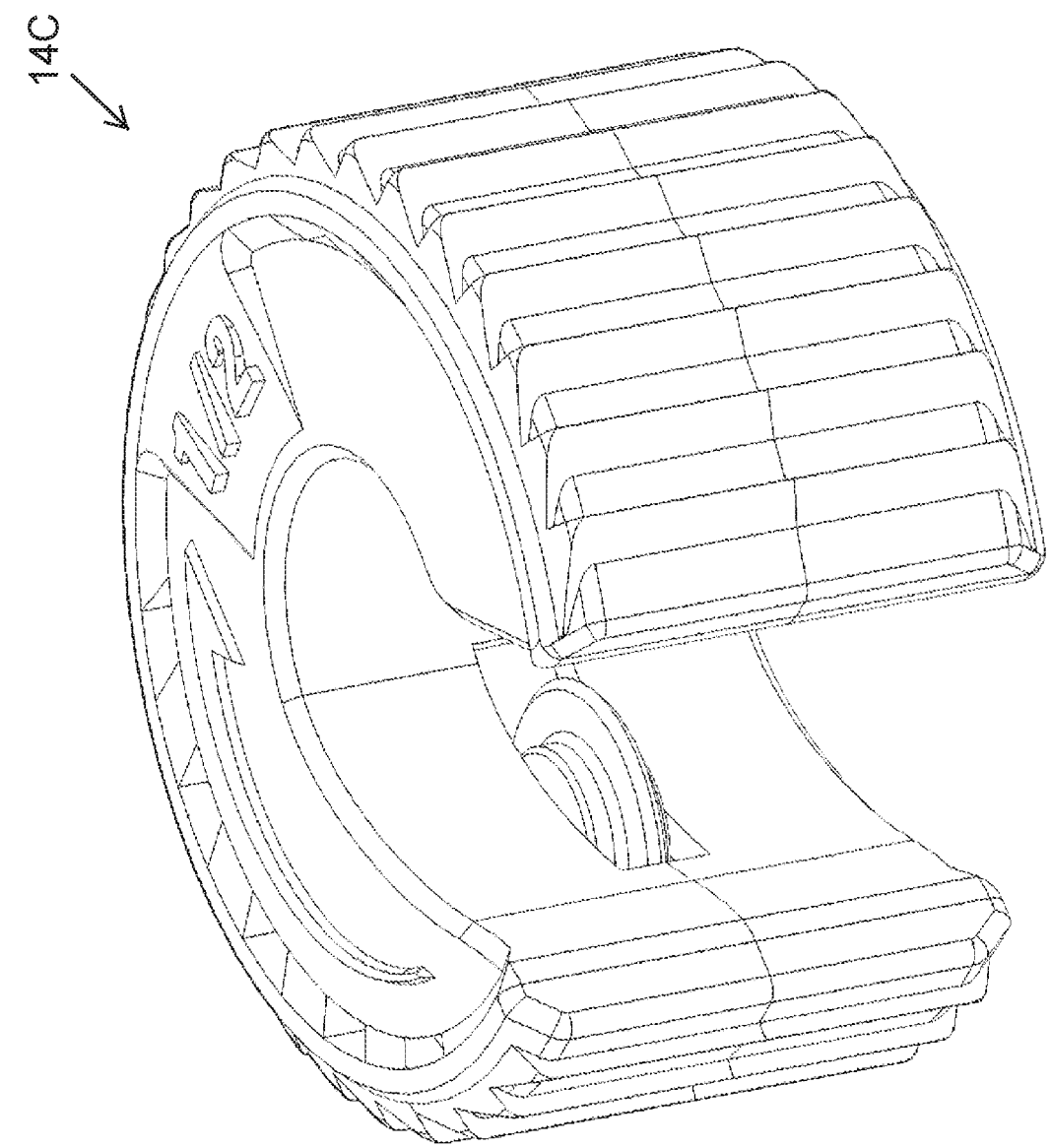
FIG. 40 is a front top perspective view of the cutter of FIG. 33.
Figure 41:
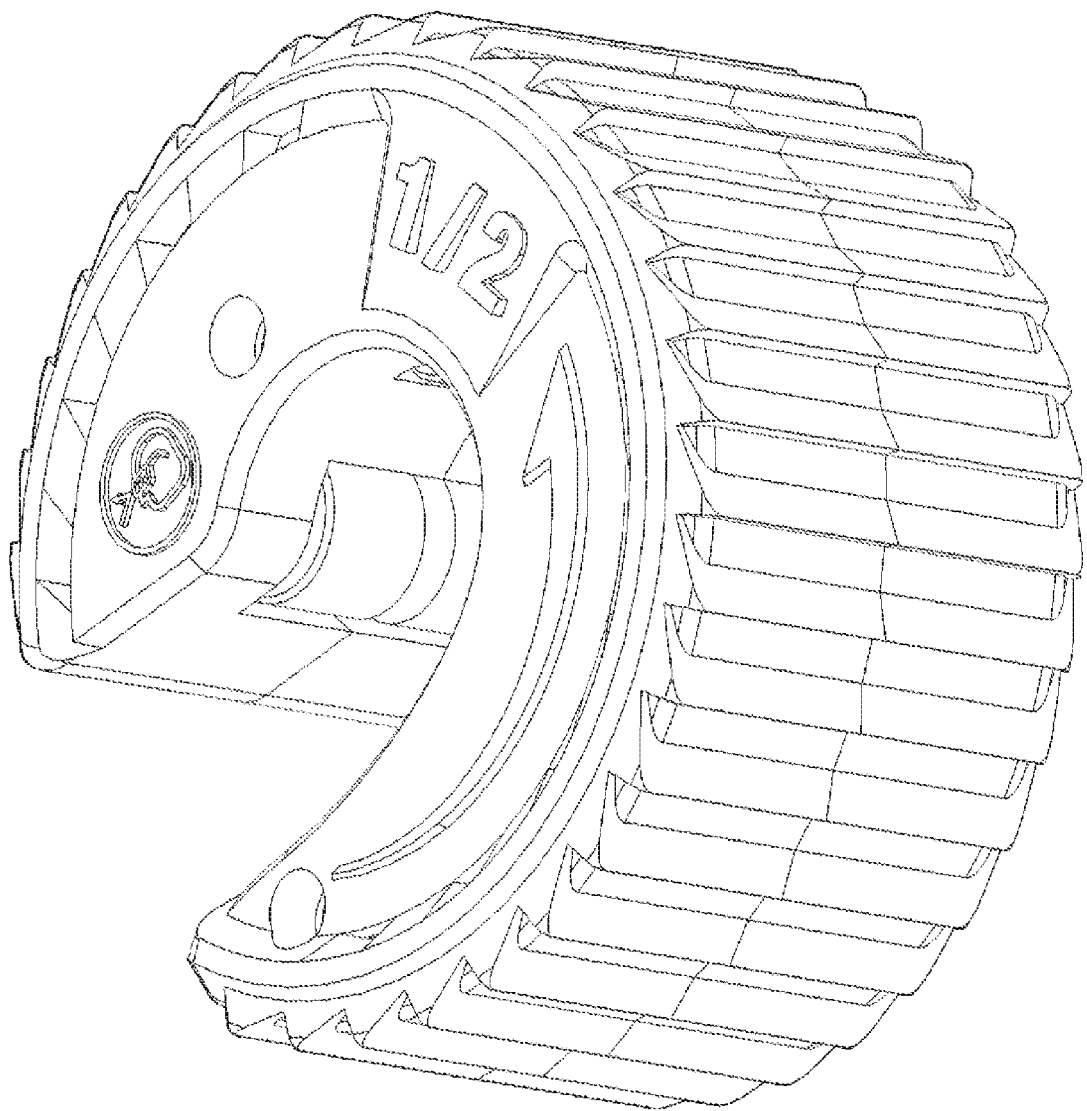
FIG. 41 is a rear top perspective view of the cutter of FIG. 33.
Figure 42:
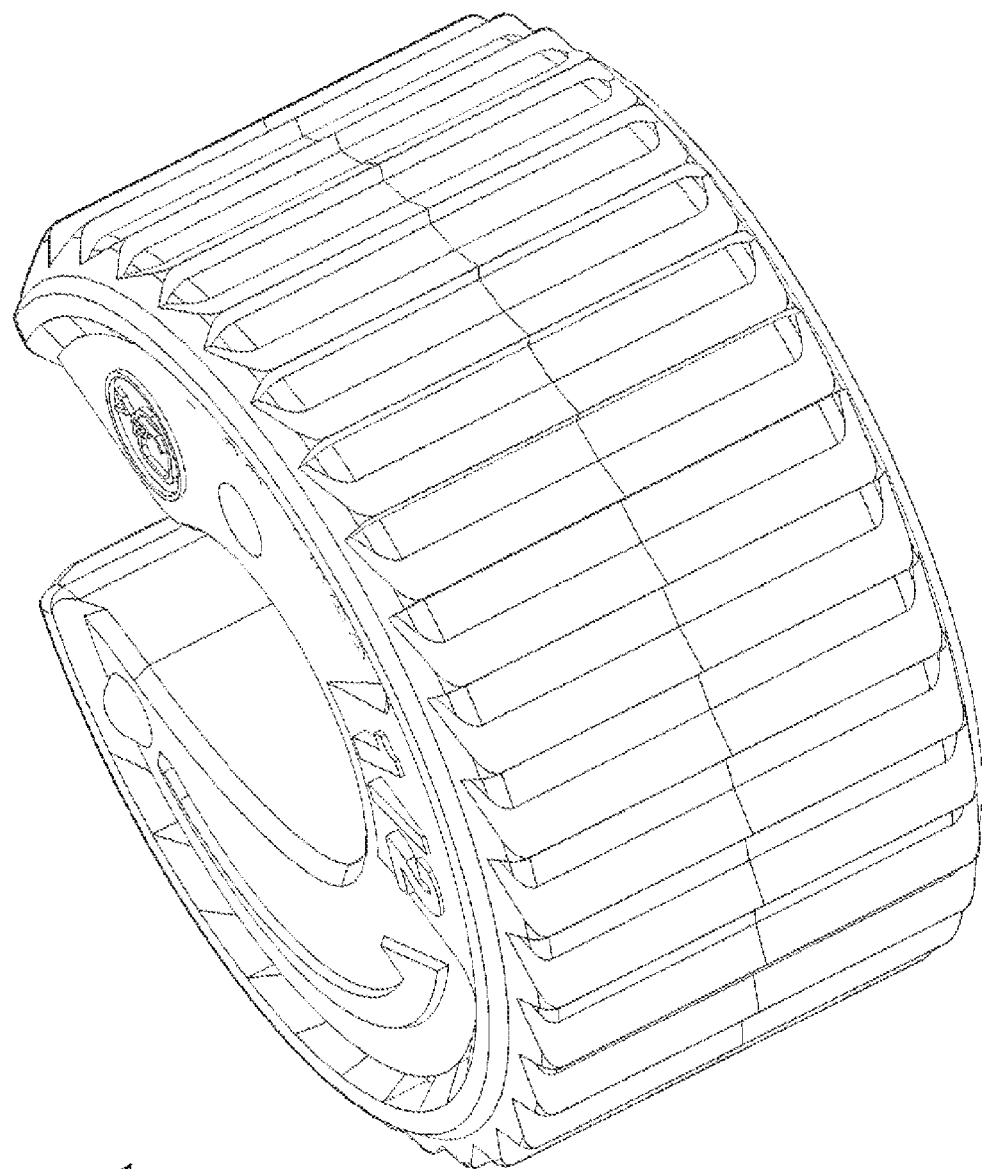
FIG. 42 is a rear bottom perspective view of the cutter FIG. 33.
Figure 43:
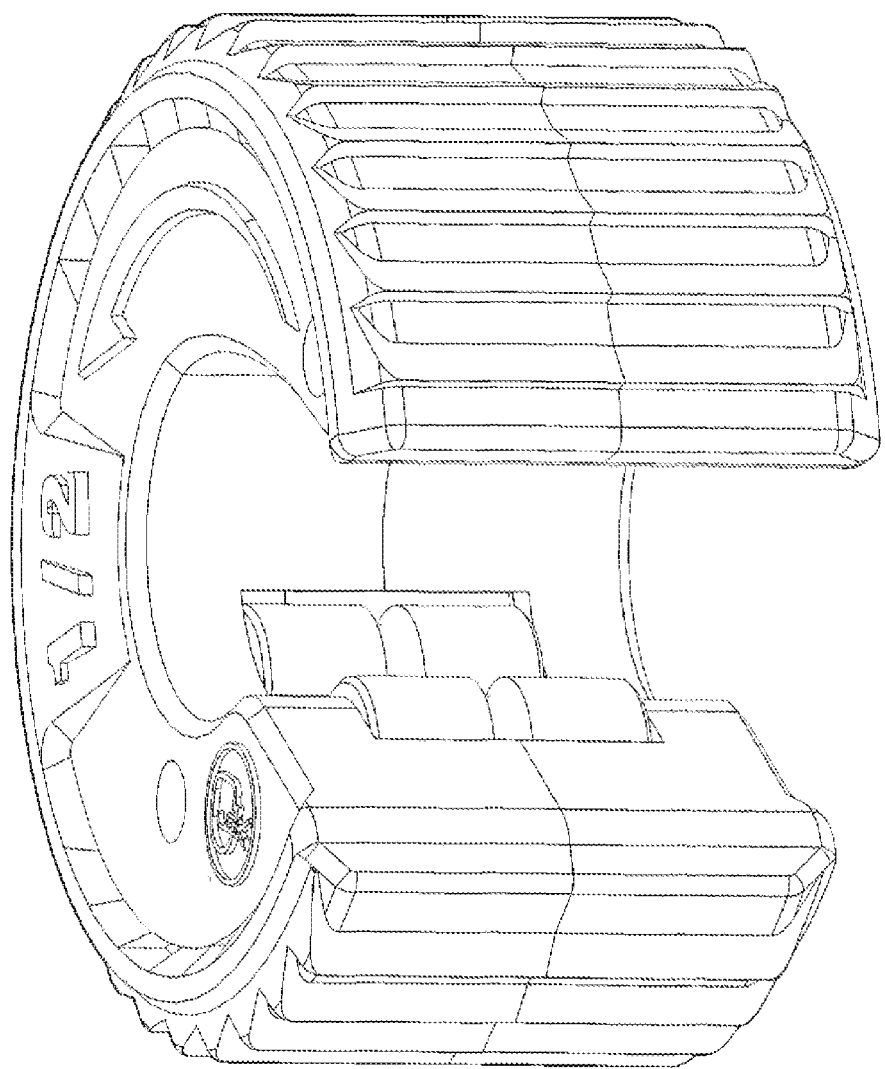
FIG. 43 is a front perspective view of the cutter of FIG. 33.
Figure 44:
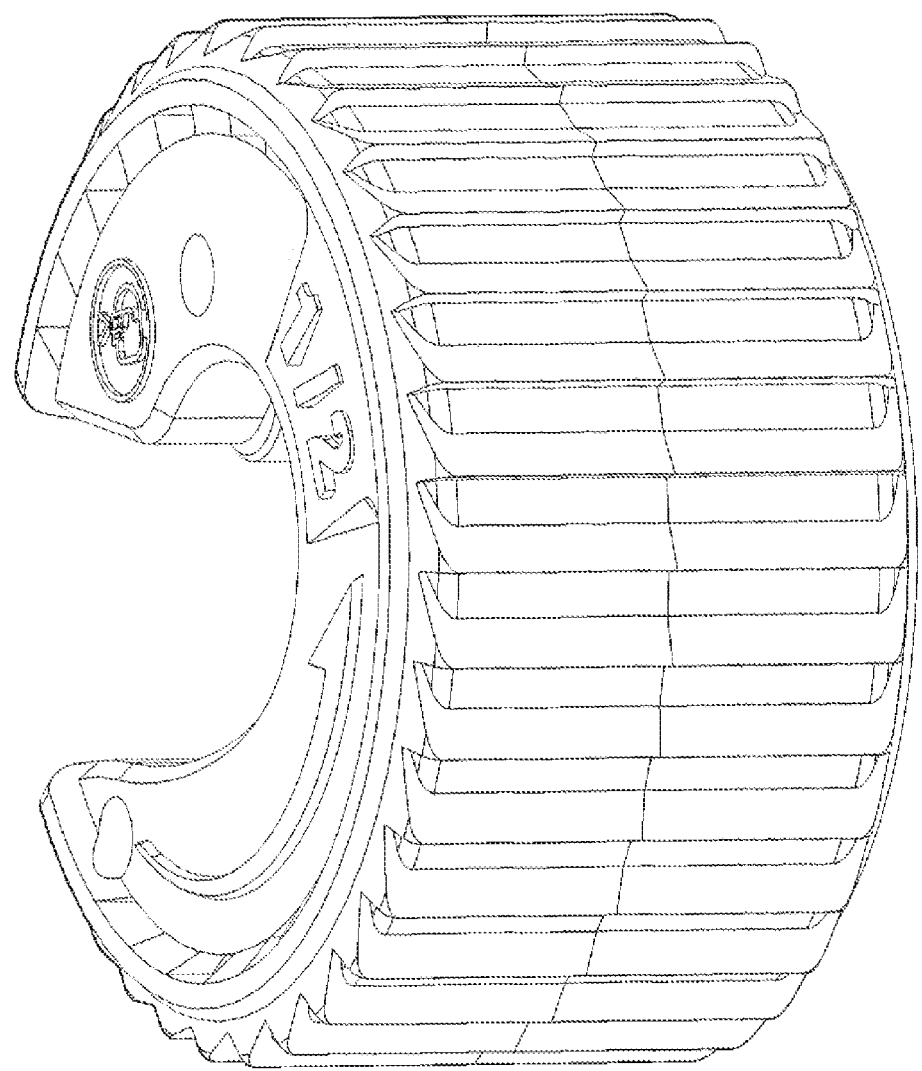
FIG. 44 is a rear perspective view of the cutter of FIG. 33.
Figure 45:
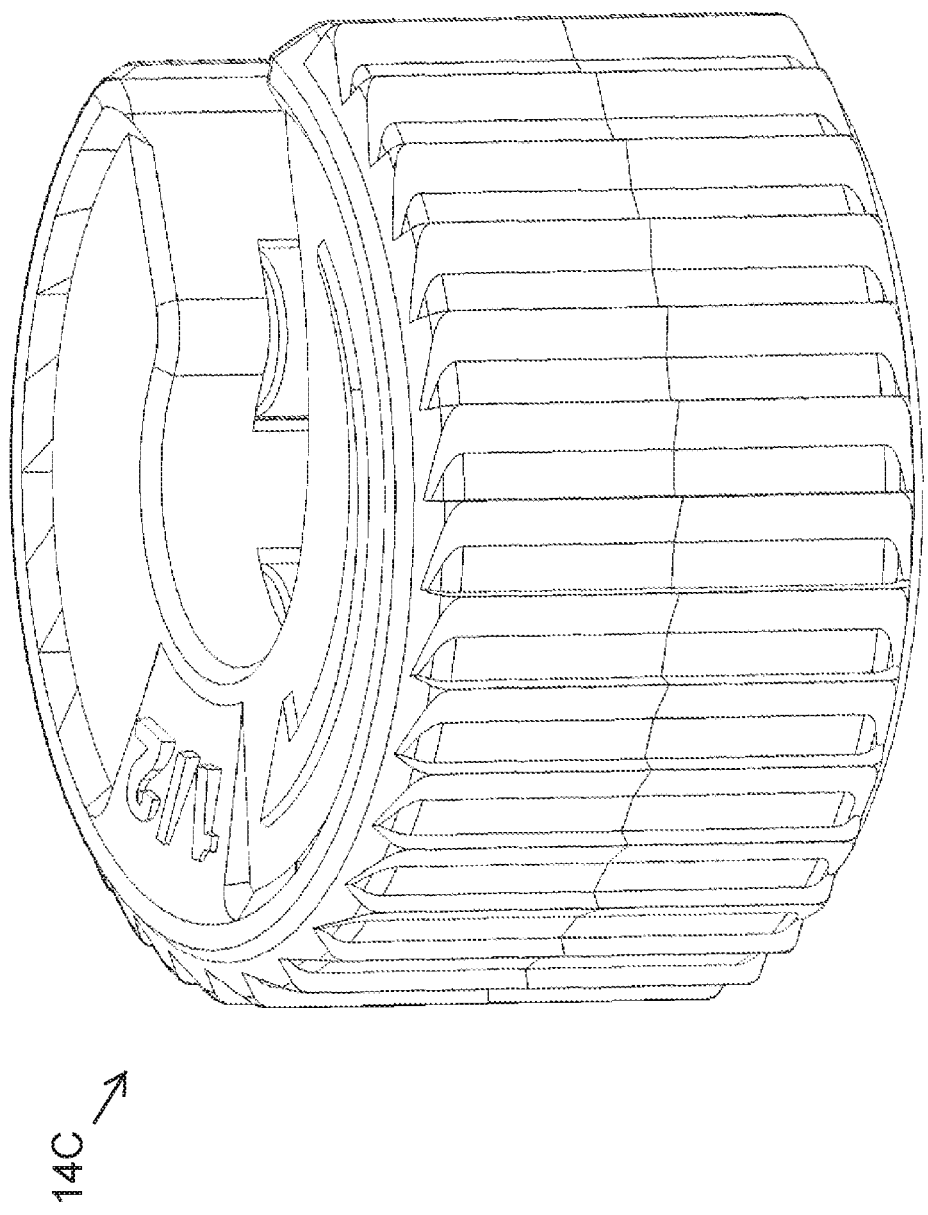
FIG. 45 is a top perspective view of the cutter of FIG. 33.
Figure 46:
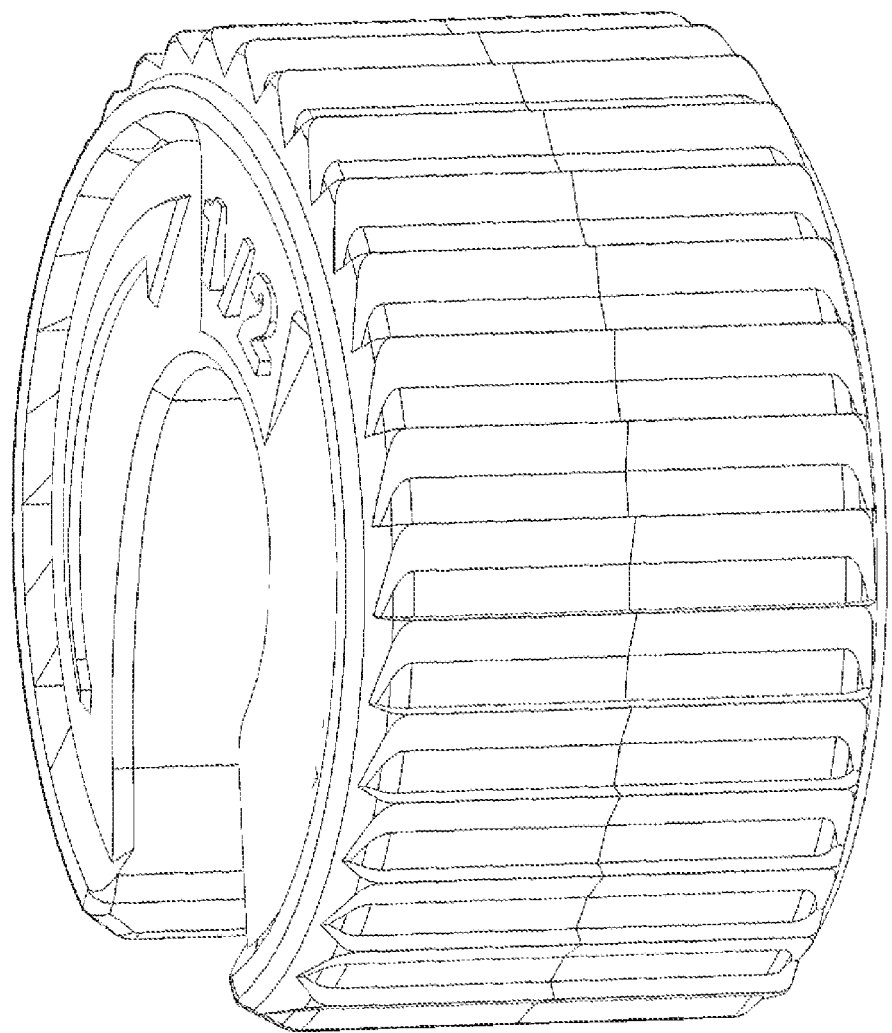
FIG. 46 is a bottom perspective view of the cutter of FIG. 33.

The housing assembly 38 is formed by two housing halves 40 (one shown in FIGS. 17-18) providing support structure for the cutting wheel 30 and the roller(s) 34. As shown in FIGS. 3-5, the housing assembly 38 has a generally cylindrical outer wall 42 and side walls 46 defining an opening 50 for receiving the work piece W. An inner wall 48 extends between the side walls 46 around the opening 50.

The outer wall 42 provides an outer surface 43 engageable by a user to pivot the cutter 14A about the axis A. A grip portion 54 is provided on (e.g., formed on) the outer surface 43 of the cylindrical outer wall 42 and includes a plurality grip members 58 spaced about the circumference of the cylindrical outer wall 42. The illustrated grip portion 54 provides an indication of the cutting direction (the direction to rotate the cutter 14A) to cut the work piece W.

Each grip member 58 includes, relative to the cutting direction D, a trailing surface 62 and a leading surface 66 extending from the outer surface 43 to an outer end (e.g., a point). In the illustrated construction, the leading surface 66 is angled toward the cutting direction D while the trailing surface 62 extends substantially radially. As shown in FIG. 3, an angle 64 is defined between the leading surface 66 and the trailing surface 62, and, in the illustrated construction, the angle 64 is between approximately 45 degrees and approximately 75 degrees (e.g., approximately 63 degrees, as illustrated).

In other constructions, such as the cutter 14D of FIGS. 49A-49D, the trailing surface 62D and the leading surface 66D extend to and are connected by an intermediate surface 68, which is generally tangential to the outer surface 43 of the cylindrical outer wall 42. In such constructions, the trailing surface 62D and the leading surface 66D are substantially parallel, but in other constructions, may be angled relative to each other.

In other constructions, the grip members 58 may be arranged in another manner to indicate the cutting direction. For example, in some constructions, such as the cutter 14E of FIGS. 50A-50B, the grip members 58E of the grip portion 54E may be arranged in an "echelon" pattern. Specifically, each of the grip members 58E has two mirror portions 72 angled relative to each other so as to point in the cutting direction D. In the illustrated construction, the portions 72 form an angle between approximately 115 degrees and approximately 175 degrees (e.g., approximately 145 degrees, as illustrated).

As shown in FIG. 3, a separate cutting direction indicator (e.g., an arrow 60) and other indicators (e.g., a "1" to indicate size) may be provided. In the illustrated construction, the arrow 60 and other indicators are defined by raised surfaces extending outwardly from at least one of the side walls 46. In other constructions (not shown), the arrow 60 and/or the other indicators may be recessed into or provided directly on at least one of the side walls 46.

When the two housing halves 40 of the housing assembly 38 are connected, the outer wall 42, the side walls 46, and the inner wall 48 cooperate to define a cavity 70 in which the cutting wheel 30 and the roller(s) 34 are at least partially supported. The cutting wheel 30 extends through a cutting wheel opening 76 defined through the inner wall 48, and the rollers 34 extend through corresponding roller openings 80 defined through the inner wall 48. The cutting wheel opening 76 and the roller openings 80 are circumferentially spaced about the cylindrical inner wall 48.

Figure 47A:
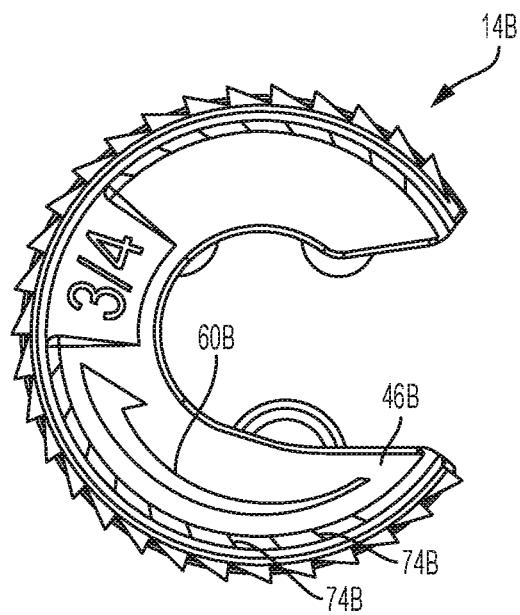
FIGS. 47A-47B illustrate operation of a cutter, such as a close quarters cutter.
Figure 47B:
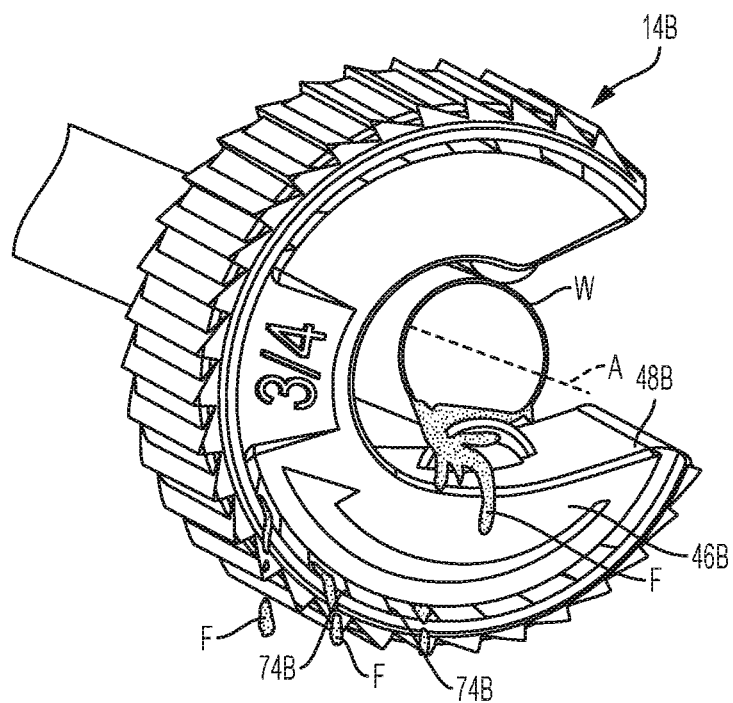

In the illustrated construction, each side wall 46 defines a plurality of circumferentially-spaced drain openings 74 communicating between the cavity 70 and the exterior of the cutter 14A. As shown in FIG. 47B, any fluid F which enters the cavity 70 (e.g., from inside the work piece W being cut and entering through at least one of the cutting wheel opening 76 and the roller openings 80) will drain through the openings 74.

When not in use (see FIGS. 1-2), the cutter 14A is generally positioned on its side, and the side wall openings 74 facilitate drainage from the housing assembly 38. Each side wall 46 has axially-raised surfaces 84 (see FIGS. 5 and 9) extending around an outer periphery of the side wall 46 so that the cutter 14A does not rest in any drained fluid F and so that a support surface (e.g., a work table, the case assembly, etc.) does not block the openings 74. The raised surfaces 84 may include the arrow 60 and/or additional indicators to help support the side wall 46 away from the support surface. The openings 74 are positioned (see FIG. 17) proximate the inner surface 44 of the outer wall 42 so that a channel is not formed between the side walls 46 that would retain fluid F when the cutter 14A rests on the outer wall 42.

In other constructions (such as the cutter 14E of FIGS. 50A-50B), in addition to or as an alternative to the openings 74, openings 74E are circumferentially spaced on the cylindrical outer wall 42E. In such constructions, the openings 74E are centrally located on the cylindrical outer wall 42E along the cutting axis A.

Figure 50A:
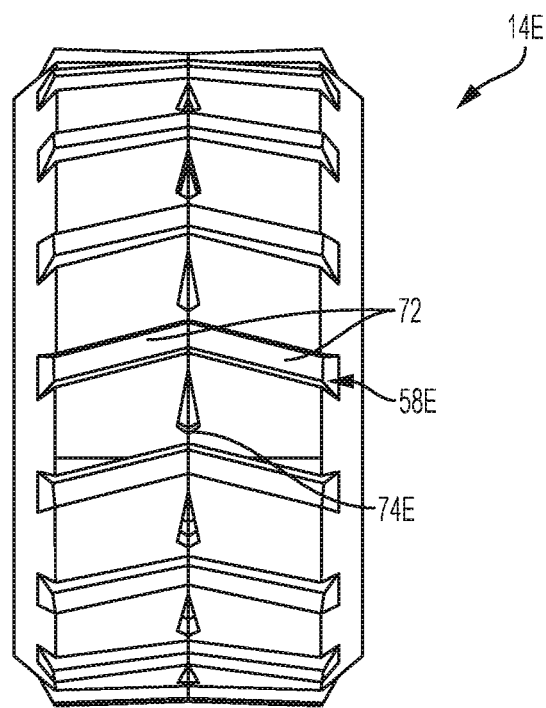
FIGS. 50A-50B are views of a further alternative construction of a cutter, such as a close quarters cutter, and illustrate operation of the cutter.
Figure 50B:
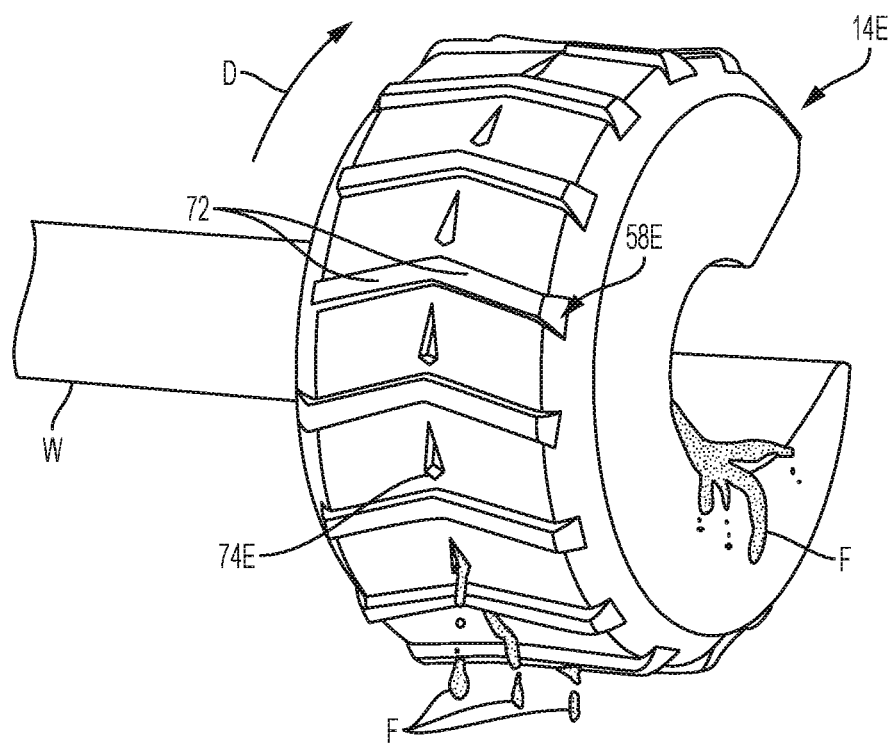
Figure 51:
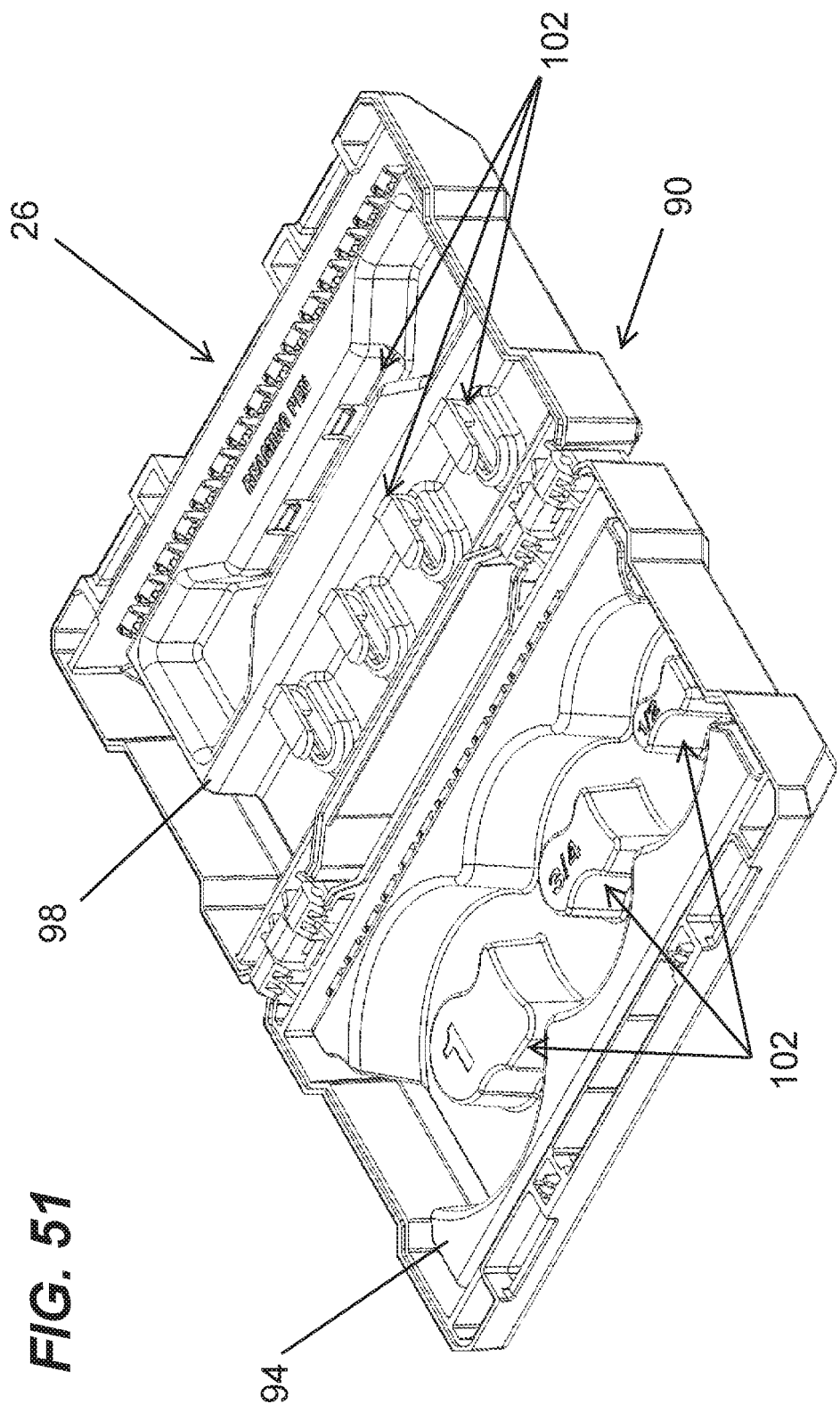
FIG. 51 is a front perspective view of a case assembly of the kit of FIG. 1.
Figure 52:
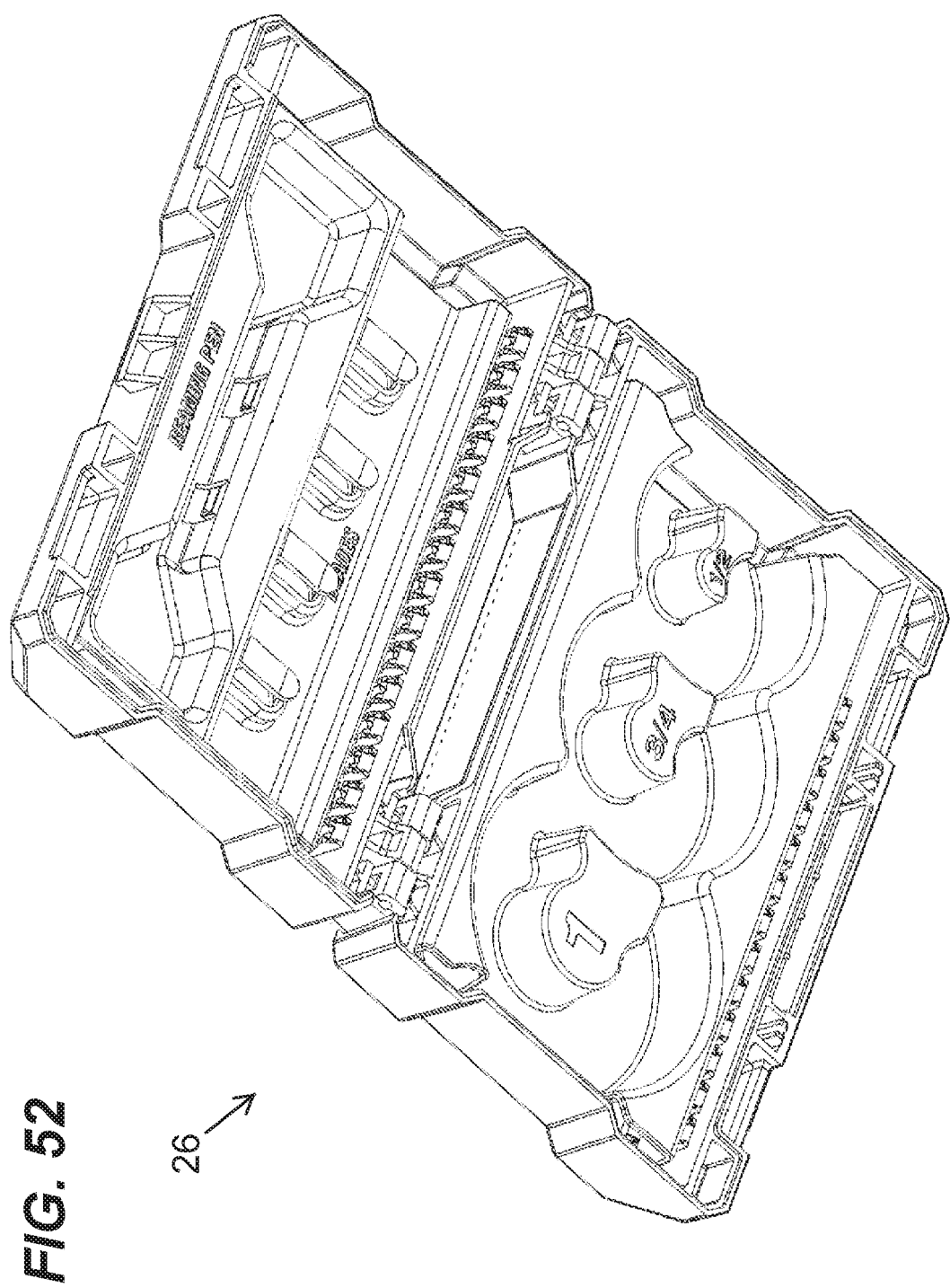
FIG. 52 is a rear perspective view of the case assembly of FIG. 45.
Figure 53:
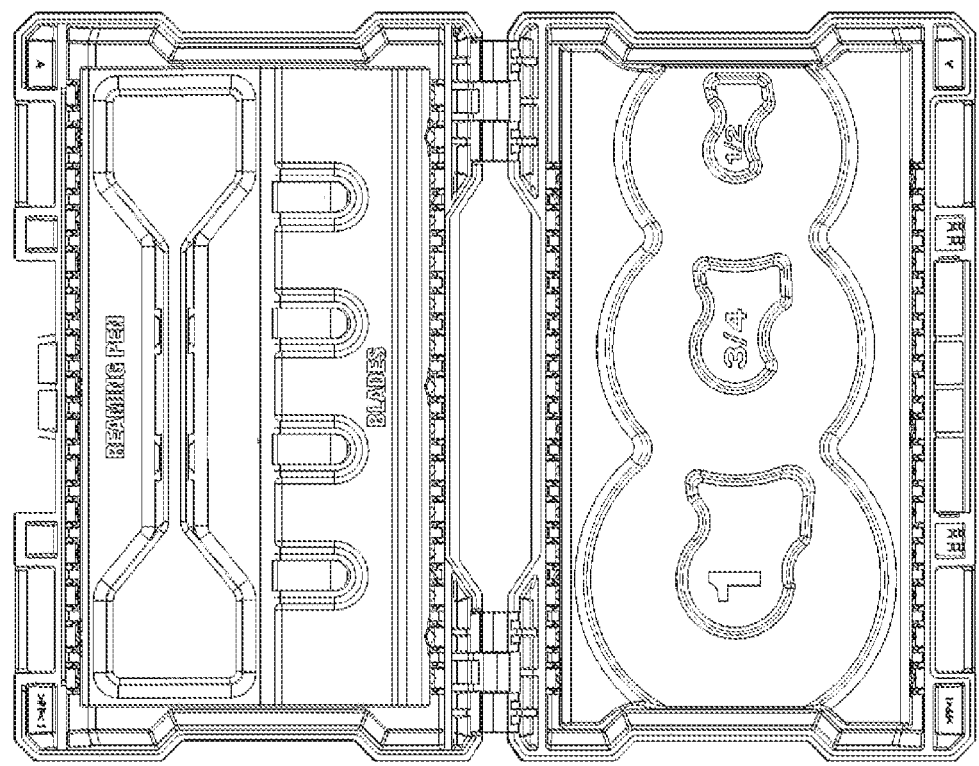
FIG. 53 is a top view of the case assembly of FIG. 45.

In addition or as an alternative to the direction-indicating grip members 58, the openings 74 are shaped and/or oriented (see FIGS. 3-4) to indicate the cutting direction D. The illustrated openings 74 are angled in the same direction as the leading surface 66. In other constructions, the openings 74 may be constructed and/or arranged in another manner (e.g., arrow-shaped openings 74E as shown in FIGS. 50A-50B) to provide an indication of the cutting direction D.

Figure 48A:
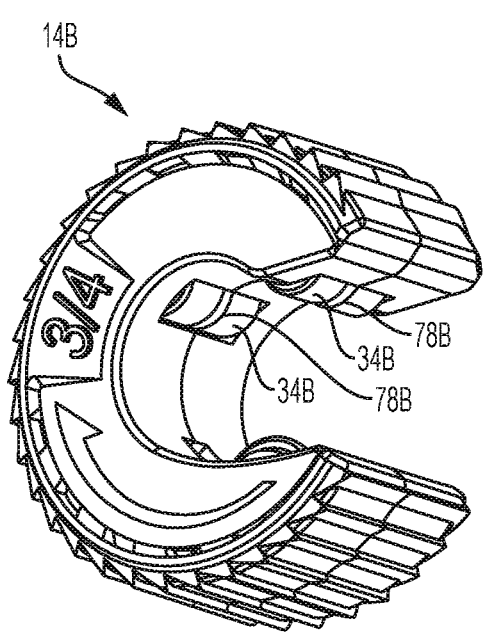
FIGS. 48A-48C illustrate operation of a cutter, such as a close quarters cutter.
Figure 48B:
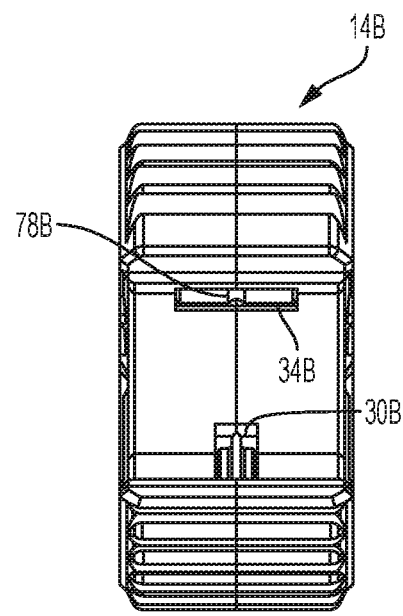
Figure 48C:
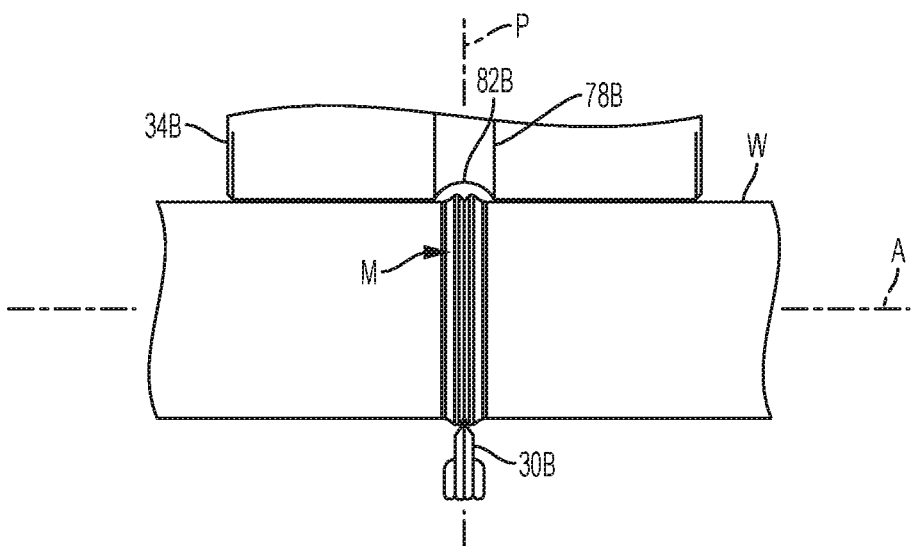
Figure 49A:
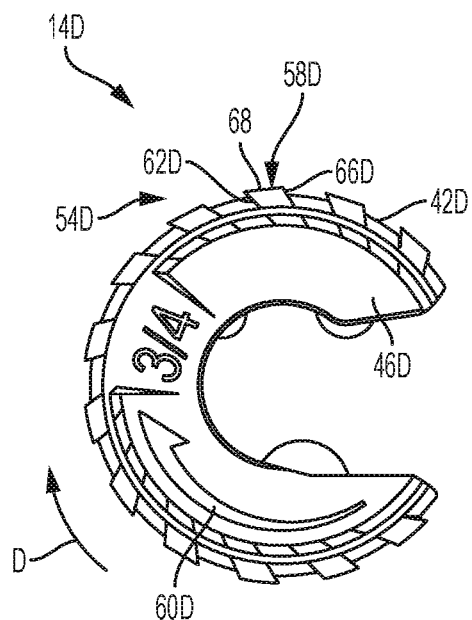
FIGS. 49A-49D are views of yet another alternative construction of a cutter, such as a close quarters cutter.
Figure 49B:
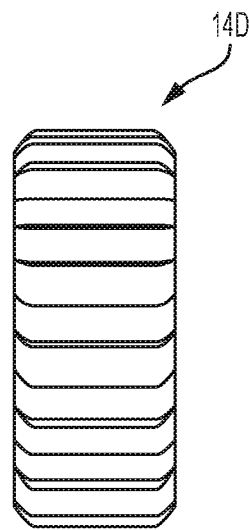
Figure 49C:
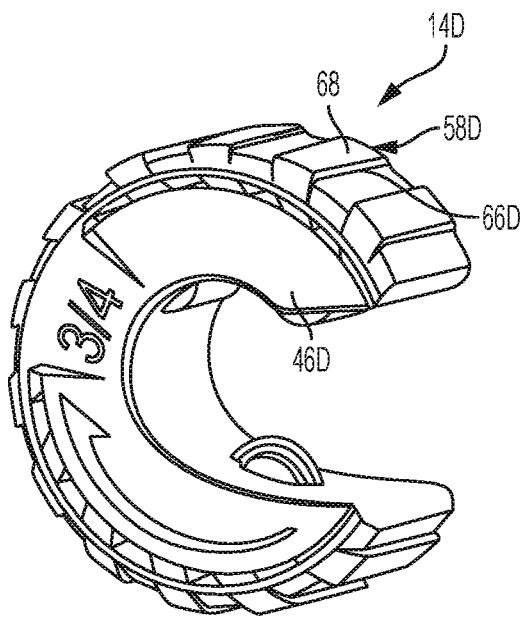
Figure 49D:
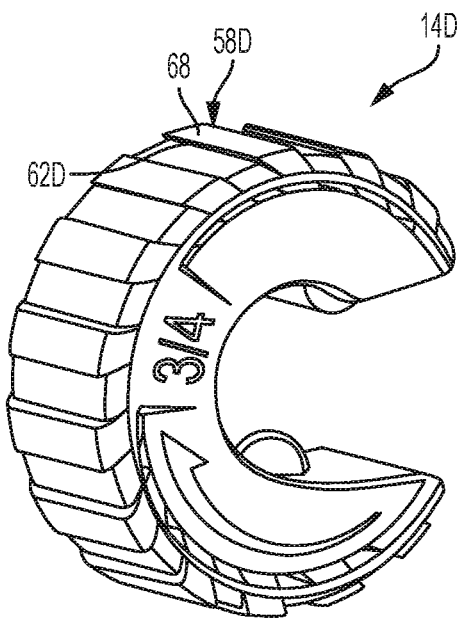

As shown in FIG. 48C, the cutting wheel 30 is oriented in a plane P transverse to the cutting axis A. Each roller 34 has a generally cylindrical roller surface, and an annular groove 78 is defined in the roller surface. The groove 78 has a concave surface 82 extending into in the roller surface. In the illustrated construction, each roller 34 is supported with the groove 78 overlapping the plane P. The groove 78 provides clearance for material M of the work piece W displaced during cutting, with the curve of the concave surface 82 being spaced from the material M. In other constructions (not shown), the roller(s) 34 may also define a groove spaced from the plane P, for example, configured to receive a pipe flange.

The cutting wheel 30 and the roller(s) 34 are components of a cutting mechanism 86 for the cutter 14A. In the illustrated construction (see FIGS. 17-18), the cutting mechanism 86 is similar to the mechanism described and illustrated in U.S. Pat. No. 4,831,732, issued May 23, 1989, the entire contents of which are hereby incorporated by reference. Generally, the cutting wheel 30 is spring-biased into engagement with the surface of the work piece W to be cut.

To cut the work piece W, the work piece W is positioned in the opening 50 and supported by the roller(s) 34, while the cutting wheel 30 is pushed out of the way to accommodate the work piece W in the opening 50. However, the cutting wheel 30 is biased into engagement with the outer surface of the work piece W by a spring member 92 (see FIGS. 17-18) supported by the housing assembly 40 and within the cavity 70. The cutter 14A is pivoted about the work piece W, and the cutting wheel 30 cuts the outer surface. As shown in FIG. 48C, displaced material fits in the groove 78 in each roller 34 so that movement is not impeded or adversely affected. As the cutter 14A is rotated and the outer surface of the work piece W is cut, the cutting wheel 30 is forced deeper into the surface of the work piece W by the spring member 92.

While not shown, the outer wall 42 may define a slot to receive and accommodate the cutting wheel 30 as it is pressed radially outwardly by the work piece W. This arrangement may, for example, reduce the outer diameter of the housing assembly 38 and/or increase the possible cutting range of the cutter 14A.

If there is fluid (e.g., standing water) in the work piece W (see FIGS. 47B and 50B), when the outer surface of the work piece is pierced, the fluid F leaks into the housing assembly 38, through the cutting wheel opening 76 and/or the roller openings 80 defined in the outer wall 42. The fluid F drains from the cavity 70 through the openings 74 during cutting and when the cutter 14A is not in use.

As mentioned above, the illustrated kit 10 (see FIGS. 1-2) includes the cutters 14A, 14B, 14C, accessories (e.g., a reamer pen 18), replacement parts (e.g., replacement blade(s) 22), etc. The case assembly 26 supports these kit components. As shown in FIGS. 51-58, the case assembly 26 includes an outer case 90 having two halves hinged together to open and close. One or more inserts 94, 98 (e.g., a cutter support insert 94 and an accessory/part support insert 98) are supported by the outer case 90 and are constructed to support and retain the kit components. The inserts 94, 98 include a number of component supports 102 (e.g., spring clips, spring arms, movable retainer members, frictional surfaces, etc.) for supporting and retaining the components provided with the kit 10 or in a desired configuration of the kit 10.

Figure 54:
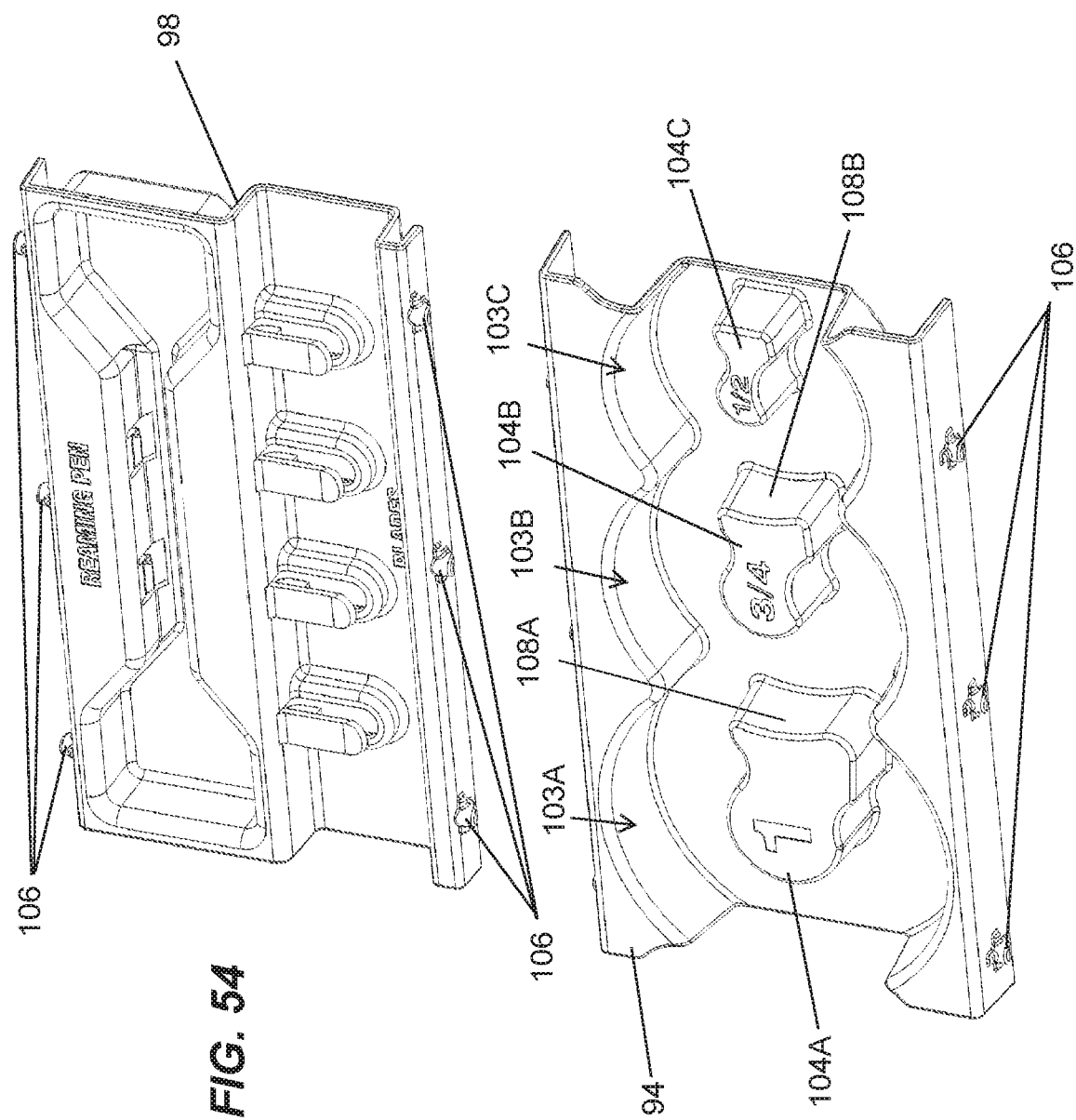
FIG. 54 is a front perspective view of inserts for the case assembly of FIG. 45.
Figure 55:
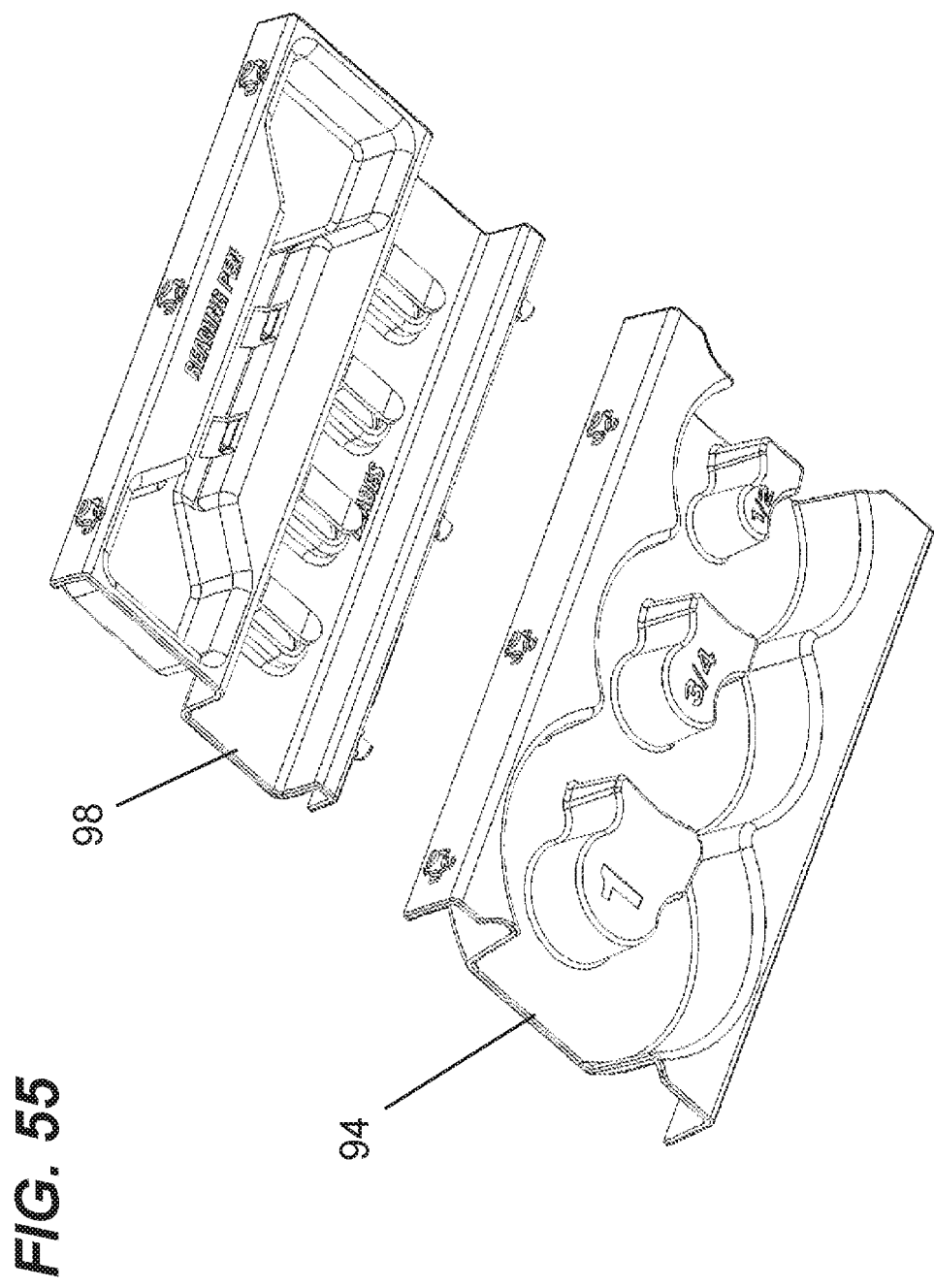
FIG. 55 is a rear perspective view of the inserts of FIG. 48.
Figure 56:
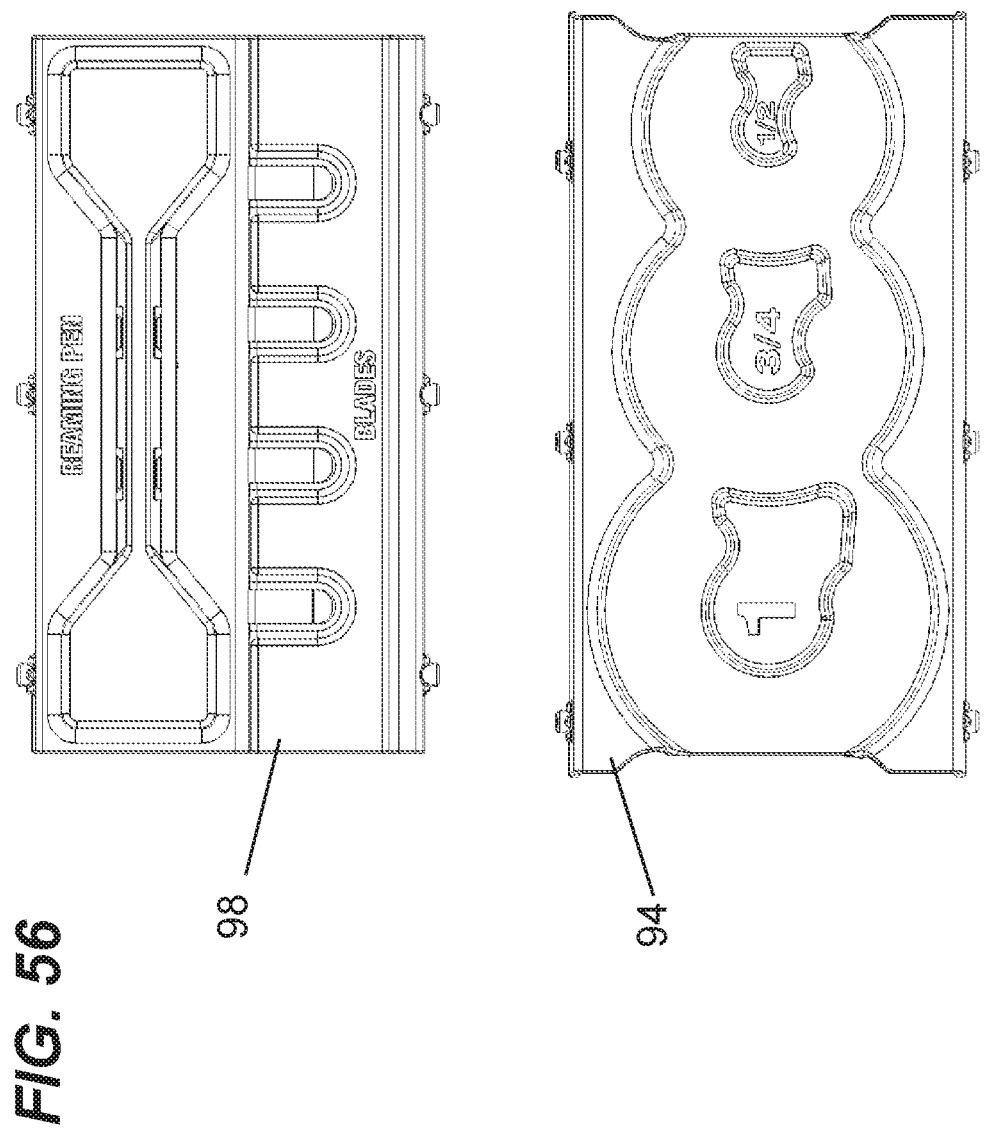
FIG. 56 is a top view of the inserts of FIG. 48.

As shown in FIG. 54, the component supports 102 of the cutter support insert 94 include receptacles 103A, 103B, 103C with a series of cutter support posts or projections 104A, 104B, 104C. Each projection 104A, 104B, 104C has one or more recesses to receive the associated cutting wheel 30 and/or roller 34. Each projection 104A, 104B, 104C may have an indicator (e.g., a recessed or raised "1", "¾", and "½") to indicate which cutter 14A, 14B, 14C should be placed on the projection 104A, 104B, 104C, or for identifying and selecting a cutter 14A, 14B, 14C received on the projection 104A, 104B, 104C.

Each of the cutter support projections 104A, 104B, 104C is sized to frictionally receive the opening 50A, 50B, 50C of a corresponding one of the cutters 14A, 14B, 14C to support and retain the cutters 14A, 14B, 14C. In the illustrated construction, the outer wall of each receptacle 103 cooperates with the corresponding projection 104 to releasably retain the associated cutter 14 (e.g., with a friction fit). In other constructions, the outer wall of the receptacle 103 or the corresponding projection 104 may releasably retain the cutter 14 without cooperation from the other structure. In still other constructions (not shown), different retainer structure (e.g., a pivoting bayonet, a latch, etc.) may be provided in addition to or as an alternative to the friction fit.

A projection (e.g., the projection 104A, 104B) may also have a surface (e.g., an arcuate surface 108A, 108B) with a diameter corresponding to the outer diameter of the adjacent cutter (e.g., the cutter 14B, 14C, respectively) such that, as shown in FIGS. 1-2, the cutters 14A, 14B, 14C nest when received on the projections 104A, 104B, 104C. Thus, the size of the case assembly 26 may be minimized.

Figure 57:
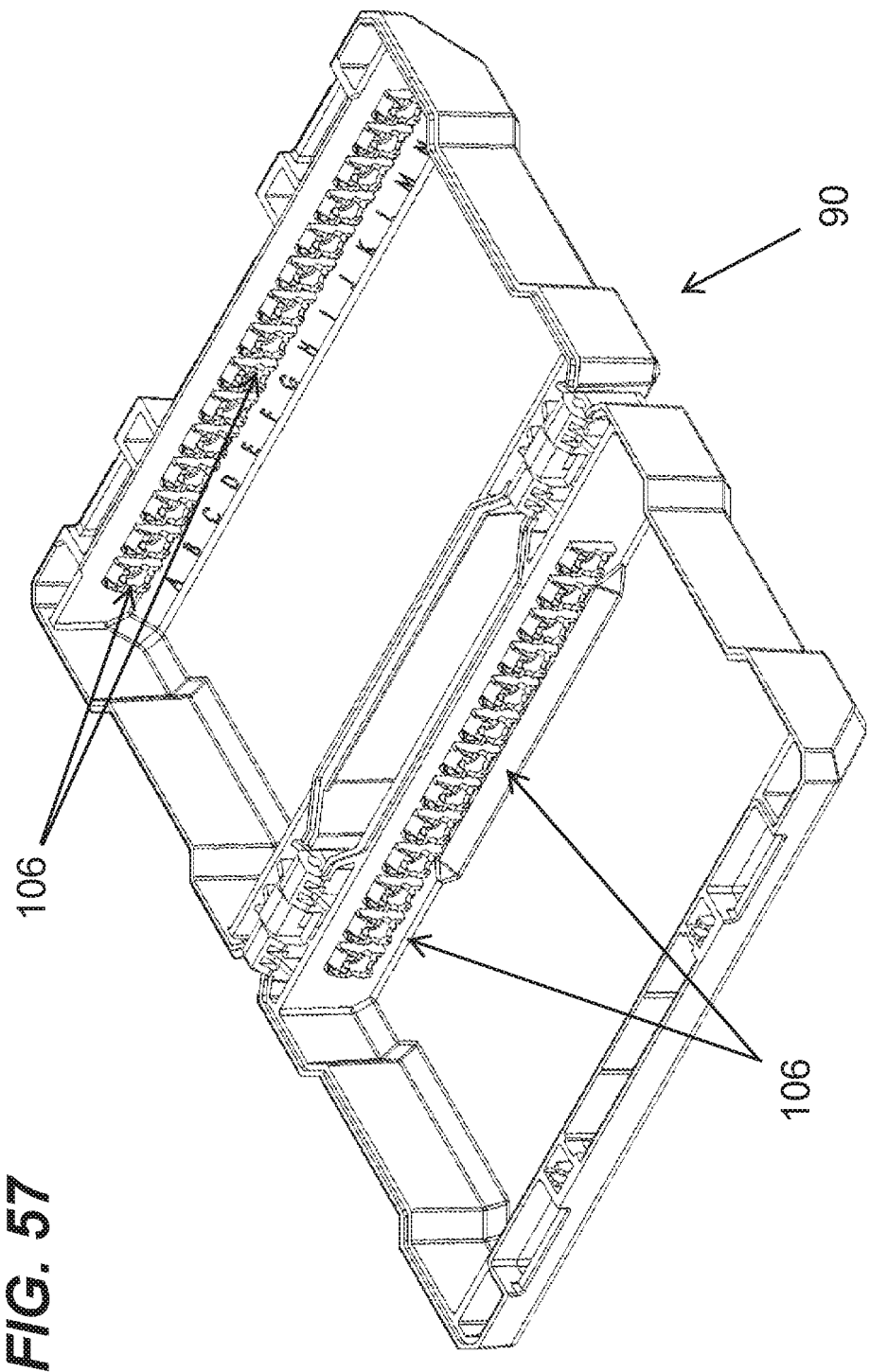
FIG. 57 is a front perspective view of an outer case of the case assembly of FIG. 45.
Figure 58:
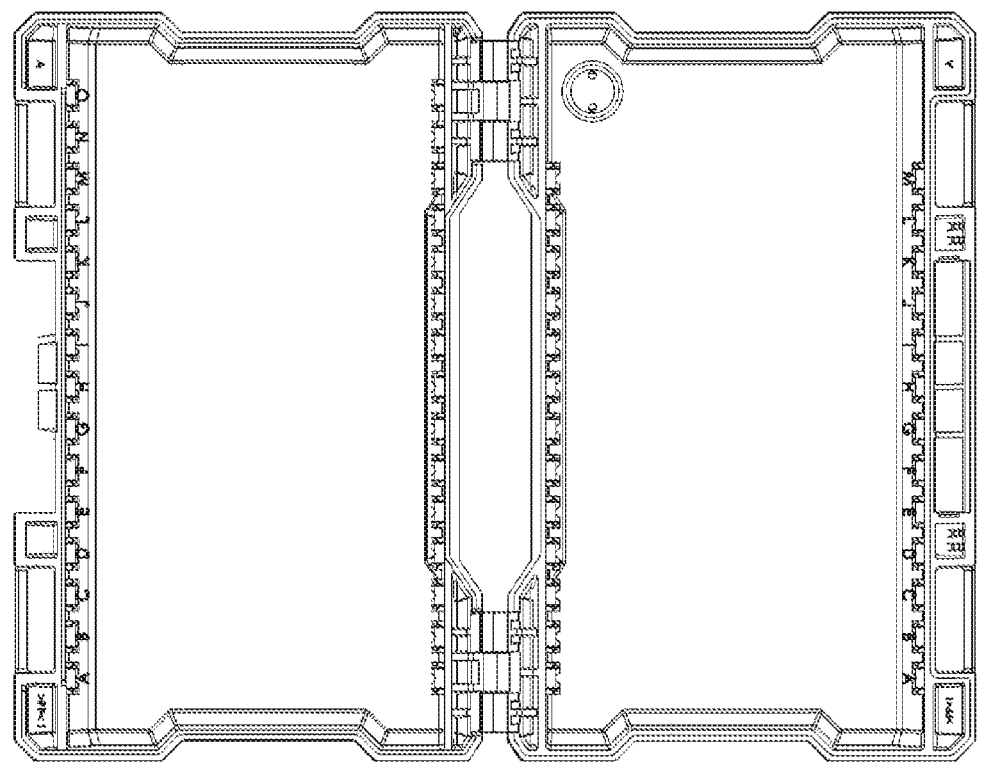
FIG. 58 is a top view of the outer case of FIG. 51.

The illustrated inserts 94, 98 are removably connected to the outer case 90 by inter-engaging connectors 106 (see FIGS. 54 and 57). The inserts 94, 98 may be exchanged with other inserts (not shown) for different kit components to re-configure the kit 10. The inserts 94, 98 may be removed from the outer case 90 and stored with the supported kit components (e.g., in a work shop) and re-installed for transport, storage, etc. of the kit components.

One or more independent features and/or independent advantages of the invention may be set forth in the claims.

We claim:

1. A cutter operable to cut a work piece extending along an axis, the cutter comprising:
   a cutting wheel selectively engageable with and operable to cut the work piece; and
   a housing assembly supporting the cutting wheel for movement about the axis in a cutting direction to cut the work piece, the housing assembly having a generally cylindrical outer surface engageable by a user to pivot the cutter about the axis, a grip portion being on the outer surface and including a plurality of grip members, each grip member including, relative to the cutting direction, a trailing surface and a leading surface extending from the outer surface, the housing assembly further comprising a generally cylindrical outer wall and side walls defining an opening receiving the work piece, and the trailing surface of one or more grip members is closer to radial alignment with a central axis of the housing assembly than the leading surface, wherein the leading surface extends from the trailing surface at least partially radially inward towards the central axis;
   wherein the outer wall and the side walls cooperating to define a cavity in which the cutting wheel is at least partially supported, at least one of the side walls defining a plurality of circumferentially-spaced openings communicating between the cavity and an exterior of the cutter.

2. The cutter of claim 1, wherein the trailing surface of each grip member extends substantially radially.

3. The cutter of claim 1, wherein the leading surface and the trailing surface intersect at an edge from which they both extend, and the leading surface and the trailing surface define an angle between approximately 45 degrees and approximately 75 degrees.

4. The cutter of claim 1, at least one side wall including a cutting direction indicator.

5. The cutter of claim 4, wherein the cutting direction indicator includes an arrow pointing in the cutting direction.

6. The cutter of claim 1, further comprising a roller supported by the housing assembly and engageable with the work piece, the roller having a generally cylindrical roller surface and an annular groove having a concave surface extending into the roller surface.

7. A cutter operable to cut a work piece extending along an axis, the cutter comprising:
   a cutting wheel selectively engageable with and operable to cut the work piece; and a housing assembly supporting the cutting wheel for movement about the axis, the housing assembly including a generally cylindrical outer wall and side walls defining an opening receiving the work piece, the outer wall and the side walls cooperating to define a cavity in which the cutting wheel is at least partially supported, the housing assembly defining a plurality of circumferentially-spaced openings communicating between the cavity and an exterior of the cutter, the circumferentially-spaced openings being angled relative to the cutting direction; wherein the cylindrical outer wall has an outer surface engageable by a user to pivot the cutter about the axis, a grip portion being on the outer surface and including a plurality of grip members, each grip member including, relative to the cutting direction, a trailing surface and a leading surface extending from the outer surface, the leading surface being angled toward a cutting direction.

8. The cutter of claim 7, wherein the plurality of circumferentially-spaced openings are defined by at least one of the side walls.

9. The cutter of claim 8, wherein the plurality of circumferentially-spaced openings are defined by each side wall.

10. The cutter of claim 8, wherein the at least one side wall has an axially-raised surface.

11. The cutter of claim 10, wherein the at least one side wall has an axially-recessed surface defining the openings such that the circumferentially-spaced openings are axially recessed from the axially-raised surface.

12. The cutter of claim 7, wherein the outer wall has an inner surface at least partially defining the cavity, and wherein the circumferentially-spaced openings are positioned radially proximate the inner surface.

13. The cutter of claim 7, wherein the circumferentially-spaced openings are defined by the outer wall.

14. The cutter of claim 7, further comprising a roller supported by the housing assembly and engageable with the work piece, the roller having a generally cylindrical roller surface and an annular groove having a concave surface extending into the roller surface.

\* \* \* \* \*